US012459820B2

(12) United States Patent
Miller

(10) Patent No.: US 12,459,820 B2
(45) Date of Patent: Nov. 4, 2025

(54) STABILIZED AND NO2-INHIBITED NITRIC OXIDE GENERATING GELS FOR INHALED NITRIC OXIDE THERAPY

(71) Applicant: J. W. Randolph Miller, Orem, UT (US)

(72) Inventor: J. W. Randolph Miller, Orem, UT (US)

( * ) Notice: Subject to any disclaimer, the term of this patent is extended or adjusted under 35 U.S.C. 154(b) by 643 days.

(21) Appl. No.: 17/343,649

(22) Filed: Jun. 9, 2021

(65) Prior Publication Data

US 2022/0106189 A1 Apr. 7, 2022

Related U.S. Application Data

(60) Provisional application No. 63/037,937, filed on Jun. 11, 2020.

(51) Int. Cl.
| | |
|---|---|
| C01B 21/24 | (2006.01) |
| A61M 16/06 | (2006.01) |
| A61M 16/10 | (2006.01) |
| A61M 16/20 | (2006.01) |

(52) U.S. Cl.
CPC .......... *C01B 21/24* (2013.01); *A61M 16/0666* (2013.01); *A61M 16/10* (2013.01); *A61M 16/208* (2013.01); *A61M 2202/0275* (2013.01); *A61M 2205/8206* (2013.01)

(58) Field of Classification Search
CPC ........... A61K 47/02; A61K 47/12; A61K 9/06
See application file for complete search history.

(56) References Cited

U.S. PATENT DOCUMENTS

| | | | |
|---|---|---|---|
| 3,682,171 A | 8/1972 | Dali et al. | |
| 5,045,292 A | 9/1991 | Ruegg et al. | |
| 5,427,797 A | 6/1995 | Frostell et al. | |
| 5,713,349 A | 2/1998 | Keaney | |
| 5,823,180 A | 10/1998 | Zapol | |
| 5,839,433 A | 11/1998 | Higenbottam | |
| 5,869,539 A | 2/1999 | Garfield et al. | |
| 5,873,359 A | 2/1999 | Zapol et al. | |
| 6,000,403 A | 12/1999 | Cantwell | |
| 6,019,100 A | 2/2000 | Alving et al. | |
| 6,063,407 A | 5/2000 | Zapol | |
| 6,103,275 A | 8/2000 | Seitz et al. | |
| 6,131,572 A | 10/2000 | Heinonen et al. | |
| 6,142,147 A | 11/2000 | Head et al. | |
| 6,149,606 A | 11/2000 | Alving et al. | |
| 6,432,077 B1 | 8/2002 | Stenzler | |
| 6,458,109 B1 | 10/2002 | Henley et al. | |
| 6,572,594 B2 | 6/2003 | Satterfield et al. | |
| 6,581,599 B1 | 6/2003 | Stenzler | |
| 6,601,580 B1 | 8/2003 | Bloch et al. | |
| 6,612,306 B1 | 9/2003 | Mault | |
| 6,670,323 B1 | 12/2003 | Looker et al. | |
| 6,749,834 B2 | 6/2004 | Fein et al. | |
| 6,763,832 B1 | 7/2004 | Kirsch et al. | |
| 6,786,217 B2 | 9/2004 | Stenzler | |
| 6,793,644 B2 | 9/2004 | Stenzler | |
| 7,017,573 B1 | 3/2006 | Rasor | |
| 7,045,152 B2 | 5/2006 | Stamler | |
| 7,048,951 B1 | 5/2006 | Seitz et al. | |
| 7,122,018 B2 | 10/2006 | Stenzler et al. | |
| 8,298,589 B1 * | 10/2012 | Bryan | A61K 31/375 514/474 |
| 8,518,457 B2 | 8/2013 | Miller et al. | |
| 8,980,331 B2 | 3/2015 | Chen et al. | |
| 10,517,817 B2 * | 12/2019 | Minton | A61K 9/0014 |
| 10,828,249 B2 * | 11/2020 | Minton | A61K 47/02 |
| 11,607,382 B2 * | 3/2023 | Minton | A61K 33/00 |
| 11,612,561 B2 | 3/2023 | Minton et al. | |
| 11,622,931 B2 | 4/2023 | Minton et al. | |
| 11,622,932 B2 | 4/2023 | Minton et al. | |
| 11,638,689 B2 | 5/2023 | Minton et al. | |
| 2003/0114333 A1 * | 6/2003 | Somerville-Roberts | B65D 81/3261 510/297 |
| 2004/0002438 A1 | 1/2004 | Hawkins et al. | |
| 2004/0013747 A1 | 1/2004 | Tucker et al. | |
| 2005/0214193 A1 | 9/2005 | D'Ottone | |
| 2006/0172018 A1 | 8/2006 | Fine | |
| 2007/0190184 A1 | 8/2007 | Montgomery et al. | |
| 2007/0239107 A1 | 10/2007 | Lundberg et al. | |
| 2008/0264937 A1 * | 10/2008 | D'Amato | B65D 81/3874 220/4.28 |
| 2010/0003349 A1 | 1/2010 | Miller et al. | |
| 2011/0311653 A1 | 12/2011 | Kevil et al. | |
| 2013/0330244 A1 | 12/2013 | Balaban et al. | |
| 2017/0172879 A1 * | 6/2017 | Ragoonath | A61K 8/27 |

(Continued)

OTHER PUBLICATIONS

Peach et al (Journal of Contemporary Brachytherapy, 2018, vol. 10, pp. 306-314) (Year: 2018).*
Phyrra (Phyrra, DIY Carbonated Bubble Clay Mask, Mar. 14, 2017, https://phyrra.net/diy-carbonated-bubble-clay-mask.html) (Year: 2017).*
Frith (The Salt Box, Feb. 14, 2020, https://www.thesaltbox.com.au/news/bentonite-clay-mask-recipes-for-every-skin-type/) (Year: 2020).*
Budiman et al (National Journal of Physiology, Pharmacy and Pharmacology, 2017, vol. 7, pp. 987-994) (Year: 2017).*

*Primary Examiner* — Mark V Stevens

(74) *Attorney, Agent, or Firm* — Bryant J. Keller; John Oldroyd; Kirton McConkie

(57) ABSTRACT

The present invention relates to stabilized and $NO_2$-inhibited nitric oxide generating gels for inhaled nitric oxide therapy, for the treatment of bacterial, viral or fungal conditions, including the formulas for the gels with new stabilizing ingredients/agents, together with delivery instructions that can permit self-administration of the gas, new dosage protocols for the use of the nitric oxide gas, and new drug concentrations for enhanced effectiveness. Other implementations are described.

20 Claims, 26 Drawing Sheets

(56) References Cited

U.S. PATENT DOCUMENTS

2017/0296463 A1* 10/2017 Minton .................. A61K 47/02
2019/0314596 A1* 10/2019 Zapol ...................... C01B 21/32

* cited by examiner

STABILIZED AND NO2-INHIBITED NITRIC OXIDE GENERATING GELS FOR INHALED NITRIC OXIDE THERAPY

CROSS-REFERENCE TO RELATED APPLICATIONS

This application claims priority to U.S. Provisional Patent Application No. 63/037,937, filed Jun. 11, 2020 and entitled STABILIZED AND $NO_2$-INHIBITED NITRIC OXIDE GENERATING GELS FOR INHALED NITRIC OXIDE THERAPY, the entire disclosure of which is incorporated herein by reference.

BACKGROUND

Nitric oxide has been shown to act as a signaling molecule within some biological systems. It has been shown that nitric oxide can be administered therapeutically to patients for a number of medical conditions. This disclosure pertains to systems and methods for analyzing and delivering nitric oxide. More particularly, it discloses methods and systems for analyzing nitric oxide in a blended mix of gas configured to be therapeutically administered to a patient. It also pertains to methods and systems for providing a therapeutic gas mixture comprising nitric oxide gas, for analyzing levels of nitric oxide gas in the therapeutic gas mixture, and for administering the therapeutic gas mixture. While nitric oxide can be administered to a patient in a number of different conventional methods, some of these methods of administering nitric oxide have been inconvenient, expensive, or difficult.

Therefore, there is a need in the industry for new apparatus and systems for producing a therapeutic blend of gas comprising nitric oxide and for delivering this therapeutic blend of gas. There is also a need for new methods and systems for analyzing a therapeutic stream of nitric oxide and delivering such therapeutic stream to a subject. Such methods, apparatus, and systems are disclosed herein.

BRIEF SUMMARY

In some embodiments, the present application discloses methods and systems for producing and using gas analyzers that are configured for analyzing and delivering a therapeutic blend of nitric oxide gas to a patient. While the described gas analyzer can include any suitable component, in some implementations, a gas analyzer comprises a nitric oxide metering circuit comprising a metering valve. The metering circuit can be configured to meter a flow of nitric oxide into a blended gas mix. The gas analyzer can also comprise a gas sampling circuit comprising a sensor array. The sampling circuit can be configured to sample the blended gas mix to determine concentrations of gases in the blended gas mix. The gas analyzer can also comprise a controller that is configured to receive a desired nitric oxide concentration from a user interface and that is configured to receive the concentrations of gases in the blended gas mix from the gas sampling circuit. The controller can be configured to control the nitric oxide metering circuit to meter a flow of the nitric oxide into the blended gas mix such that the concentration of nitric oxide in the blended gas mix approximates the desired nitric oxide concentration. The metering valve can also comprise a manual metering valve dial configured to allow a user to manually open and/or close the metering valve to manually meter the flow of nitric oxide into the blended gas mix. The metering circuit can also comprise a motor rotationally connected to a valve shaft. The valve shaft can be rotationally connected to the metering valve. The metering circuit can also comprise a potentiometer configured to electrically communicate a rotational positon of the metering valve to the controller. The controller can activate the motor to rotate the valve shaft to open and/or close the metering valve based at least in part on the rotational position of the metering valve as communicated by the potentiometer.

The sampling circuit can comprise a gas sampling pump configured to draw the blended gas through the sampling circuit at any suitable rate, including without limitation, at a rate of between about 0.01 and about 1000 cubic centimeters per minute (e.g., from between about 350 and 400 cubic centimeters per minute). The sensor array can comprise a nitric oxide sensor configured to effectively analyze a nitric oxide concentration in the blended gas mixture in the concentration range of between about 0 to 20,000 ppm (parts per million) or any subrange thereof (e.g., from about 1 to about 7,500 ppm). The sensor array can comprise a nitrogen dioxide sensor configured to effectively analyze a nitrogen dioxide concentration in the blended gas mixture in the concentration range of between about 0 to about 1000 ppm, or any subrange thereof (e.g., from about 0 to about 200 ppm). The user interface can comprise a touchscreen display (or other interface) configured to display (or otherwise communicate) the concentrations of gases and configured to receive user inputs and/or any other suitable user interface. The gas analyzer can further comprise an external patient monitor configured to communicate a vital sign of a patient to the controller. The controller can control the nitric oxide metering circuit to meter a flow of the nitric oxide into the blended gas mix based at least in part on a communicated vital sign.

In some embodiments, the present application discloses methods and systems for storing and dispensing nitric oxide to generate a therapeutic blend of nitric oxide gas for delivery to a patient. The system can comprise a portable chassis and/or any other suitable support structure that contains and/or is configured to contain a first nitric oxide source, a second nitric oxide source, a first diverting valve, a user interface, and a controller. The first nitric oxide source can comprise a first regulator. The first regulator can be configured to regulate a first pressure of nitric oxide gas in the first nitric oxide source as the first nitric oxide source dispenses nitric oxide. The first regulator can also be configured to communicate the first pressure of nitric oxide gas to the controller. The second nitric oxide source can comprise a second regulator. The second regulator can be configured to regulate a second pressure of nitric oxide gas in the second nitric oxide source as the second nitric oxide source dispenses nitric oxide. The second regulator can be configured to communicate the second pressure of nitric oxide gas to the controller. The first diverting valve can be configured to be in fluid connection with the first nitric oxide source, the second nitric oxide source, and a nitric oxide line. The user interface can be configured to display the first pressure of nitric oxide gas and the second pressure of nitric oxide gas and be configured to receive inputs from a user. The controller can comprise a specific purpose machine and/or any other suitable processor that is configured to control the first diverting valve to direct a flow of nitric oxide gas through the nitric oxide line from either the first nitric oxide source or the second nitric oxide source based at least in part on the first pressure and the second pressure.

The chassis and/or any other suitable support structure can further comprise a docking assembly configured to detachably couple a gas analyzer to the chassis. The docking assembly can mechanically secure the gas analyzer to the chassis and the docking assembly can electrically connect the system to the gas analyzer. The system can further comprise a gas analyzer configured to receive the flow of nitric oxide gas from the nitric oxide line, the gas analyzer comprising a nitric oxide metering circuit comprising a metering valve, the metering circuit configured to meter the flow of nitric oxide gas into a blended gas mix, a gas sampling circuit comprising a sensor array, the sampling circuit configured to sample the blended gas mix to determine concentrations of gases in the blended gas mix, and an analyzer controller configured to receive a desired nitric oxide gas concentration from a user interface and configured to receive the concentrations of gases in the blended gas mix from the gas sampling circuit. The analyzer controller can be configured to control the nitric oxide metering circuit to meter a flow of the nitric oxide gas into the blended gas mix such that the concentration of nitric oxide gas in the blended gas mix approximates the desired nitric oxide concentration.

The described system can further comprise a nitric oxide flow regulator configured to receive the flow of nitric oxide gas from the nitric oxide line and configured to allow a user to meter the flow of nitric oxide gas dispensed from the system. The system can also comprise an air flow regulator configured to receive a flow of air from an air source and configured to allow a user to meter the flow of air dispensed from the system. The user interface can comprise an touch screen display and/or any other suitable interface configured to display and/or otherwise indicate one or more of amount of nitric oxide gas in first nitric oxide source and second nitric oxide source, remaining patient doses of nitric oxide gas in first nitric oxide source and second nitric oxide source, whether the first nitric oxide source or the second nitric oxide source is in use, alarm conditions indicating low levels of nitric oxide gas in one or both of the first nitric oxide source and the second nitric oxide source, and/or alarm conditions indicating the need to replace one or both of the first nitric oxide source and the second nitric oxide source. The controller can be configured to monitor the first pressure and the second pressure as the nitric oxide gas flow is drawn from the first nitric oxide source, to activate the first diverting valve to divert the nitric oxide gas flow from the first nitric oxide source to the second nitric oxide source when the first pressure indicates that the first nitric oxide source is almost exhausted, and/or to communicate an alarm condition to the user display to alert the user to replace the first nitric oxide source.

In some embodiments, the described methods and systems relate to gas analyzers configured for analyzing and delivering a therapeutic blend of nitric oxide gas to a patient. In some implementations the analyzer comprises a controller configured as a special purpose machine. Specifically, some implementations of the controller can comprise one or more processors configured to receive a desired nitric oxide concentration from a user interface, receive concentrations of gases comprising a blended gas mix from the gas sampling circuit, and/or control the nitric oxide metering circuit to meter a flow of the nitric oxide into the blended gas mix such that the concentration of nitric oxide in the blended gas mix approximates the desired nitric oxide concentration.

The one or more processors can be further optionally be configured to receive a mode selection from the user interface indicating a selection of a manual delivery mode. The one or more processors can then operate the gas analyzer in a manual delivery mode by allowing a user to manually open and/or close the metering valve to manually meter the flow of nitric oxide into the blended gas mix, by receiving the concentrations of gases comprising the blended gas mix from the gas sampling circuit, by receiving low and high threshold values for individual concentrations of gases from the user interface by displaying concentrations of gases in the blended gas mix with the user interface, by determining if individual concentrations of gases in the blended gas mix are within low and high threshold values, and/or by activating an alarm to notify a user via the user interface if one or more individual concentrations of gases in the blended gas mix are not within the low and high threshold values. The one or more processors can also be configured to receive a mode selection from the user interface indicating a selection of an automatic delivery mode; and/or to operate in an automatic delivery mode. The automatic delivery mode can comprise receiving the concentrations of gases in the blended gas mix from the gas sampling circuit, receiving a desired nitric oxide concentration from the user interface, displaying concentrations of gases comprising the blended gas mix with the user interface, activating a metering valve to meter a flow of nitric oxide gas in the blended gas mix, determining if a nitric oxide concentration in the blended gas mix approximates the desired nitric oxide concentration, maintaining the metering valve at a current setting if the nitric oxide concentration in the blended gas mix approximates the desired nitric oxide concentration, opening and/or closing the metering valve to further meter the flow of nitric oxide gas in the blended gas mix if the nitric oxide concentration in the blended gas mix does not approximate the desired nitric oxide concentration, determining if individual concentrations of gases in the blended gas mix are within low and high threshold values, and/or activating an alarm to notify a user via the user interface if one or more individual concentrations of gases in the blended gas mix are not within the low and high threshold values.

The one or more processors can be configured to calibrate a sensor array of the gas analyzer by receiving a gas selection from the user interface indicating a selection of a reference gas configured to calibrate the sensor array, calibrating a nitric oxide sensor value to zero, or any other suitable value, calibrating a nitrogen dioxide sensor value to zero, or any other suitable value, and calibrating an oxygen sensor value to between about 10% and about 50%, or any other suitable value, if the selection of the reference gas is air, receiving a concentration of a nitric oxide reference gas and calibrating the nitric oxide sensor value to the concentration of the nitric oxide reference gas if the selection of the reference gas is nitric oxide, and/or receiving a concentration of a nitrogen dioxide reference gas and calibrating the nitrogen dioxide sensor value to the concentration of the nitrogen dioxide reference gas if the selection of the reference gas is nitrogen dioxide.

In some implementations, the gas analyzer further comprises at least one non-transitory tangible machine-readable storage medium comprising a plurality of instructions for analyzing and delivering a therapeutic blend of nitric oxide gas to a patient. In some cases, the instructions, when executed, carry out receiving the desired nitric oxide concentration from the user interface, receiving concentrations of gases comprising the blended gas mix from the gas sampling circuit, and/or controlling the nitric oxide metering circuit to meter a flow of the nitric oxide into the blended gas mix such that the concentration of nitric oxide in the blended gas mix approximates the desired nitric oxide concentration.

While the methods and processes of the present disclosure may be particularly useful in the area of analyzing and delivering a therapeutic blend of nitric oxide gas to a patient, those skilled in the art can appreciate that the methods and processes can be used in a variety of different applications and in a variety of different areas of manufacture to yield methods and processes for delivering therapeutic blends of various gases to a patient, for analyzing levels of various gases, for testing and/or development of nitric oxide generators, and/or for any other related methods and processes.

Nitric Oxide ("NO") is a small gaseous molecule which is a major controller of biological activity in the human body. Our bodies produce NO naturally. It is a potent vasodilator and has anti-bacterial and anti-viral properties. In some cases, it is anti-inflammatory, promotes healing, and stimulates blood vessel formation, among many other properties. Its unique biological activity, unusual structure, and unprecedented function have arguably, more than any other natural product, opened new avenues into disease treatment.

Inhaled NO has been used for over twenty years in the United States and other countries as an accepted method to treat pulmonary hypertension/respiratory failure in premature and term infants. Also, importantly, this gas is FDA approved.

NO not only has anti-bacterial properties but, in some cases, it also has anti-inflammatory properties. In many cases, NO enhances faster and greater protective effects. It many cases, it is evident that the diffusible, gaseous NO also stimulates wound healing and collagen formation. When people are ill or aged, their natural ability to produce NO decreases. The decreased production of NO reduces the body's ability to fight disease, heal wounds, burns, and makes one more susceptible to the body's aging process.

The inventor has engineered a mechanism to produce nitric oxide gas by, in some cases, combining sodium nitrite and an organic acid. In some cases, these compounds remain static until mixed together. When mixed, they produce NO gas. In accordance with some implementations, the gel-produced NO can be inhaled without adverse side effects. In some cases, NO kills dangerous bacteria and viruses such as MRSA, H1N1, and COVID-19. In fact, many diseases and infections respond favorably to NO treatment. There are many kinds of bacteria that in recent years have become resistant to antibiotics. However, no bacteria is known to the inventor to have developed resistance to NO, over many years of testing. In some implementations, NO has a 100% kill rate against the bacteria and viruses tested. The gels and the NO are non-toxic and non-carcinogenic, and therefore can be used liberally without adverse effects in a wide variety of applications. In fact, in some implementations, all of the ingredients in both gels come from the FDA approved list of "Generally Recognized as Safe and Effective" ("GRASE") ingredients. We have learned from years of testing and treatments unique delivery protocols, and, importantly, dosing regimens that are proprietary, and make it possible to successfully stop and heal many very serious diseases. We also have device and drug histories for each product.

Gels and other proprietary products have been developed that produce nitric oxide gas from acidified nitrites in a form that can be used in many different compounds and doses to treat many different ailments. Below is only a partial list of diseases that respond to applications already developed. (Products are ready for immediate manufacture, and sale to the public.) In some cases, the NO gas can treat the following conditions: COVID-19, H1N1 and other strains of coronaviruses that might cause pandemic conditions.

In some cases, NO can also be used for pain relief, burns, acne, hand sanitizer, skin care lotions and creams, foot baths, mouth wash, infected and non-healing wounds, skin cancer, and surgical site sterilization.

Technologies have been developed that economically produce high, but safe, concentrations of nitric oxide gas. This technology is safe, scalable, and has no Department of Transportation restrictions as do large cylinder containers.

Some current, competing formulations of acidified nitrite gels generate equal amounts of both nitric oxide gas and unwanted, and harmful, nitrogen dioxide gas for therapeutic inhalation. Some such current, thickened acidic gel formulations do not maintain viscosity for an acceptable time. This is an important defect because it can compromise the predictable and repeatable delivery of desired precise dosages of the nitric oxide gas needed for inhaled therapy.

The currently known formulations of these gels do not account for the equal amount of nitrogen dioxide generated when the gels are combined. Nitrogen dioxide is extremely dangerous as it turns to nitric acid when exposed to moisture and oxygen in the lungs, thus destroying lung tissue.

The uniquely powerful qualities and beneficial use of nitric oxide, as delivered by some implementations of the described technology and mechanism, can be made available at affordable prices to people in all nations, and thus deliver outcomes that are now available only in a few countries due to high costs.

Many unsuccessful variations of thickeners and stabilizers have been tried over a period of years by professional formulators, manufacturers, and pharmaceutical companies. That said, it is believed that none were successful in halting the deterioration of the viscosity of the acidic gel. The solution to this problem was not obvious to any professional formulators who were familiar with or tried to solve the problem.

In accordance with some implementations of the current invention, the addition of sodium bentonite (e.g., as a sodium bentonite emulsion) to the formula accomplished two important, wanted results. First, the viscosity of the acidic gel was stabilized.

Second, the addition of sodium from the sodium bentonite to the formula provided extra sodium ions that used the oxygen from the nitrogen dioxide to produce even more molecules of useful and healing nitric oxide gas. Nitrogen dioxide is unwanted because it can acquire oxygen and water to form deadly nitric acid in the lungs.

In accordance with some implementations, sodium nitrite and citric acid and ascorbic acid are mixed to yield one molecule of nitric oxide and one molecule of nitrogen dioxide.

In some cases, the addition of the sodium bentonite to the compounds causes the nitrogen dioxide, when two gel components are mixed, to rapidly give up its oxygen to form more of useful and healing nitric oxide gas.

In some cases, the transfer of the oxygen resulting in the removal of the dangerous nitrogen dioxide, is caused by the addition of the sodium bentonite, and is very important to the safety and efficacy of inhaled nitric oxide therapy.

In addition to the foregoing, systems and methods for forming and delivering NO are described.

These and other features and advantages of the present disclosure will be set forth or will become more fully apparent in the description that follow and in the appended claims. The features and advantages may be realized and obtained by means of the instruments and combinations particularly pointed out in the appended claims. Furthermore, the features and advantages of the invention may be learned by the practice of the described methods and systems or will be apparent from the description, as set forth hereinafter.

BRIEF DESCRIPTION OF THE DRAWINGS

In order to describe the manner in which the above-recited and other advantages and features of the invention can be obtained, a more particular description of the systems and methods briefly described above will be rendered by reference to specific embodiments thereof which are illustrated in the appended drawings. Understanding that these drawings depict only typical embodiments and are not therefore to be considered to be limiting of its scope, the described systems and methods will be described and explained with additional specificity and detail through the use of the accompanying drawings in which.

Figure 1:
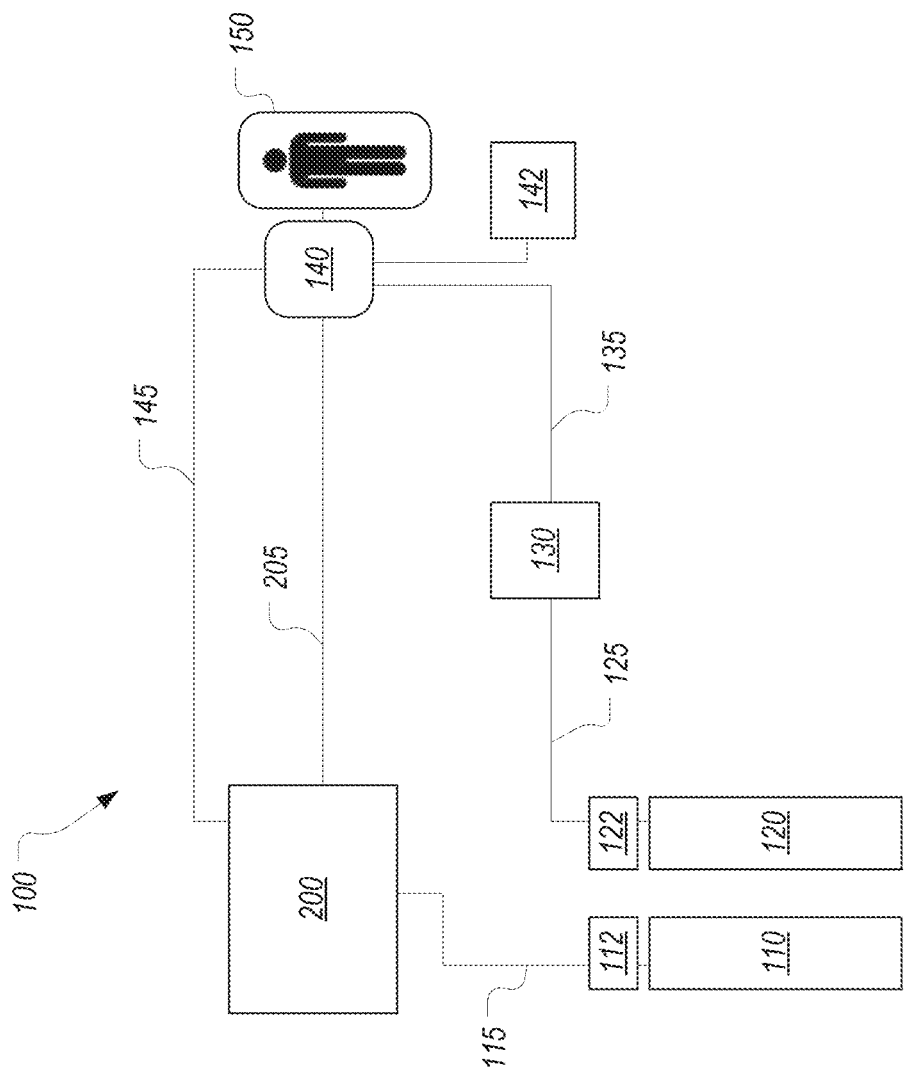
FIG. 1 illustrates some embodiments of a system for analyzing and delivering nitric oxide gas to a subject or patient.

The Figures illustrate specific aspects of systems and methods for analyzing and delivering nitric oxide gas. Together with the following description, the Figures demonstrate and explain the principles of the structures, methods, and principles described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described devices.

As the terms on, attached to, or coupled to are used herein, one object (e.g., a material, a layer, a component, etc.) can be on, attached to, or coupled to another object, regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

DETAILED DESCRIPTION OF THE INVENTION

Reference throughout this specification to "one embodiment," "an embodiment," "an implementation," or similar language means that a particular feature, structure, or characteristic described in connection with the embodiment or implementation is included in at least one embodiment of the present invention. Thus, appearances of the phrases "in one embodiment," "in an embodiment," "in another embodiment," "in some implementations," "in some other embodiments," "in some other implementations," and similar language throughout this specification may, but do not necessarily, all refer to the same embodiment.

The following disclosure of the described systems and methods is grouped into three subheadings, namely "SYSTEMS AND METHODS FOR ANALYZING AND DELIVERING NITRIC OXIDE GAS", "NITRIC OXIDE ANALYZER DELIVERY SYSTEM WITH BIO-FEEDBACK CAPABILITY, and "STABILIZED AND $NO_2$-INHIBITED NITRIC OXIDE GENERATING GELS FOR INHALED NITRIC OXIDE THERAPY." Utilization of the subheadings is for convenience of the reader only and is not to be construed as limiting in any sense.

Systems and Methods for Analyzing and Delivering Nitric Oxide Gas

In accordance with some embodiments, the present systems and methods can comprise systems and methods for analyzing one or more therapeutic gases and/or medically relevant gases. The present application can also comprise systems and methods for delivering one or more therapeutic gases and/or medically relevant gases to a patient. In some embodiments, the present application discloses systems and methods for analyzing and delivering nitric oxide gas to a subject or patient. In other embodiments, the present application discloses systems and methods for analyzing and delivering a blended mixture of gas comprising nitric oxide gas to a subject or patient.

Referring to FIG. 1, some embodiments of a system 100 for analyzing and delivering nitric oxide gas are illustrated. In some embodiments, the system 100 is configured to deliver a blended mix of air and nitric oxide and/or any other suitable gas or gases to a subject or patient. In other embodiments, the system 100 is configured to deliver a blended mix of air and nitric oxide to a patient, to monitor a concentration of nitric oxide in the blended mix, and/or adjust a level of nitric oxide to maintain the level of nitric oxide between one or more adjustable upper and lower limits. In other embodiments, nitric oxide is delivered via a constant-flow oxygen stream, a positive pressure oxygen stream, a high-frequency oscillatory oxygen flow, nasal CPAP, and/or any other suitable manner.

The system 100 can include a nitric oxide source 110 and an air source 120. In some embodiments, the nitric oxide source 110 comprises one or more containers that contain nitric oxide. Indeed, in some embodiments, the nitric oxide source 110 comprises, without limitation, one or more pressurized containers of nitric oxide (e.g., one or more pressurized cylinders of nitric oxide).

In some embodiments, the nitric oxide source 110 comprises one or more gas cylinders of any suitable dimension, volumetric capacity or weight, including, without limitation, cylinders of the following standard sizes: M2, M4 (or A), ML6 (or B), M7, M9 (or C), D, JD, E, M60, M, H (or T), J, G and/or LL. In some embodiments, the nitric oxide source 110 comprises one or more pressurized cylinders with a diameter of about 2 inches or less, about 2.5 inches or less, about 3.2 inches or less, about 4.3 inches or less, about 5.3 inches or less, about 7.3 inches or less, about 8 inches or less, about 9.3 inches or less, and/or about 21 inches or less. In some embodiments, the nitric oxide source 110 comprises one or more pressurized cylinders with a height of about 4 inches or less, about 5.3 inches or less, about 7.5 inches or less, about 8.5 inches or less, about 9 inches or less, about 11.5 inches or less, about 12 inches or less, about 16.5 inches or less, about 23 inches or less, about 25.5 inches or less, about 36 inches or less, about 50 inches or less, about 52 inches or less, about 62 inches or less, and/or about 67 inches or less. In some embodiments, the nitric oxide source 110 comprises one or more pressurized cylinders with a water capacity of about 0.05 L or less, about 0.1 L or less, about 0.2 L or less, about 0.3 L or less, about 0.7 L or less, about 1.0 L or less, about 1.2 L or less, about 1.4 L or less, about 1.7 L or less, about 2.9 L or less, about 3.9 L or less, about 4.6 L or less, about 10.5 L or less, about 15.7 L or less, about 21.4 L or less, about 28.9 L or less, about 200 L or less, and/or any other suitable capacity.

In some embodiments, the nitric oxide source 110 comprises one or more containers comprising any suitable material effective for containing nitric oxide. Indeed, in some embodiments, the containers comprise one or more of steel, stainless steel, aluminum, polymer, fiber-reinforced polymer, carbon fiber, filament wound carbon fiber, composite fiber overwrapped metal, fiberglass composite, fiber-reinforced polymer, metal composites, ceramic composites, and/or any other suitable material.

In some embodiments, the nitric oxide source 110 comprises one or more containers of nitric oxide filled at any suitable pressure. Indeed, in some embodiments, the nitric oxide source 110 comprises one or more gas cylinders configured to contain one or more gases at a pressure of, without limitation, about 100 psig (pounds per square inch gauge (psig) or less, about 500 psig or less, about 1,000 psig or less, about 1,500 psig or less, about 1,650 psig or less, about 1,800 psig or less, about 2,000 psig or less, about 2,250 psig or less, about 2,500 psig or less, about 2,750 psig or less, about 3,000 psig or less, about 3,100 psig or less, about 3,250 psig or less, about 3,500 psig or less, about 4,000 psig, about 4,500 psig or less, and/or about 5,000 psig or less. Indeed, in some embodiments, the nitric oxide source 110 is configured to hold gas at a pressure of up to about 3,300 psig+/−300 psig.

In some embodiments, the nitric oxide source 110 comprises a mixture of gases comprising nitric oxide. The nitric oxide source 110 can comprise any suitable combination of gases at any suitable concentration of gases that allows the gas analyzer 200 to function as intended. Indeed, in some embodiments, the mixture of gases comprising nitric oxide comprises, without limitation, at least about 0.01% nitric oxide, at least about 0.02% nitric oxide, at least about 0.04% nitric oxide, at least about 0.08% nitric oxide, at least about 0.1% nitric oxide, at least about 0.12% nitric oxide, at least about 1% nitric oxide, at least about 2% nitric oxide, at least about 5% nitric oxide, at least about 10% nitric oxide, at least about 20% nitric oxide, at least about 30% nitric oxide, at least about 40% nitric oxide, at least about 50% nitric oxide, at least about 60% nitric oxide, at least about 70% nitric oxide, at least about 80% nitric oxide, at least about 90% nitric oxide, at least about 95% nitric oxide, at least about 99% nitric oxide, and/or at least about 99.5% nitric oxide. In other embodiments, the nitric oxide source 110 comprises a mixture of nitric oxide gas and one or more inert and/or non-reactive gases. The one or more inert and/or non-reactive gases can include any suitable gas, including, without limitation, one or more of nitrogen, helium, neon, argon, krypton, nitrous oxide, anesthesia gas and/or any another suitable gas. In some embodiments, the nitric oxide source 110 comprises nitric oxide at any suitable concentration. Indeed, in some embodiments, the nitric oxide source 110 comprises a mixture of nitric oxide and one or more inert and/or non-reactive gases with the nitric oxide at a concentration of, without limitation, about 100 ppm or less, about 200 ppm or less, about 300 ppm or less, about 400 ppm or less, about 500 ppm or less, about 600 ppm or less, about 700 ppm or less, about 800 ppm or less, about 900 ppm or less, about 1,000 ppm or less, about 1,100 ppm or less, about 1,200 ppm or less, about 1,300 ppm or less, about 1,400 ppm or less, about 1,500 ppm or less, about 1,600 ppm or less, about 1,700 ppm or less, about 1,800 ppm or less, about 1,900 ppm or less, about 2,000 ppm or less, and/or any suitable concentration. Indeed, in some embodiments, the nitric oxide source 110 comprises a mixture of nitric oxide and one or more inert and/or non-reactive gases with the nitric oxide at a concentration of, without limitation, about 2,500 ppm or less, about 3,000 ppm or less, about 3,500 ppm or less, about 4,000 ppm or less, about 4,500 ppm or less, about 5,000 ppm or less, about 5,500 ppm or less, about 6,000 ppm or less, about 6,500 ppm or less, about 7,000 ppm or less, about 7,500 ppm or less, about 8,000 ppm or less, about 8,500 ppm or less, about 9,000 ppm or less, about 9,500 ppm or less, about 10,000 ppm or less, and/or any other suitable concentration.

In some embodiments, the nitric oxide source 110 comprises one or more mini gas cylinders configured for ease of transport, including, without limitation, one or more M2 sized medical gas cylinders. The M2 sized medical gas cylinder can comprise an aluminum cylinder (or any other similar cylinder) of a diameter of about 2.5 inches and a height without valve of about 5.3 inches. The M2 sized gas cylinder can comprise any suitable water capacity (e.g., about 0.3 L or less) and can be configured to contain a gas at any suitable pressure (e.g., a pressure of about 3,000 psig or less). In other embodiments, the nitric oxide source 110 comprises a mini gas cylinder that is smaller in capacity than the M2 sized medical gas cylinder. In yet other embodiments, the nitric oxide source 110 comprises any suitable mini gas cylinder configured for ease of transport and configured to be used with the described systems.

In yet other embodiments, the nitric oxide source 110 can comprise any suitable device or any other suitable apparatus configured to generate and/or store nitric oxide.

In some embodiments, the air source 120 comprises any suitable air, including without limitation, atmospheric air, compressed air, and/or any other suitable blend of air and/or other gas configured for patient use. In some embodiments, the air source 120 comprises pressurized air gas. In other embodiments, the air source 120 comprises pressurized oxygen gas. In yet other embodiments, the air source 120 comprises a blend of gases configured to be administered to a patient 150. In some embodiments, the air source 120 comprises one or more of oxygen, nitrogen, or other atmospheric gases. In other embodiments, the air source 120 comprises one or more containers configured to contain air, including without limitation, pressurized cylinders of air. In yet other embodiments, the air source 120 comprises a hospital air source, including without limitation, a medical piped gas system. In still other embodiments, the air source 120 can comprise any other suitable source of air that can be used with the described systems.

In some embodiments, the air source 120 comprises one or more gas cylinders of any suitable dimension, volumetric capacity or weight, including, without limitation, cylinders of the following standard sizes: M2, M4 (or A), ML6 (or B), M7, M9 (or C), D, JD, E, M60, M, H (or T), J, G, LL and/or any other suitable known or novel size. In some embodiments, the air source 120 comprises one or more pressurized cylinders with a diameter of about 2 inches or less, about 2.5 inches or less, about 3.2 inches or less, about 4.3 inches or less, about 5.3 inches or less, about 7.3 inches or less, about 8 inches or less, about 9.3 inches or less, about 21 inches or less, and/or any other suitable diameter. In some embodiments, the air source 120 comprises one or more pressurized cylinders with a height of about 4 inches or less, about 5.3 inches or less, about 7.5 inches or less, about 8.5 inches or less, about 9 inches or less, about 11.5 inches or less, about 12 inches or less, about 16.5 inches or less, about 23 inches or less, about 25.5 inches or less, about 36 inches or less, about 50 inches or less, about 52 inches or less, about 62 inches or less, about 67 inches or less and/or any other suitable height. In some embodiments, the air source 120 comprises one or more pressurized cylinders with a water capacity of about 0.05 L or less, about 0.1 L or less, about 0.2 L or less, about 0.3 L or less, about 0.7 L or less, about 1.0 L or less, about 1.2 L or less, about 1.4 L or less, about 1.7 L or less, about 2.9 L or less, about 3.9 L or less, about 4.6 L or less, about 10.5 L or less, about 15.7 L or less, about 21.4 L or less, about 28.9 L or less, and/or any other suitable water capacity.

In some embodiments, the air source 120 comprises one or more containers comprising any suitable material effective for containing air. Indeed, in some embodiments, the containers comprise one or more of steel, stainless steel, aluminum, polymer, fiber-reinforced polymer, carbon fiber, filament wound carbon fiber, composite fiber overwrapped metal, fiberglass composite, fiber-reinforced polymer, metal composites, ceramic composites, and/or any other suitable material or materials.

In some embodiments, the air source 120 comprises one or more containers of air filled at any suitable pressure. Indeed, in some embodiments, the air source 120 comprises one or more gas cylinders configured to contain a gas at a pressure of, without limitation, about 100 psig or less, about 500 psig or less, about 1,000 psig or less, about 1,500 psig or less, about 1,650 psig or less, about 1,800 psig or less, about 2,000 psig or less, about 2,250 psig or less, about 2,500 psig or less, about 2,750 psig or less, about 3,000 psig or less, about 3,100 psig or less, about 3,250 psig or less, about 3,500 psig or less, about 4,000 psig or less, and/or any other suitable pressure.

In some embodiments, the air source 120 comprises a mixture of gases comprising oxygen. Indeed, in some embodiments, the mixture of gases comprising oxygen comprises, without limitation, at least about 1% oxygen, at least about 2% oxygen, at least about 5% oxygen, at least about 10% oxygen, at least about 20% oxygen, at least about 30% oxygen, at least about 40% oxygen, at least about 50% oxygen, at least about 60% oxygen, at least about 70% oxygen, at least about 80% oxygen, at least about 90% oxygen, at least about 95% oxygen, at least about 99% oxygen, at least about 99.5% oxygen, and/or any other suitable concentration. In other embodiments, the air source 120 comprises a mixture of oxygen and one or more inert and/or non-reactive gases. The one or more inert and/or non-reactive gases can include one or more of nitrogen, helium, neon, argon, krypton, nitrous oxide, anesthesia gas, and/or any another suitable gas. In some embodiments, the air source 120 comprises oxygen at any suitable concentration.

In some embodiments, the air source 120 comprises one or more mini gas cylinders configured for ease of transport, including, without limitation, one or more M2 sized medical gas cylinders. The M2 sized medical gas cylinder can comprise an aluminum cylinder of a diameter of about 2.5 inches and a height without valve of about 5.3 inches (or any other suitable size. In some embodiments, the M2 sized gas cylinder comprises a water capacity of about 0.3 L or less and is configured to contain a gas a pressure of about 3,300 psig or less (e.g., about 3,000 psig or less). In other embodiments, the air source 120 comprises a mini gas cylinder that is smaller in capacity than the M2 sized medical gas cylinder. In yet other embodiments, the air source 120 comprises any suitable mini gas cylinder configured for ease of transport.

The nitric oxide source 110 can further comprise a nitric oxide regulator 112. While the nitric oxide regulator 112 can function in any suitable manner, in some embodiments, the nitric oxide regulator 112 is configured to regulate a pressure of a nitric oxide gas as it is dispensed from the nitric oxide source 110 through a nitric oxide line 115 to a gas analyzer 200. In other embodiments, the nitric oxide regulator 112 is further configured with one or more manual shutoff valves.

In some embodiments, the gas analyzer 200 is configured to meter a flow of nitric oxide received from the nitric oxide line 115 and dispensed through a metered nitric oxide line 205. In some embodiments, the gas analyzer 200 is configured to meter the flow of nitric oxide dispensed through the metered nitric oxide line 205 such that the flow and/or concentration of nitric oxide is maintained between an upper and a lower concentration threshold. In other embodiments, the gas analyzer 200 is configured to measure, record, and/or analyze concentrations of one or more of a therapeutic gas and/or a medically relevant gas, including without limitation, nitric oxide, nitrogen dioxide, and oxygen. In yet other embodiments, the gas analyzer 200 is configured to measure, record, and/or analyze flowrates. Nitric oxide can flow through the metered nitric oxide line 205 to a patient delivery unit 140. In other embodiments, the nitric oxide regulator 112 further comprises a flow meter configured to meter flow of nitric oxide dispensed through nitric oxide line 115. In yet other embodiments, the nitric oxide regulator 112 is configured to regulate a pressure of a nitric oxide gas as it is dispensed from the nitric oxide source 110 such that the nitric oxide regulator 112 dispenses nitric oxide gas at a suitable pressure through the nitric oxide line 115 to the gas analyzer 200 (e.g., at a pressure of between about 5 psig and about 100 psig, or any suitable range thereof, such as about 50 psig+/−20 psig).

In some embodiments, the air source 120 further comprises an air regulator 122. In some embodiments, the air regulator 122 is configured to regulate a pressure of an air gas as it is dispensed from the air source 120 through the air line 125 to a ventilating unit 130. In other embodiments, the air regulator 122 is further configured with a manual shutoff valve. In yet other embodiments, the air regulator 122 further comprises a flow meter configured to meter flow of air dispensed through the air line 125.

In some embodiments, the ventilating unit 130 is optionally configured to mechanically move breathable air into and out of lungs of the patient 150. The ventilating unit 130 can also be configured to provide the mechanism of breathing for a patient who is physically unable to breathe and/or breathing insufficiently. The ventilating unit 130 can also be part of an anesthesia machine. In other embodiments, the ventilating unit 130 can comprise one or more of a positive pressure ventilator, mechanical ventilator, neonatal ventilator, biphasic cuirass ventilator, negative pressure ventilator, and/or similar devices. While airflow from the ventilating unit 130 to the patient delivery unit 140 can be accomplished in any suitable manner, in some embodiments, air can flow from the ventilating unit 130 to the patient delivery unit 140 via line 135. In other embodiments (not shown), the ventilating unit 130 can be configured to return exhaled air from the patient 150 to the ventilating unit 130. In yet other embodiment, the ventilating unit 130 can further comprise a humidifier (not shown) configured to maintain a desired level of humidity within the air delivered to the patient 150. In some embodiments, the humidifier is configured to reduce the risk of condensation within the delivery lines between the ventilating unit 130 and the patient 150.

In some embodiments, the patient delivery unit 140 is configured to deliver the blended gas mixture to the patient 150 in any suitable manner. For example, patient delivery unit 140 can be configured as a breathing mask configured to fit over and/or into the nose and mouth of the patient 150. The breathing mask can be configured to receive nitric oxide from the metered nitric oxide line 205 and air from the air line 125, blend the gases to generate a blended gas mixture, and/or dispense the blended gas mixture to the patient 150 for inhalation. In other embodiments, the delivery unit 140 is configured to deliver the blended gas mixture to the patient 150 in a manner that the patient 150 can inhale the blended gas mixture. In yet other embodiments, the delivery unit 140 is configured as one or more of a respiratory mask, a breathing mask, nasal cannula, breathing tube, intubation tube, oxygen tent, neonatal incubator or any other suitable device.

The patient delivery unit 140 can be configured to generate a blended mix of gases comprising nitric oxide received from the metered nitric oxide line 205 and the air line 135. In some embodiments, the patient delivery unit 140 comprises a separate enclosed container configured to allow received gases to blend and thereby generate a blended gas mixture. In other embodiments, the patient delivery unit 140 is configured such that blending of gases occurs primarily by diffusion within the enclosed container. In yet other embodiments, the enclosed container is configured with one or more of venturi, fins, gratings and any other suitable structures configured to promote blending of gases. In some embodiments, the patient delivery unit 140 is configured with a fan, a blower, or other suitable device to promote blending of gases. In other embodiments, the patient delivery unit 140 is configured with additional gas input lines to add additional gases to the blended gas mixture.

In some embodiments, the system 100 comprises an optional pump, tank, manual bagging unit, and/or any other device suitable for delivering the blended gas mix to the patient. Indeed, in some embodiments, the system 100 comprises a manual bagging unit 142 that is connected to the delivery unit 140. In other embodiments, the manual bagging unit 142 is configured as a bag valve mask, Ambu bag, manual resuscitator, hyperinflation bagger, self-inflating bag and/or any other suitable device configured to provide positive pressure ventilation to the patient 150. While the manual bagging unit can perform any suitable function, in some embodiments, the manual bagging unit 142 is configured to allow for delivery of the blended gas mix in the event of failure of the ventilating unit 130. In the event of failure of the ventilating unit 130 and/or the gas analyzer 200, a medical practitioner can employ the manual bagging unit 142 to continue delivery of the blended gas mix and/or air.

In some embodiments, other configurations of the system 100 are possible. For example, the patient delivery unit 140 can be configured with a separate blending unit configured to receive air and nitric oxide and to blend the gases to generate a blended gas mix. In other aspects, the system 100 can deliver a blended gas mix to the patient 150 without a ventilating unit 130.

In some embodiments, the system 100 further comprises a gas sampling line 145 connecting the delivery unit 140 to the gas analyzer 200. The gas sampling line 145 can be configured to allow the gas analyzer 200 to draw a sample of the blended gas mixture from the delivery unit 140. The gas sampling line 145 can be configured with one or more in-line humidity filters. Accordingly, in some embodiments, the gas analyzer 200 can analyze the blended gas mixture.

While the gas analyzer 200 can perform any suitable function, in some embodiments, the gas analyzer 200 is configured to analyze the blended gas mixture to determine a level of nitric oxide in the blended gas mixture. In other embodiments, the gas analyzer 200 is configured to determine a concentration of nitric oxide in the blended gas mixture. In yet other embodiments, the gas analyzer 200 is configured to determine a concentration of one or more of nitric oxide, nitrogen dioxide, oxygen and or any other suitable gas or gases. In some embodiments, because nitric oxide can react with oxygen to form nitrogen dioxide and because nitrogen dioxide can be harmful to the patient 150, the gas analyzer 200 is configured to monitor and/or display the concentration of nitrogen dioxide. In some embodiments, the gas analyzer 200 also is configured to trigger an alarm if nitrogen dioxide concentrations exceed one or more threshold values.

In some embodiments, the gas analyzer 200 is configured to meter the flow of nitric oxide through the metered nitric oxide line 205 based on the concentration of nitric oxide in the blended gas mixture. In other embodiments, the gas analyzer 200 is configured to determine the concentration of nitric oxide in the blended gas mixture and then to determine if the concentration of the nitric oxide falls between one or more upper concentration thresholds and one or more lower concentration thresholds. In some configurations, if the nitric oxide concentration is below a desired lower concentration threshold, the gas analyzer 200 can increase the flow of nitric oxide through the metered nitric oxide line 205. In other configurations, if the nitric oxide concentration is above a desired upper concentration threshold, the gas analyzer 200 can decrease the flow of nitric oxide through the metered nitric oxide line 205. In yet other embodiments, the gas analyzer 200 is configured to gradually decrease the flow of nitric oxide through the metered nitric oxide line 205 to ramp down the concentration of nitric oxide from an upper threshold value to a lower threshold value over an adjustable length of time. In some embodiments, the gas analyzer 200 is configured to gradually increase the flow of nitric oxide through the metered nitric oxide line 205 to ramp up or otherwise modify the concentration of nitric oxide from a lower threshold value to an upper threshold value over an adjustable length of time. In some aspects, because abrupt cessation of nitric oxide administration can be harmful or fatal, the gas analyzer 200 can be configured to safely ramp down or otherwise modify the concentration of nitric oxide over a safe length of time.

In some embodiments, the described system 100 further comprises additional regulators, pressure gauges, transducers, check valves, ball valves, valves, solenoid valves, 3-way solenoids, hoses, lines, valves, connectors, quick-disconnect fittings, adapters, flow meters and/or other suitable components. In other embodiments, the patient 150 comprises an adult human, an adolescent human, an infant human, and/or a neonatal human. In yet other embodiments, the patient 150 comprises a veterinary animal, a livestock animal, a primate animal, and/or a neonatal animal.

Figure 2:
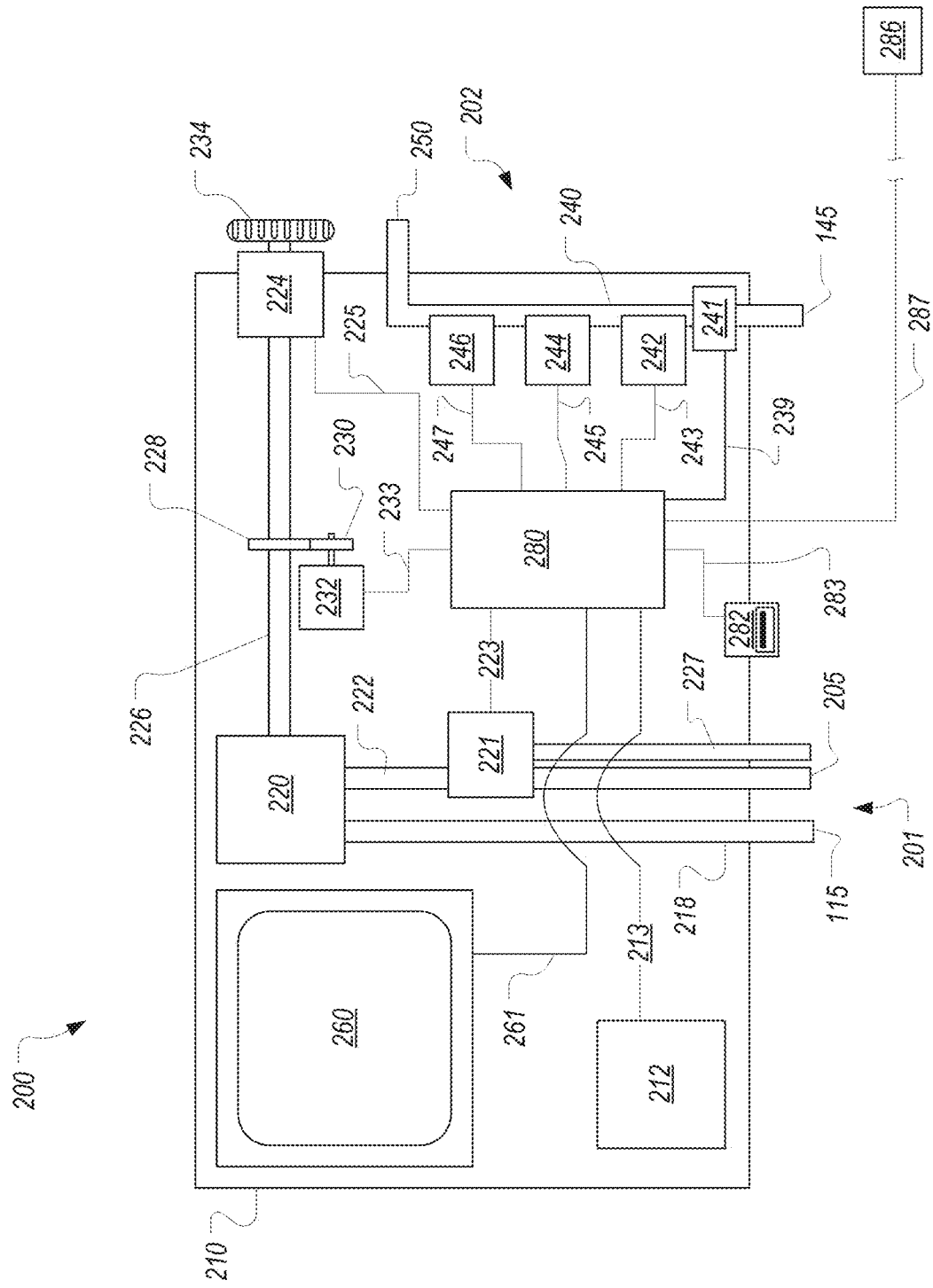
FIG. 2 illustrates some embodiments of a gas analyzer.

Referring to FIG. 2, some embodiments of the gas analyzer 200 are illustrated. In some embodiments, the gas analyzer 200 comprises a housing 210 configured to contain and secure components that are part of the gas analyzer 200. In other embodiments, the housing 210 can comprise any suitable material, including without limitation, acrylonitrile butadiene styrene (ABS) plastic and/or any other suitable material. In yet other embodiments, the housing 210 comprises one or more of plastic, fiberglass, aluminum, carbon fiber, wood, metals, ceramics, polymers, and/or other suitable materials. In some embodiments, the housing 210 is configured such that the gas analyzer 200 is portable. In other embodiments, the housing 210 can be configured such that gas analyzer 200 can be carried by one hand. In some configuration, the housing 210 is configured with an integral handle such that a user can carry the gas analyzer 200 with one hand. In other configurations, the housing 210 is configured to be detachably mounted to a bed rail, bed post hook, and/or any other suitable support. In yet other configurations, the housing 210 comprises an outer surface configured to be easily cleaned and/or sterilized. In some embodiments, the housing 210 is configured such that the gas analyzer 200 is water resistant (e.g., at an International Protection Marking (IEC standard 60529)) rating of at least IPX4 (splashing of water) or any other suitable level). In other embodiments, the housing 210 is configured to meet or exceed medical safety requirements of ISO 60601 and/or any other suitable standards. In other embodiments, the housing 210 is configured to meet or exceed FDA GMP requirements for a medical device.

In some embodiments, the gas analyzer 200 further comprises a power supply 212. The power supply 212 can be configured to supply power to the gas analyzer 200. While the power supply 212 can comprise any suitable power source, including without limitation, an electrical connection to an electrical power grid, a non-rechargeable battery, a rechargeable battery, a generator, and/or any other suitable power source, in some embodiments, the power supply 212 comprises a rechargeable battery unit configured to be disposed within the housing 210. The rechargeable battery unit can be configured to provide backup support for any suitable period of time (e.g., between 10 seconds and 100 hours, or any suitable range thereof). In yet other embodiments, the power supply 212 comprises an adapter to connect the gas analyzer 200 to commercial electrical power. In some embodiments, power supply 212 comprises an adapter configured to connect the gas analyzer 200 to a 12 volt and/or a 24 volt direct current supply. In other embodiments, power supply 212 comprises one or more photovoltaic cells. In yet other embodiments, one or more lines 213 connect power supply 212 to components of the gas analyzer 200 requiring electrical power.

In some embodiments, the gas analyzer 200 can comprise a nitric oxide metering circuit 201, a gas sampling circuit 202, a user interface 260, an external patient monitor 286, and/or a controller 280. In some embodiments, nitric oxide from the nitric oxide line 115 can enter the nitric oxide metering circuit 201 through a nitric oxide intake line 218. Nitric oxide can then pass through the nitric oxide intake line 218 into a metering valve 220. The metering valve 220 can be configured to meter the flow of nitric oxide through the nitric oxide metering circuit 201. Nitric oxide can then pass through the metering valve 220 and into a nitric oxide dispensing line 222. The metered nitric oxide can flow through the nitric oxide dispensing line 222 into the metered nitric oxide line 205.

In some embodiments, the metering valve 220 is configured to be controlled in any suitable manner by an electrical device. In some aspects, the metering valve 220 is configured to be controlled by a motor 224 (e.g., a stepper motor). In other aspects, motor 224 can be connected to the metering valve 220 via any suitable linkage, couple, belt, shaft, and/or any other suitable linkage. In some embodiments, motor 224 can be connected to the metering valve 220 via a valve shaft 226. The motor 224 can be configured to selectively rotate the valve shaft 226 to open and close an aperture of the metering valve 220. As the motor 224 selectively opens or closes the aperture of the metering valve 220, the flow of nitric oxide through the metering valve 220 increases or decreases, respectively.

In some embodiments, the metering valve is coupled to a potentiometer. While this coupling can occur in any suitable manner, in some embodiments, the valve shaft 226 can further comprise a valve gear 228 configured to rotate with the valve shaft 226. In some embodiments, the valve gear 228 is configured to selectively rotate a potentiometer gear 230 such that a rotation of the valve gear 228 can be transferred to a rotation of the potentiometer gear 230. The potentiometer gear 230 can be connected to a potentiometer 232. The potentiometer 232 can be configured to transform the rotation of the valve shaft 226 into an electrical signal corresponding to a size of the aperture of the metering valve and the corresponding flow rate of the nitric oxide.

In some embodiments, the nitric oxide metering circuit 201 also optionally comprises a manual metering valve dial 234 configured to allow a user to manually rotate the valve shaft 226. In some embodiments, the manual metering valve dial 234 is configured to function as an override mechanism that allows a user to manually adjust the metering valve. In some cases, the manual metering valve dial 234 can allow a user to manually adjust the metering valve in the event of a failure of the gas analyzer 200 or in the event of a disruption of power to the gas analyzer 200.

In some embodiments, the nitric oxide metering circuit 201 comprises a purge valve 221 connected to the nitric oxide dispensing line 222. The purge valve 221 can function in any suitable manner that allows it to selectively purge gas from the nitric oxide metering circuit 201. Indeed, in some embodiments, the purge valve 221 can comprise a three way diverting valve, or any other suitable valve, controlled by the controller 280 via one or more connections 223. In other embodiments, the purge valve 221 is activated to divert nitric oxide flow from metered nitric oxide line 205 to an exhaust port 227. Purge valve 221 can be activated to purge air, nitric oxide, nitrogen dioxide, and/or any other suitable gas from nitric oxide dispensing line 222.

In some embodiments, the gas sampling circuit 202 is configured to analyze a sample of blended gas drawn from delivery unit 140. In other embodiments, the gas sampling circuit 202 is configured to determine the concentration of nitric oxide in the blended gas mixture. In yet other embodiments, the gas sampling circuit 202 is configured to determine the concentration of nitrogen dioxide in the blended gas mixture. In some embodiments, the gas sampling circuit 202 is configured to determine the concentration of oxygen in the blended gas mixture.

In some embodiments, the gas sampling circuit 202 comprises a gas sampling circuit line 240 configured to receive blended gas from delivery unit 140 via gas sampling line 145. In some embodiments, the blended gas flows from the gas sampling line 145 through the gas sampling circuit line 240 and exits to atmosphere through a gas exhaust 250. The gas sampling circuit 202 can also comprise a sampling pump 241 configured to draw blended gas mix from the gas sampling line 145 through a gas sampling circuit line 240 and to exit to atmosphere through gas exhaust 250. Sampling pump 241 can be controlled by controller 280 via one or more connections 239. In some embodiments, the sampling pump 241 comprises one or more suitable pumps, which may include, but are not limited to an air compressor and/or a diaphragm pump. In some embodiments, the sampling pump 241 is configured to draw in the blended gas mix at any suitable rate, including, but not limited to a rate of about 375 cc/min (cubic centimeters per minute). In other embodiments, the sampling pump 241 is configured to draw in the blended gas mix at a rate of between about 0.1 cc/min to about 1000 cc/min, and any intervening subrange therebetween.

The gas sampling circuit 202 can further comprise an array of one or more sensors configured to determine concentrations of individual gases in the blended gas mixture. In some embodiments, the array of sensors comprises one or more of a nitric oxide sensor 242, a nitrogen dioxide sensor 244, an oxygen sensor 246, and/or any others suitable sensor. In other embodiments, the nitric oxide sensor 242, the nitrogen dioxide sensor 244, and the oxygen sensor 246 are configured to determine the concentrations of nitric oxide, nitrogen dioxide, and oxygen, respectively, within the blended gas mixture. In yet other embodiments, the array of sensors comprises other sensors configured to determine the concentrations of other gases, including, but not limited to nitrogen, carbon monoxide, ozone, and carbon dioxide. In some embodiments, the array of sensors further comprises one or more analog-to-digital converters configured to transform analog signals generated by one or more of the sensors (e.g., sensors 242, 244, 246) to digital signals. In some embodiments, one or more of the sensors is configured with any suitable response to a step change in nitric oxide concentration. Indeed, in some embodiments, one or more of the sensors is configured with about a 10% to about a 99.9% response (or any suitable subrange thereof, such as 90%+/−5%) to a step change in nitric oxide concentration in a time frame of between about 0.1 and about 120 seconds (or any suitable subrange thereof, such as 30 seconds+/−10 seconds).

In some embodiments, the nitric oxide sensor 242 comprises one or more of any suitable sensor configured to determine a total concentration of nitric oxide gas in a sample of gas. The nitric oxide sensor 242 can comprise an electrochemical sensor or any other suitable sensor configured to determine a total concentration of nitric oxide gas in a sample of gas. The nitric oxide sensor 242 can comprise an electrochemical sensor equipped with one or more Ag/AgCl electrodes or any other suitable electrodes. In other embodiments, nitric oxide sensor 242 can comprise one or more of a wet sensor, a dry carbon fiber sensor, and/or any other suitable sensor.

In some embodiments, the nitrogen dioxide sensor 244 comprises one or more of any suitable sensor configured to determine a total concentration of nitrogen dioxide gas in a sample of gas. The nitrogen dioxide sensor 244 can comprise an electrochemical sensor or any other suitable sensor configured to determine a total concentration of nitrogen dioxide gas in a sample of gas. The nitrogen dioxide sensor 242 can comprise an electrochemical sensor equipped with one or more ceramic type metal oxide electrodes.

In some embodiments, the oxygen sensor 246 comprises one or more of any suitable sensor configured to determine a total concentration of oxygen gas in a sample of gas. The oxygen sensor 246 can comprise an electrochemical sensor or any other suitable sensor configured to determine a total concentration of oxygen gas in a sample of gas. The oxygen sensor 246 can comprise one or more of an electrochemical cell, a galvanic cell, a galvanic fuel cell, a Clark-type electrode, an oxygen electrode, and/or any other suitable device.

In some embodiments, one or more of the nitric oxide sensor 242, the nitrogen dioxide sensor 244, and/or the oxygen sensor 246 comprise one or more electrode sensors. The electrochemical sensors can be configured to utilize a voltage supplied across the electrode to facilitate the measurement of the respective gas concentration. In some embodiments, a change in the voltage is measured and is proportional to the concentration of the respective gas concentration. The applied voltage can be modified to provide linearity across the measurement range of the electrode sensor. In other embodiments, the applied voltage is modified to increase a dynamic range and/or sensitivity of the electrode sensor. In yet other embodiments, the applied voltage is increased to increase the dynamic range and/or sensitivity of the electrode sensor.

In some embodiments, the user interface 260 is configured to display concentrations of one or more individual gases in the blended gas mixture. In other embodiments, the user interface 260 is configured to receive input from the user such as one or more upper and lower threshold limits for one or more individual gases. In yet other embodiments, the user interface 260 is configured to display concentrations of one or more individual gases in the blended gas mixture in comparison to one or more upper and lower threshold limits. In some embodiments, the user interface 260 is configured to display alarm conditions to indicate when concentrations of individual gases in the blended gas mixture are not between specific upper and lower threshold limits. In other embodiments, the user interface 260 is configured to display a progressive average measurement for each of the individual gas concentrations in the blended gas mixture.

The user interface 260 can comprise any suitable component that allows a user to enter input to the controller 280, to receive data from the controller 280, to be notified of an alarm condition, to enter one or more upper and/or lower thresholds, to enter a desired concentration for one or more gases, and/or to view a charge state of a rechargeable battery unit. Some examples of such components include, but are not limited to, one or more displays, one or more data entry devices, one or more buttons, switches, knobs, and/or levers, and/or speakers, alarms, bells, whistles, and/or any other suitable component. In some embodiments, the user interface 260 comprises any suitable interface (e.g., any suitable touch screen and/or any other interface). In some embodiments, the user interface 260 comprises a touch screen display configured to display data to the user and configured to receive input from the user. In some embodiments, the user interface 260 comprises a touch screen display configured to be operable by the user while wearing gloves. In other embodiments, the user interface 260 comprises one or more of a computer display, a computer monitor, an LED display, an LCD panel display, a CRT monitor, an OLED monitor, and/or other suitable display. In yet other embodiments, the user interface 260 comprises a keyboard, an array of electronic buttons, a computer mouse, a stylus, trackball, light pen, other pointing device, a microphone, a joystick, a game pad and/or other suitable input devices. In some embodiments, user interface 260 comprises a tablet computer. In other embodiments, user interface 260 comprises one or more speakers or loudspeakers configured to provide audible cues to the user regarding operation and/or current state of the gas analyzer, concentrations of individual gases in the blended gas mixture, alarm conditions (such as when upper and lower threshold limits have been exceeded), and/or other relevant information. In yet other embodiments, user interface 260 comprises one or more lights, LEDs, strobe lights, LCDs, and/or other devices configured to provide visual cues to the user regarding operation and/or current state of the gas analyzer, concentrations of individual gases in the blended gas mixture, alarm conditions such as when upper and lower threshold limits have been exceeded, and/or other relevant information.

In some embodiments, the user interface 260 can further comprise one or more status lights configured to communicate a status of the gas analyzer 200 to the user. In some cases, the status lights comprise white and/or colored lights. In some aspects, the status lights comprise LED lights. In other embodiments, the status lights comprise any suitable number of LED lights (e.g., 1, 2, 3, 4, 5, 6, or more) configured to communicate system power, system status, and/or battery status. The lights can be configured to blink or flash intermittently to indicate an alarm or warning status. For example, a green system power light (or other suitable color) can be activated to indicate that the system is powered on and that startup has been initialized. A system status light can be activated with an amber color (or other suitable color) to indicate system boot up and initialization and with another light (e.g., green light) to indicate startup process as complete. A battery status light can be activated with a desired color (e.g., amber or otherwise) to indicate a fast charge of the battery is occurring, a blinking light (e.g., a green light) to indicate a final charge, and a steady green light to indicate full charge. In other embodiments, other colors and arrangements of status lights can be employed.

The user interface 260 can be disposed in any suitable location that allows it to function as intended. In some embodiments, the user interface 260 comprises a touch screen display (or any other suitable interface) disposed on an outer surface of the housing 210. In some embodiments, the touch screen display is configured to be hinged on its bottom edge such that the user interface 260 is engaged against the surface of the housing 210 in a closed position. The touch screen display can then be pivoted about the hinged edge to allow the touch screen display to tilt away from the surface of the housing 210 into an opened position. The touch screen can be configured to operate in both the closed position and the opened position. In some instances, the closed position is configured to operate when the gas analyzer 200 is mounted and/or used vertically. In other instances, the opened position is configured to operate when the gas analyzer 200 is mounted and/or used horizontally. In other embodiments, the touch screen is configured with a swivel and/or any other suitable component that allows the user to change a viewing angle of the touch screen.

In yet other embodiments, the user interface 260 is configured with an intuitive interface that comprises one or more of constant alarm monitoring, manual and automatic delivery of nitric oxide to the patient, large visual sensor readouts, manual and auto alarm range delivery settings, locking screen settings, user settable security lock-outs, drop down menus, operator instructions, calibration instructions, graphic representations of alarm and delivery histories and/ or any other suitable features. In some embodiments, the user interface 260 is configured such that if the user selects an invalid input, the automatic delivery mode will revert to manual delivery mode.

In other configurations, where the delivery selection is greater than a set limit (e.g., 5%, 10%, 15%, 20%, and/or any other suitable limit) of the setting or a hazardous change in delivery concentration has been input, an alarm will be triggered and the adjustment will be prevented. In yet other embodiments, the user interface is configured such that the size of displayed information can be increased and/or decreased by the user. While this can be done in any suitable manner, in some embodiments, it is done by the user employing two finger touch to stretch and/or shrink the size of the displayed information.

The controller 280 can comprise any suitable computing device, including without limitation, a computer, a laptop, a handheld computing device, a tablet computer, a smartphone, and/or any other suitable computing device. In some embodiments, the controller 280 comprises a computing device that is specifically tailored for use with the gas analyzer 200. Indeed, in some embodiments, the controller 280 is configured as a specific purpose machine to control the gas analyzer 200. In other embodiments, the controller 280 is configured as a special purpose machine to display data and receive inputs from the user interface 260. In yet other embodiments, the controller 280 is configured as a special purpose machine to control the gas sampling circuit 202 to determine concentrations of individual gases in the blended gas mixture. In some embodiments, the controller 280 is configured as a special purpose machine to control the nitric oxide metering circuit 201 to meter the flow of nitric oxide through the metering valve 220. In other embodiments, the controller 280 is configured as a special purpose machine to control the nitric oxide metering circuit 201 to meter the flow of nitric oxide based on concentrations of individual gases as determined by gas sampling circuit 202.

In some embodiments, the controller 280 can communicate with the motor 224 or any other suitable component (e.g., via the connection 225 or otherwise). In other embodiments, the controller 280 communicates with the potentiometer 232 (e.g., via a connection 233, or otherwise). In yet other embodiments, the controller 280 communicates with the nitric oxide sensor 242 (e.g., via connection 243, or otherwise). In some embodiments, the controller 280 communicates with the nitrogen dioxide sensor 244 (e.g., via connection 245, or otherwise). In other embodiments, the controller 280 communicates with oxygen sensor 246 (e.g., via communication 247, or otherwise). In some embodiments, the controller 280 communicates with user interface 260 (e.g., via connection 261).

In some embodiments, the controller 280 further comprises one or more data ports 282. While the data port 282 can perform any suitable function, in some embodiments, the data port 282 communicates with the controller 280 (e.g., via connection 283, or otherwise). In some embodiments, the data port 282 is configured to transmit data from the controller 280 to an external data memory device. In this regard, the data port 282 can be configured to (for example) transmit data from the controller 280 to an external data memory device in the form of run histories, alarm histories, concentrations recorded during a run, screen shots of graphs, and/or any other suitable form. In some embodiments, the external data memory device can comprise a flash memory device such as a universal serial bus (USB) flash drive and/or any other suitable flash memory. In other embodiments, the external data memory device comprises one or more of a non-volatile computer storage medium, memory cards, solid-state drives, compact flash drives, SD cards, and/or similar devices.

In some embodiments, the data port 282 is configured to communicate with an external computing device, such as a laptop computer, tablet computer, and/or any other suitable computing device. In other embodiments, controller 280 comprises one or more serial ports, parallel ports, a firewire (IEEE 1394), and/or other similar ports configured to permit communication between an external computing device and controller 280.

In some embodiments, one or more external patient monitors 286 are configured to measure one or more basic functions of a patient's body. In other embodiments, the external patient monitor 286 is configured to measure basic functions of a patient's body and to communicate this data to the controller 280. In some embodiments, the external patient monitor 286 communicates with the controller 280 (e.g., via connection 287, or otherwise). In yet other embodiments, the controller 280 uses the data from the monitor 286 to meter the flow of nitric oxide. For example, if the data from the monitor 286 indicates that the patient 150 is receiving an excess of nitric oxide, the controller 280 can decrease the flow of nitric oxide (e.g., by decreasing the size of the aperture of the metering valve 220). Likewise, if the data from the monitor 286 indicates that the patient 150 is not receiving enough nitric oxide, in some embodiments, the controller 280 increases the flow of nitric oxide (e.g., by increasing the aperture of the metering valve 220). In similar fashion, if the data from the monitor 286 indicates that the patient 150 is in distress or at risk for being in distress, the controller 280 can perform one or more functions of notifying the user with an alarm condition, adjusting the flow of nitric oxide accordingly, ceasing, decreasing, or otherwise adjusting flow of nitric oxide, and any other suitable response. In some aspects, the data from monitor 286 is accessible from the controller 280 via data port 282 and/or otherwise.

In some embodiments, the external patient monitor 286 is configured to measure one or more vital signs of the patient 150. In other embodiments, the external patient monitor 286 can comprise one or more of a pulse oximeter, respiratory monitor, arterial blood gas monitor, heart rate monitor, body temperature monitor, capnography monitor, plethysmogram monitor, photoplethysmogram, integrated pulmonary index monitor and/or any other suitable monitor. For example, the monitor 286 can comprise a pulse oximeter monitor configured to monitor the $O_2$ saturation of the patient 150. Indeed, in some embodiments, the pulse oximeter is configured to monitor $O_2$ saturation in real-time or in near real-time and to relay this data to the controller 280. In some embodiments, the controller 280 is configured to display the $O_2$ saturation along with the concentrations of one or more individual gases in the blended gas mixture. In some embodiments, the controller 280 is also configured to monitor the $O_2$ saturation to determine if it is within one or more adjustable upper and lower threshold ranges. In some embodiments, if the $O_2$ saturation as determined and communicated by monitor 286 is outside of one or more desired upper and lower threshold ranges, the controller 280 can notify the user with an alarm condition or adjust the flow of nitric oxide. For example, if 02 saturation as determined and communicated by the monitor 286 indicates a potential over-dose of nitric oxide, the controller 280 can automatically decrease or halt the flow of nitric oxide. In other embodiments, the controller 280 can perform similar adjustments based on data from the monitor 286 related to respiration rate, heart rate, blood gas, $CO_2$ concentration, and/or other similar basic body functions of the patient 150.

Figure 3:
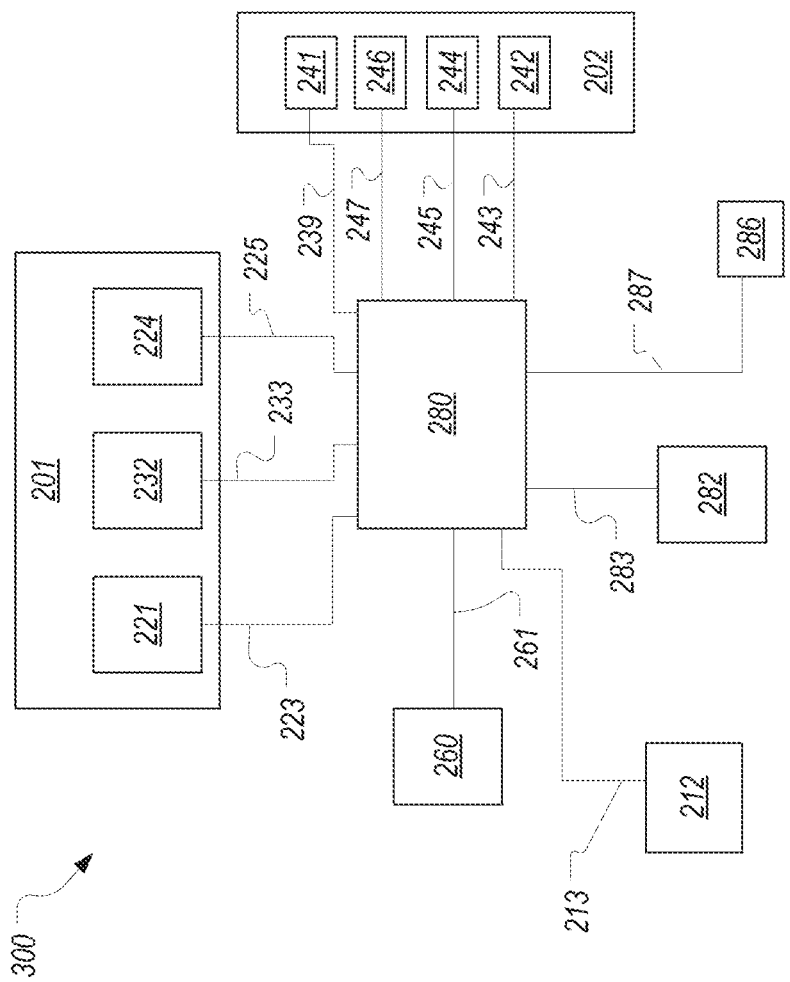
FIG. 3 illustrates a block diagram of some embodiments of a gas analyzer controller.

Referring to FIG. 3, a block diagram 300 of some embodiments of a gas analyzer 200 is shown. Where applicable, reference numbers in block diagram 300 are the same as described above for FIGS. 1 and 2. The block diagram 300 illustrates some embodiments of communication and control connections between the controller 280 and one or more of the nitric oxide metering circuit 201, the gas sampling circuit 202, the user interface 260, the monitor 286, and the data port 282. In some embodiments, each of the nitric oxide metering circuit 201, the gas sampling circuit 202, the user interface 260, the monitor 286, and the data port 282 can communicate (directly and/or indirectly) with the controller 280 and in turn be controlled by the controller 280. In other embodiments, the gas sampling circuit 202 is configured as a feedback loop to determine one or more individual gas concentrations in the blended gas mixture in real-time or in near real-time and to then control the nitric oxide metering circuit 201 to thereby meter the flow of nitric oxide. Additionally, in some embodiments, the controller 280 is configured to communicate with the user interface 260 to receive input from the user interface 260. In this aspect, some embodiments of the controller 280 are configured communicate with the user interface 260 to display individual gas concentrations in the blended gas mixture. In another aspect, some embodiments of the controller 280 are configured to receive input from the user such as one or more upper and lower threshold limits. The controller 280 can then use these one or more upper and lower threshold limits to meter the flow of nitric oxide gas. In some embodiments, the controller 280 is also configured to receive input from the user, such as nitric oxide ramp up concentrations and ramp up times and ramp down concentrations and ramp down times. Additionally, as described above, the monitor 286 can be configured as a feedback loop to allow the controller 280 to increase, decrease, or otherwise adjust nitric oxide flow based on data received from the monitor 286 (or any other suitable source).

For example, a user may employ the gas analyzer 200 as part of the system 100 to administer a blended gas mixture to a neonatal patient 150. After securing the delivery unit 140 over the mouth and nose of the patient 150, the user can begin air flow from the air source 120. The user can then activate the gas analyzer 200 to begin metered flow of nitric oxide to generate the blended gas mixture. The user can input into the gas analyzer 200, via the user interface 260, the desired upper and lower concentration thresholds for nitric oxide concentration within the blended gas mixture. The user can also input a desired target nitric oxide concentration and a ramp up time and/or rate to achieve the desired target nitric oxide concentration. In this example, the controller 280 then meters the flow of nitric oxide in the blended gas mixture using the nitric oxide metering circuit 201. The controller 280 also uses the gas sampling circuit 202 to determine the individual gas concentrations to control the nitric oxide metering circuit 201 to either increase or decrease the flow of nitric oxide during the ramp up time as appropriate. In this example, the ramp up in nitric oxide concentration can be linear and/or can be non-linear as desired by the user. Once the desired target concentration is reached, the controller 280 can notify the user via the user interface 260 and then maintain the desired target concentration between the upper and lower concentration thresholds.

In this example, after the desired time of administration of the blended gas mixture has been achieved, the user can input desired ramp down times, rates and/or concentrations via the user interface 260. The controller 280 can then ramp down the concentration of nitric oxide in the blended gas mixture to end the administration of blended gas mixture. In other aspects, the length of administration and/or ramp down concentration, rate, and/or time can be pre-input into the controller 280. Throughout the administration, if any individual gas concentration exceeds an upper or lower concentration threshold, the controller can notify the user with an alarm via the user interface 260. Likewise, the controller 280 can indicate an alarm condition for any of incorrect ramp up time or concentration, incorrect ramp down time or concentration, failure of the gas analyzer 200, incorrect length of time of administration, patient 150 distress, incorrect pressure, incorrect flow rate, power failure, battery failure, and/or any other such occurrence. At any point prior to, during, and/or after the end of the administration of the blended gas mixture, the user can insert an external memory data device into port 282 to download or otherwise transfer (e.g., wirelessly) data from the administration run. The data can include the real-time or near real-time concentrations of individual gases, the ramp up and ramp down times and concentrations, the desired target concentration, the identity and timing of any alarm conditions, and/or similar data. The data can then be added to a medical record of the patient 150 and/or used to determine a further course of treatment for the patient 150 and/or for any other suitable purpose. In some embodiments, the data is also downloadable in spreadsheet form, as graphical charts, and/or in any other suitable format.

In some embodiments systems 200 and 300 can be configured to administer a blended gas mixture comprising nitric oxide to a patient suffering from neonatal pulmonary hypertension. In this example the upper and lower nitric oxide concentration thresholds can be set to any desired limits (e.g., 100 ppm and 0 ppm, respectively).

Additionally, by way of illustration, a desired target nitric oxide concentration could be set to any suitable level (e.g., between about 0 ppm and 100 ppm). The ramp up time could be set at any suitable level (e.g., between about 0 and 60 minutes). In this example, the upper concentration threshold could be set to any suitable level (e.g., between about 10 ppm and about 200 ppm) and the lower concentration threshold could be set to any suitable level (e.g., between about 0 ppm and about 5 ppm).

In some embodiments, the gas analyzer 200 is configured to effectively analyze a nitric oxide concentration in the blended gas mixture in the concentration range of between about 0 to about 20,000 ppm nitric oxide, and any subrange thereto. For example, the gas analyzer 200 can be configured to effectively analyze a nitric oxide concentration in the blended gas mixture in the concentration range of between about 0 ppm to about 9,000 ppm or any subrange thereof. In another example, the gas analyze 200 can be configured to effectively analyze a nitric oxide concentration in the blended gas mixture in the concentration range of between about 0 ppm to about 7,000 ppm or any subrange thereof. In another example, the gas analyzer 200 can be configured to effectively analyze a nitric oxide concentration in the blended gas mixture in the concentration range of between about 1,000 ppm to about 1,500 ppm or any subrange thereof. In another example, the gas analyzer 200 can be configured to effectively analyze a nitric oxide concentration in the blended gas mixture in the concentration range of between about 1,000 ppm to about 2,000 ppm or any subrange thereof. In another example, the gas analyzer 200 can be configured to effectively analyze a nitric oxide concentration in the blended gas mixture in the concentration range of between about 2,000 ppm to about 3,000 ppm or any subrange thereof. In another example, the gas analyzer 200 can be configured to effectively analyze a nitric oxide concentration in the blended gas mixture in the concentration range of between about 2,000 ppm to about 4,000 ppm or any subrange thereof. In another example, the gas analyzer 200 can be configured to effectively analyze a nitric oxide concentration in the blended gas mixture in the concentration range of between about 2,000 ppm to about 5,000 ppm or any subrange thereof. Indeed, in some embodiments, the gas analyzer 200 is configured to accurately determine nitric oxide concentrations in the blended gas mixture at up to about 7,000 ppm+/−500 ppm.

In another example, the gas analyzer 200 can be configured to effectively analyze a nitric oxide concentration in the blended gas mixture with a lower concentration range of 0, 100, 200, 300, 400, 500, 600, 700, 800, 900, or 1,000 ppm or any subrange thereof. For example, the gas analyzer 200 can be configured to effectively analyze a nitric oxide concentration in the blended gas mixture with an upper concentration range of 1,000, 2,000, 3,000, 4,000, 5,000, 6,000, 7,000, 8,000, 9,000 ppm, or any subrange thereof. For example, the gas analyzer 200 can be configured to effectively analyze a nitric oxide concentration in the blended gas mixture with an upper concentration range of 3,100, 3,200, 3,300, 3,400, 3,500, 3,600, 3,700, 3,800, or 3,900 ppm or any subrange thereof. For example, the gas analyzer 200 can be configured to effectively analyze a nitric oxide concentration in the blended gas mixture with an upper concentration range of 4,100, 4,200, 4,300, 4,400, 4,500, 4,600, 4,700, 4,800, or 4,900 ppm or any subrange thereof. For example, the gas analyzer 200 can be configured to effectively analyze a nitric oxide concentration in the blended gas mixture with an upper concentration range of 5,100, 5,200, 5,300, 5,400, 5,500, 5,600, 5,700, 5,800, or 5,900 ppm or any subrange thereof. For example, the gas analyzer 200 can be configured to effectively analyze a nitric oxide concentration in the blended gas mixture with an upper concentration range of 6,100, 6,200, 6,300, 6,400, 6,500, 6,600, 6,700, 6,800, or 6,900 ppm or any subrange thereof.

In some embodiments, the gas analyzer 200 is configured to effectively analyze a nitrogen dioxide concentration in the blended gas mixture in the concentration range of between about 0 to about 400 ppm nitrogen dioxide, and any subrange thereto. For example, the gas analyzer 200 can be configured to effectively analyze a nitrogen dioxide concentration in the blended gas mixture in the concentration range of between about 0 ppm to about 200 ppm, and any subrange thereof. In another example, the gas analyzer 200 can be configured to effectively analyze a nitrogen dioxide concentration in the blended gas mixture in the concentration range of between about 100 ppm to about 200 ppm and any subrange thereof. In yet another example, the gas analyzer 200 can be configured to effectively analyze a nitrogen dioxide concentration in the blended gas mixture in the concentration range of between about 10 ppm to about 100 ppm and any subrange thereof. For example, the gas analyzer 200 can be configured to effectively analyze a nitrogen dioxide concentration in the blended gas mixture with an upper concentration range of 1, 2, 3, 4, 5, 6, 7, 8, 9, 10, 20, 30, 40, 50, 60, 70, 80, 90, 100, 110, 120, 130, 140, 150, 160, 170, 180, 190, or 200 ppm, or any subrange thereof.

The gas analyzer 200 can be configured to effectively analyze an oxygen concentration in the blended gas mixture in any suitable range. For example, the gas analyzer 200 can be configured to effectively analyze an oxygen concentration within a concentration range suitable for therapeutic delivery of a blended gas mixture to the patient 150. In some embodiments, the gas analyzer is configured to effectively analyze an oxygen concentration within a concentration range of between about 0 to about 100% oxygen, and any subrange thereto. In other embodiments, the gas analyzer 200 is configured to effectively analyze an oxygen concentration in the blended gas mixture in the concentration range of between about 10 to about 50% oxygen, and any subrange thereto. In yet other embodiments, the gas analyzer 200 is configured to effectively analyze an oxygen concentration in the blended gas mixture in the concentration range of about 21%+/−10%. In other embodiments, the gas analyzer 200 is configured to effectively analyze an oxygen concentration in the blended gas mixture in the concentration range of between about 0% to about 90% oxygen, and any subrange thereof. In other embodiments, the gas analyzer 200 is configured to effectively analyze an oxygen concentration in the blended gas mixture in the concentration range of between about 0 to about 80% oxygen, and any subrange thereof. In other embodiments, the gas analyzer 200 is configured to effectively analyze an oxygen concentration in the blended gas mixture in the concentration range of between about 0 to about 70% oxygen, and any subrange thereof. In other embodiments, the gas analyzer 200 is configured to effectively analyze an oxygen concentration in the blended gas mixture in the concentration range of between about 0 to about 60% oxygen, and any subrange thereof. In other embodiments, the gas analyzer 200 is configured to effectively analyze an oxygen concentration in the blended gas mixture in the concentration range of between about 0 to about 40% oxygen, and any subrange thereof.

In some embodiments, the gas analyzer 200 is configured to effectively analyze a nitric oxide concentration in the blended gas mixture with an error range of between about 0.1 ppm to about 2 ppm. In some embodiments, however, the gas analyzer 200 is configured to analyze nitric oxide in the blended gas mixture with an error range of about +/−2 ppm nitric oxide. In some embodiments, the gas analyzer 200 is configured to effectively analyze a nitrogen dioxide concentration in the blended gas mixture with an error range of between about 0.1 ppm to about 2 ppm. In other embodiments, the gas analyzer 200 is configured to effectively analyze a nitrogen dioxide concentration in the blended gas mixture with an error range of about +/−2 ppm nitrogen dioxide. In some embodiments, the gas analyzer 200 can be configured to effectively analyze an oxygen concentration in the blended gas mixture with about between 0.1% to about 5% repeatability and between about 0.1 and about 6% linearity.

Figure 4:
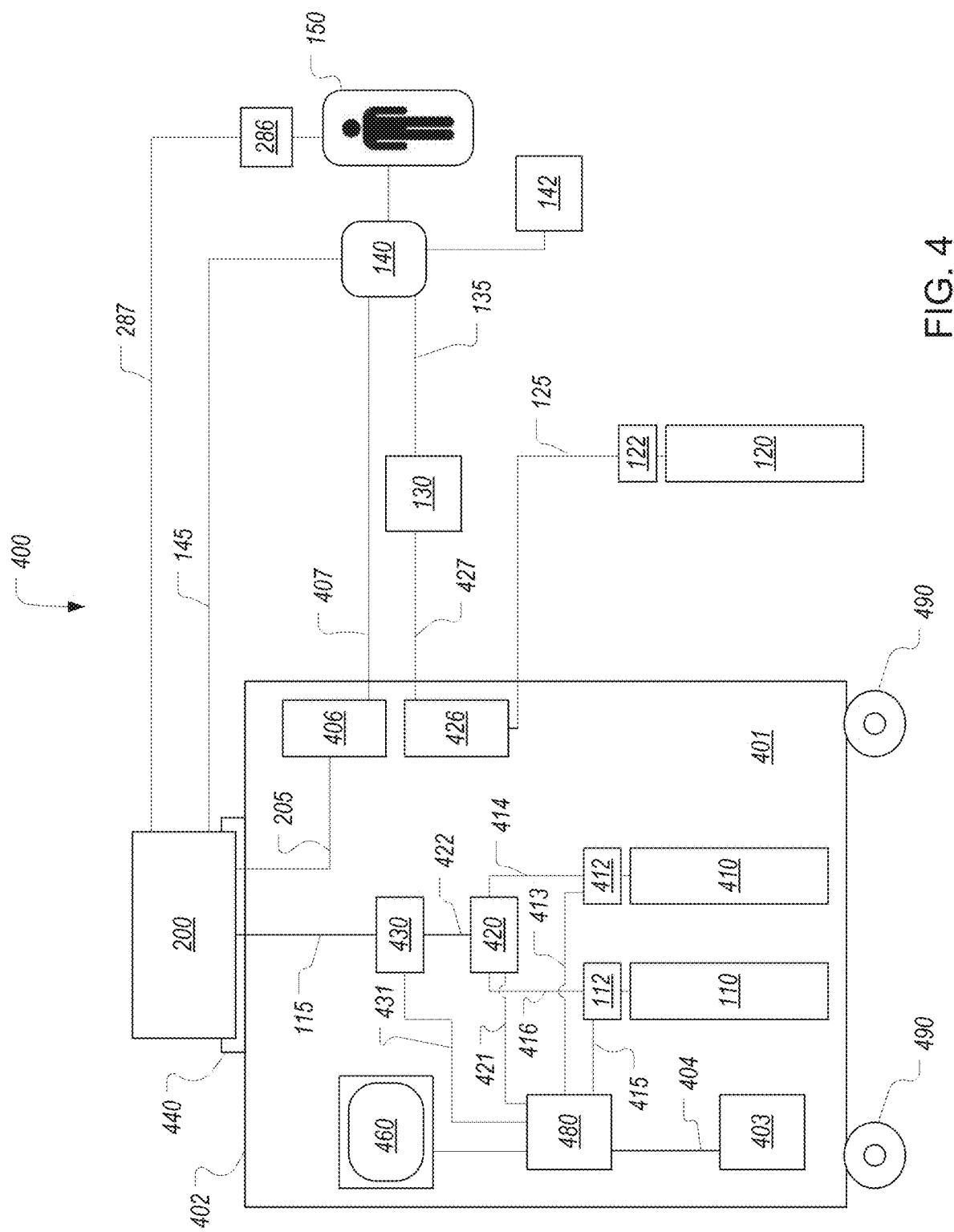
FIG. 4 illustrates some embodiments of an integrated system for analyzing and delivering nitric oxide gas to a patient.

Referring now to FIG. 4, some embodiments of an integrated system 400 for analyzing and delivering nitric oxide to a patient 150 are illustrated. Where applicable reference numbers in system 400 are the same as described above for FIGS. 1-3. Where reference numbers used in the system 400 are the same as those used previously, it can be assumed that the referenced components have similar characteristics and functions as described previously. In particular, the ventilating unit 130, the delivery unit 140, the line 135, the gas sampling line 145, the patient 150, the monitor 286, and the connection 287 are illustrated in FIG. 4 and can have the same characteristics and functions as described above. In some embodiments, the described system 400 illustrates an integrated system for analyzing and delivering nitric oxide to a patient 150 that can comprise a nitric oxide storage and dispensing system 401, the gas analyzer 200, the air source 120, the ventilating unit 130, delivery unit 140, and external patient monitor 286. The system 400 can be configured in similar function to systems 100 and 300, as described above, with the addition of the nitric oxide storage and dispensing system 401.

In some embodiments, the nitric oxide storage and dispensing system 401 can be configured to be portable and/or have the ability to be transported within a hospital, clinic, or other suitable setting (e.g., to the bedside of the patient 150). In other embodiments, the system 401 comprises a chassis or other supporting structure 402. In this regard, the chassis 402 can be configured to contain one or more of the components described herein and configured to be portable. The chassis 402 can comprise in some embodiments, any suitable material, including without limitation, aluminum, sheet metal, plastic, fiberglass, carbon fiber, wood, polymers, synthetic materials, natural materials and/or any other suitable materials. The chassis 402 comprises, in some embodiments, one or more wheels 490 configured to allow the system 401 to be moved from patient 150 to patient 150. In some embodiments, the chassis 402 is also configured with one or more doors, panels, hatches, or similar structures to allow access to one or more components of the system and/or to allow for one or more components to be isolated from the patient 150 during use. In other embodiments, a surface of the chassis 402 is configured to allow for ease of cleaning and/or sterilization.

In some embodiments, system 401 further comprises a power supply 403. The power supply 403 can be configured to supply power to the system 401. In other embodiments, the power supply 403 can comprise a rechargeable battery unit configured to be disposed within the chassis 402. The rechargeable battery unit can be configured to provide up backup support for any suitable amount of time (e.g., between about 1 hour and about 200 hours, or any subrange thereof). In yet other embodiments, the power supply 403 comprises an adapter to connect the system 401 to a generator and/or an electrical power grid. In some embodiments, the power supply 403 comprises an adapter configured to connect the system 401 to a direct current source of any suitable voltage, (e.g., 12 volt and/or 24 volt direct current supply). In other embodiments, the power supply 403 comprises one or more photovoltaic cells. In yet other embodiments, the line 404 connects the power supply 403 to components of the system 401 requiring electrical power.

The gas analyzer can couple to and/or decouple from the chassis 402 in any suitable manner. Indeed, in some embodiments, the chassis 402 is configured to detachably couple with the gas analyzer 200. In other embodiments, the gas analyzer 200 detachably couples with the chassis 402 to allow the gas analyzer 200 to function as part of the system 401. In yet other embodiments, the gas analyzer 200 is configured to be detached from the chassis 402 and the system 401 to allow for the gas analyzer 200 to be used independently of the system 401. In some embodiments, the system 401 is configured to operate without the gas analyzer 200. In other embodiments, the system 401 is configured to operate with any suitable gas analyzer.

In some embodiments, the chassis 402 further comprises one or more docking assemblies 440. In some embodiments, the docking assembly 440 is configured to detachably couple the chassis 402 to the gas analyzer 200. In some aspects, the docking assembly 440 is configured to detachably couple with the gas analyzer 200 by mechanical means to secure the gas analyzer 200 to the chassis 402. While it can comprise any suitable material, in some embodiments, the mechanical means includes hooks, flanges, screws, flexible bands, and/or other suitable securing means. The mechanical means can also include one or more support members configured to mate with one or more corresponding structures on a bottom surface of the gas analyzer 200. The docking assembly 440 can also comprise one or more locking members configured to allow a user to selectively and reversibly secure the gas analyzer 200 to the docking assembly. In other aspects, the docking assembly 440 can be configured to detachably couple in an electrical fashion the system 401 to the gas analyzer 200. For example, the docking assembly 440 can electrically connect the gas analyzer 200 to the system 401 such that the gas analyzer 200 can draw power from the power supply 403 and/or such that the gas analyzer 200 can recharge a rechargeable battery unit from power supply 403. Likewise, in some embodiments, the docking assembly 440 is configured to electrically connect the gas analyzer 200 to the system 401 such that the system 401 can draw power from the power supply 212 and/or such that the system 401 can recharge the rechargeable battery unit from the power supply 212. In some aspects, the docking assembly 440 can electrically connect the gas analyzer 200 to the system 401 such that the controller 280 can be in electrical communication with the controller 480. For example the controller 480 can electrically communicate a status of the system 401 and/or the system 400 with the controller 280.

In some embodiments, the system 401 can comprise one or more nitric oxide sources (e.g., 1, 2, 3, 4, or more nitric oxide sources, including without limitation, a first nitric oxide source 110 and a second nitric oxide source 410), a first diverting valve 420 (e.g., a solenoid valve and/or any other suitable valve), a second diverting valve 430 (e.g., a solenoid valve and/or any other suitable valve), a nitric oxide flow valve 406, an air flow valve 426, a user interface 460, and a controller 480. As described above in system 100, the first nitric oxide source 110 and/or the second nitric oxide source 410 can comprise one or more of pressurized nitric oxide, pressurized cylinders of nitric oxide, a mixture of gases comprising nitric oxide, a mixture of nitric oxide and one or more inert and/or non-reactive gases, other suitable sources of nitric oxide, and/or other suitable gas. In some embodiments, each individual nitric oxide source comprises an individual regulator. For example, the first nitric oxide source 110 can further comprise a first regulator 112. The first regulator 112 can be configured to regulate a pressure of nitric oxide gas in the first source 110 and to measure the pressure. The first regulator 112 can communicate the pressure of the first nitric oxide source 110 to the controller 480 (e.g., via connection 415 or otherwise). In the same example, the second nitric oxide source 410 can further comprise a second regulator 412. The second regulator 412 can be configured to regulate a pressure of nitric oxide gas in source 410 and to measure the pressure. The second regulator 412 can communicate the pressure of first nitric oxide source 410 to controller 480 (e.g., via connection 413, or otherwise). Nitric oxide gas can flow from the first nitric oxide source 110 through line 416 to first diverting valve 420. Nitric oxide gas can flow from the second nitric oxide source 410 through line 414 to first diverting valve 420. The controller 480 can control first diverting valve 420 by any suitable means (e.g., via connection 421). Nitric oxide gas can flow from the first diverting valve 420 to the second diverting valve 430 by any suitable means (e.g., via line 422). The controller 480 can control the second diverting valve 430 by any suitable means (e.g., via connection 431). Nitric oxide gas can flow from the second diverting 430 by any suitable means (e.g., through line 115 to the gas analyzer 200), as described above.

In some embodiments, metered nitric oxide gas flows from the gas analyzer 200 through the line 205 to a nitric oxide flow regulator 406. In other embodiments, the nitric oxide flow regulator 406 is configured to meter a flow of nitric oxide gas. The nitric oxide flow regulator 406 is configured as a metering valve that can be manually adjusted to meter a flow of nitric oxide gas. In some embodiments, the nitric oxide flow regulator 406 comprises a visual gauge (e.g., analog, digital, or otherwise) to display the rate of flow of nitric oxide gas. In some embodiments, the nitric oxide flow regulator 406 is configured to allow a user to meter the flow of nitric oxide gas and to override metering performed by the gas analyzer 200 and/or to meter the flow of nitric oxide gas if the gas analyzer 200 is not operational or not activated. In some embodiments, the metered nitric oxide flows from the nitric oxide flow regulator 406 through a line 407 into the delivery unit 140.

In some embodiments, the system 400 comprises an air source 120 and an air regulator 122, as described above. In some embodiments, the air regulator 122 is configured to regulate a pressure of an air gas as it is dispensed from the air source 120 through the air line 125 to the oxygen flow regulator 426. In other embodiments, the air flow regulator 426 is configured to meter a flow of air gas. In some embodiments, the air flow regulator 426 is configured as a metering valve that can be manually adjusted to meter a flow of air gas. The air flow regulator 426 can further be configured with a visual gauge (analog, digital, or otherwise) to display the rate of flow of air gas. The air flow regulator 426 can be configured to allow a user to meter the flow of air gas to override metering performed by the gas analyzer 200 and/or to meter the flow of air gas if the gas analyzer 200 is not operational or not activated. In some embodiments, the metered air flows from the air flow regulator 426 through a line 427 into the ventilating unit 130. In other embodiments, system 400 comprises an air source 120 configured to dispense pure oxygen (or substantially pure oxygen) and configured to be housed in the system 401. In yet other embodiments, the system 401 further comprises a safety cap configured to ensure positive shut off for unclosed flow meter valves 406, 426 to prevent leaks in the system 401.

As described above, some embodiments of the system 401 comprise one or more of an optional tank, manual bagging unit, pump, and/or other mechanism that allows a user to manually supply one or more gases to the patient 150. Indeed, some embodiments comprise a manual bagging unit 142 that is connected to the delivery unit 140. In other embodiments, the manual bagging unit 142 is configured as a bag valve mask, Ambu bag, manual resuscitator, hyperinflation bagger, self-inflating bag, and/or any other suitable device to provide positive pressure ventilation to the patient 150. The manual bagging unit 142 can be configured to allow for delivery of the blended gas mix in the event of failure of ventilating unit 130 and/or system 401. In the event of failure of the ventilating unit 130, the gas analyzer 200 and/or the system 401, a user can employ the manual bagging unit 142 to continue delivery of the blended gas mix and/or air to the patient 150.

In some embodiments, user interface 460 is configured to display individual pressures of one or more nitric oxide sources (e.g., 1, 2, 3, 4, or more nitric oxide sources, including without limitation, the first nitric oxide source 110 and the second nitric oxide source 410). In other embodiments, user interface 460 is configured to display an amount of gas remaining for one or more nitric oxide sources (e.g., 1, 2, 3, 4, or more nitric oxide sources, including without limitation, the first nitric oxide source 110 and the second nitric oxide source 410). In yet other embodiments, user interface 460 is configured to display amount of remaining doses or remaining run time for one or more nitric oxide sources (e.g., 1, 2, 3, 4, or more nitric oxide sources, including without limitation, the first nitric oxide source 110 and the second nitric oxide source 410). In some embodiments, user interface 460 is configured to display which of the one or more nitric oxide sources (e.g., 1, 2, 3, 4, or more nitric oxide sources, including without limitation, the first nitric oxide source 110 and the second nitric oxide source 410) is being drawn from during a current run. In other embodiments, user interface 460 is configured to display amount of remaining doses or remaining run time for the one or more nitric oxide sources (e.g., 1, 2, 3, 4, or more nitric oxide sources, including without limitation, the first nitric oxide source 110 and the second nitric oxide source 410) as a graphical output. In yet other embodiments, the user interface 460 is configured to display alarm conditions to indicate when amount of remaining doses or remaining run time for the one or more nitric oxide sources (e.g., 1, 2, 3, 4, or more nitric oxide sources, including without limitation, the first nitric oxide source 110 and the second nitric oxide source 410) are running low. In some embodiments, the user interface 460 is configured to display alarm conditions to notify the user to replace one or more of the nitric oxide sources (e.g., 1, 2, 3, 4, or more nitric oxide sources, including without limitation, the first nitric oxide source 110 and the second nitric oxide source 410). In other embodiments, the user interface 460 is configured to display alarm conditions to notify the user to various stages of nitric oxide depletion. In some embodiments, the user interface 460 further comprises one or more status lights configured to communicate a status of the system 401 to the user. In some cases, the status lights can comprise white or colored lights. In some aspects, the array of status lights can comprise LED lights or any other suitable lights.

Where the chassis 402 comprises the user interface 460, the user interface can comprise any suitable component that allows it to provide information about the system to the user and/or to receive input from the user. In some embodiments, the user interface 460 comprises a touch screen display configured to display data to the user and configured to receive inputs from the user. In some embodiments, the user interface 460 comprises a touch screen display configured to be operable by the user while wearing gloves. In other embodiments, the user interface 460 comprises one or more of a computer display, a computer monitor, an LCD panel display, a CRT monitor, an OLED monitor, or other suitable display. In yet other embodiments, the user interface 460 comprises one or more of a keyboard, an array of electronic buttons, a computer mouse, a stylus, trackball, light pen, other pointing device, a microphone, a joystick, a game pad, and/or any other suitable input device. In some embodiments, the user interface 460 comprises a tablet computer and/or any other suitable computing device. In other embodiments, user interface 460 can comprise one or more speakers or loudspeakers configured to provide audible cues to the user regarding operation and/or current state of the system 401, pressures of the first nitric oxide source 110 and the second nitric oxide source 410, alarm conditions such as when an amount of remaining doses or remaining run time for the first nitric oxide source 110 and the second nitric oxide source 410 are running low and/or any other suitable information. In yet other embodiments, the user interface 460 can comprise one or more lights or strobe lights configured to provide visual cues to the user regarding operation and/or current state of the system 401, pressures of the first nitric oxide source 110 and the second nitric oxide source 410, alarm conditions such as when an amount of remaining doses or remaining run time for the first nitric oxide source 110 and the second nitric oxide source 410 are running low and/or any other suitable matter.

While the controller 480 can comprise any suitable processing unit, including without limitation, a computer, a laptop, a handheld computing device, and/or any other suitable processing device, in some embodiments, the controller 480 comprises a processing device that is specifically tailored to control the system 400. In some embodiments, the controller 480 comprises a processing device that is specifically tailored to control the system 401. In other embodiments, the controller 480 is configured as a processing device that is specifically tailored to display data and receive inputs from the user interface 460. In yet other embodiments, the controller 480 is configured as a processing device that is specifically tailored to receive pressure data from the first regulator 112 and/or the second regulator 412. In some embodiments, the controller 480 is configured as a processing device that is specifically tailored to control the first diverting valve 420 to direct the flow of nitric oxide through line 422 from either the first nitric oxide source 110 or the second nitric oxide source 410. In other embodiments, the controller 280 can be configured as a processing device that is specifically tailored to control the second diverting valve 430 to permit, prevent, or otherwise control flow from line 421 to line 115 and/or to permit or prevent flow from line 421 through the second diverting valve 430 to any suitable exhaust, including without limitation, an exhaust that releases to atmosphere, an exhaust that leads to a fume hood, and/or any other suitable exhaust.

For example, in some embodiments, the controller 480 is configured to receive pressure data from the first nitric oxide source 110 and the second nitric oxide source 410. In some embodiments, the controller 480 is configured to control the first diverting valve 420 such that nitric oxide only flows from the first nitric oxide source 110 to the gas analyzer 200 and flow from the second nitric oxide source 410 is blocked. In some embodiments, the controller 480 is configured to monitor the pressure in the first nitric oxide source 110 in real-time or near real-time. When the nitric oxide in the first nitric oxide source 110 is almost exhausted, the controller 280 can automatically activate the first diverting valve 420 to divert flow from the second nitric oxide source 410 to the gas analyzer 200. The flow can then continue uninterrupted from the second nitric oxide source 410. The controller 480 can then communicate with user interface 460 to alert the user that the first nitric oxide source 110 has been exhausted. The first nitric oxide source 110 can then be replaced. Then, when the nitric oxide in the second nitric oxide source 410 is almost exhausted, the controller 280 can activate first diverting valve 420 to divert flow from the first nitric oxide source 110 to the gas analyzer 200. The controller 480 can then communicate with user interface 460 to alert the user that the second nitric oxide source 410 has been exhausted and needs to be replaced. In some embodiments, where the system 401 comprises more than two nitric oxide sources, the controller 480 continues diverting flow from each nitric oxide source as the individual nitric oxide source depletes (e.g., the controller 480 diverts from a second nitric oxide source to a third nitric oxide source, from a third nitric oxide source to a fourth nitric oxide source, and so forth). In other embodiments, the first diverting valve 420 and the second diverting valve 430 can be configured to be operated manually in the event of failure of controller 480.

Figure 5:
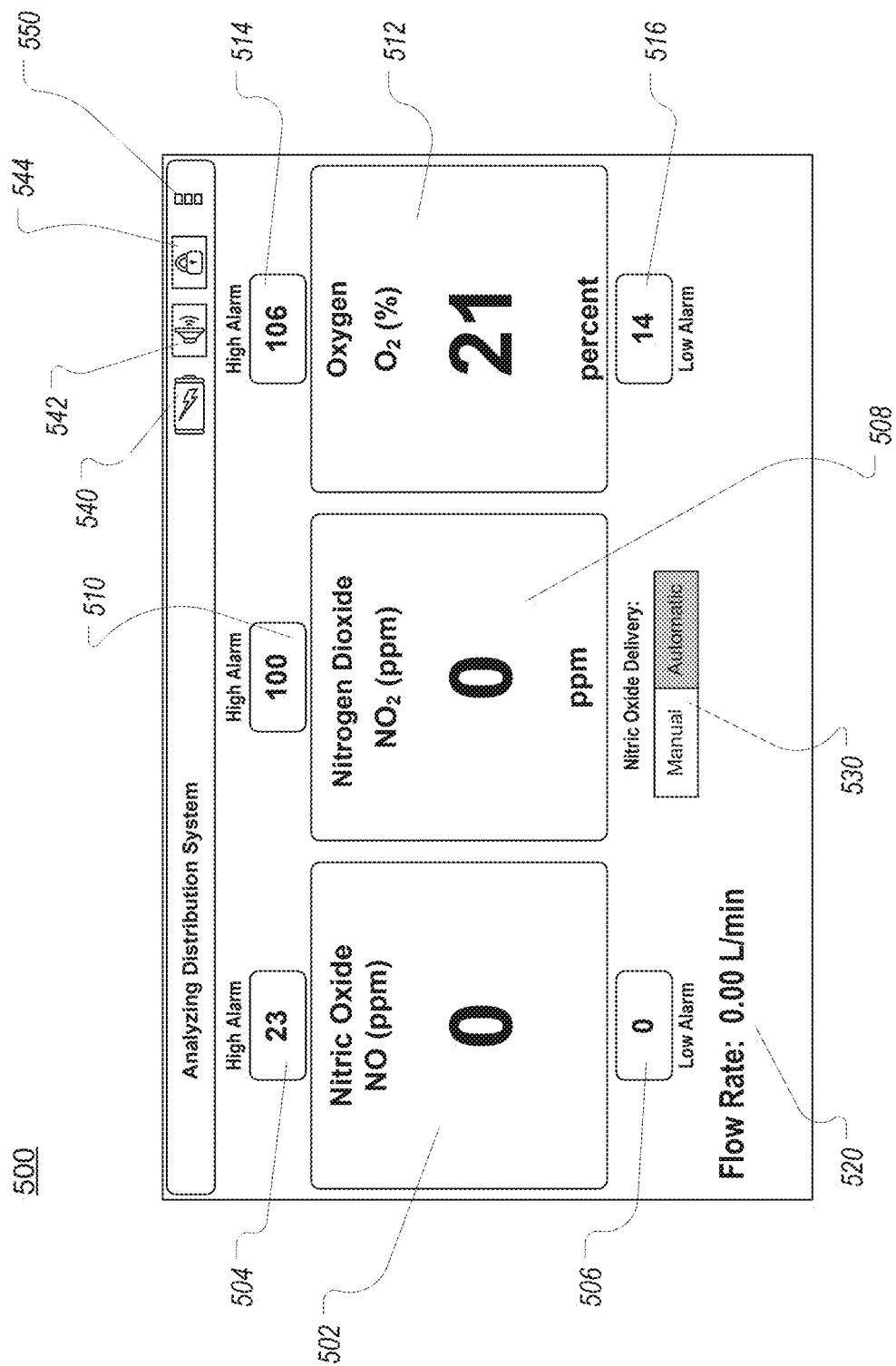
FIG. 5 illustrates some embodiments of a system for displaying data from the gas analyzer.

Returning now to the gas analyzer 200, while the user interface 260 for the gas analyzer 200 (as describe above) can have any suitable features, FIG. 5 shows some embodiments of a graphical user interface system 500 configured for displaying data from the gas analyzer 200 and for receiving user input. In some embodiments, the system 500 can comprise any suitable graphical user interface and/or supporting software suite configured to receive data from controller 280 and to display data to a user via the user interface 260. In other embodiments, system 500 further comprises a software suite configured to receive input from the user via the user interface 260 and to deliver the input to controller 280. For example, system 500 can graphically display concentrations of nitric oxide, nitrogen dioxide, oxygen, and any other suitable information to the user. In some aspects, system 500 can also display one or more high and low alarm limits for each of nitric oxide, nitrogen dioxide, oxygen, and/or any other suitable gas. In some embodiments, system 500 also allows the user to input one or more desired levels of nitric oxide and/or high and low alarm limits.

In some embodiments, system 500 comprises a home screen configured to display real-time or near real-time gas analyzer data to a user. In one example, a current nitric oxide concentration 502 can be displayed. In another example, a current nitric oxide high alarm 504 can be displayed. In still another example, a current nitric oxide low alarm 506 can be displayed. In some aspects, a current nitrogen dioxide concentration 508 can be displayed. In other aspects, a current nitrogen dioxide high alarm 510 can be displayed. In yet other aspects, a current oxygen concentration 512 can be displayed. In some instances, a current oxygen high alarm 514 can be displayed. In other instances, a current oxygen low alarm 516 can be displayed. In some aspects, the nitric oxide concentration 502 can be displayed in ppm against a first colored (e.g., blue) background. In other aspects, the nitrogen dioxide concentration 508 can be displayed in ppm against a second colored (e.g., an orange) background. In yet other aspects, the oxygen concentration 512 can be displayed in percent and displayed against a third colored (e.g., green) background. In some embodiments, one or more of the first, second, and/or third colored backgrounds are color-coded to match the color-coding of the respective gas cylinder. In other embodiments, the user touches the touch screen display in a location corresponding to the respective concentrations or alarm limits to enter a desired concentration or alarm limit. In yet other embodiments, the respective concentrations and/or alarm limits are preset and the user may override the preset values to enter desired values.

In some embodiments, the system 500 can display a flow rate 520. While such flow rate can be displayed in any suitable manner, in some embodiments, the flow rate 520 can be displayed in liters per minute. The system 500 can also be configured to permit the user to enter a desired flow rate 520 (e.g., by touching the touch screen display in a location on the touch screen corresponding to the flow rate 520).

In some embodiments, the system 500 can display a run state 530 of the gas analyzer 200. For example, the system 500 can display whether the gas analyzer 200 is in a manual run state or an automatic run state. In some embodiments, with the gas analyzer 200 in manual run state, the user can manually control the gas analyzer 200 by manually inputting one or more of desired concentrations of nitric oxide 502 and oxygen 512, high and low alarm limits for nitric oxide 504, 506, nitrogen dioxide 510, and oxygen 514, 516 flow rate 520, and/or any other suitable parameter. With the gas analyzer 200 in automatic run state, the gas analyzer 200 can operate with preset values of one or more of desired concentrations of nitric oxide 502 and oxygen 512, high and low alarm limits for nitric oxide 504, 506, nitrogen dioxide 510, and oxygen 514,516, flow rate 520 and/or any other suitable parameter. In some aspects, when the gas analyzer 200 is in automatic mode, the controller 280 is configured to deliver the blended gas mix with only minimum input from the user. In other embodiments, the system 500 is configured with a touch screen slide selector bar that allows the user to select between manual mode and an automatic mode. In some embodiments, the user can touch the touch screen at the location corresponding to the slide selector and slide the selector bar to select either the manual mode or the automatic mode.

In some embodiments, the system 500 is configured to display, to store, and otherwise use other data related to the gas analyzer 200. For example, the system 500 can display a battery status 540. In some aspects, the battery status 540 can display a level of charge of the rechargeable battery unit. In other aspects, the battery status 540 can also display whether the gas analyzer 200 is operating on external power or whether the rechargeable battery unit is being charged. In some examples, system 500 can also display an alarm silence 542. In this example, a user can touch the alarm silence icon to silence an audible alarm. In some embodiments, system 500 displays a lock/unlock status 544. In other embodiments, the lock/unlock status 544 displays whether the unit is locked against user input or unlocked and able to receive user inputs.

In some embodiments, the system 500 also is configured to display a tool menu 550. While the tool menu 550 may function in any suitable manner, in some aspects, a user can select tool menu 550 to provide other inputs to the controller 280 to operate the gas analyzer 200. In some aspects, the user can select an icon to select tool menu 550. While the tool menu 550 can provide a user with access to any suitable tool, in some embodiments, the tool menu 550 comprises one or more of a calibrate option, an event history option, a gas chart option, a standby mode option, a transfer option, an oxygen dilution chart, an about analyzer option, a return to main menu option and/or any other suitable option. Indeed, in some aspects, selecting the calibrate option can allow the user to enter a calibration menu configured to allow the user to calibrate the gas analyzer 200. In other aspects, selecting the event history option displays a list of alarms, events, and/or similar data recorded by the controller 280 during operation of the gas analyzer 200. While the event history can comprise any suitable data, in some embodiments, the event history comprises date of event, time of event, description of event and/or similar data. In some aspects, selecting a gas chart can display one or more charts illustrating concentrations of one or more of nitric oxide, nitrogen dioxide, oxygen and/or any other suitable gas over time. In some embodiments, the system 500 is configured to allow the user to select the time range to display and the zoom level of the displayed charts. In some cases, the user can use a two finger pinch or swipe on the touch screen to adjust the zoom level of the displayed charts.

In some aspects, selecting the standby mode options allows a user to place the gas analyzer 200 into a standby mode which allows the gas analyzer 200 to remain powered on and active with the exception of sampling pump 241. In some embodiments, when the analyzer 200 is in standby mode, the sampling pump 241 remains powered off and the controller 280 records the amount of time that the gas analyzer 200 remains in standby mode. In some embodiments, while in standby mode, the controller 280 can continue to supply power to one or more of the sensors to maintain calibration. In some embodiments the user can exit standby mode to allow the gas analyzer 200 to resume operation. In some aspects, upon exiting standby mode, the user can vent the gas analyzer 200 to clear any nitrogen dioxide (or any other gas) that may have accumulated. In some aspects, selecting the transfer option can allow the user to save data recorded by the controller 280 via the data port 282 (e.g., a USB port or otherwise). In some aspects, selecting the oxygen dilution chart option displays one or more charts illustrating dilution of oxygen concentration as the gas analyzer 200 adds nitric oxide gas to the blended gas mix. In other aspects, selecting the about analyzer option displays the current version(s) of any software and/or firmware utilized by the gas analyzer 200.

Figure 6:
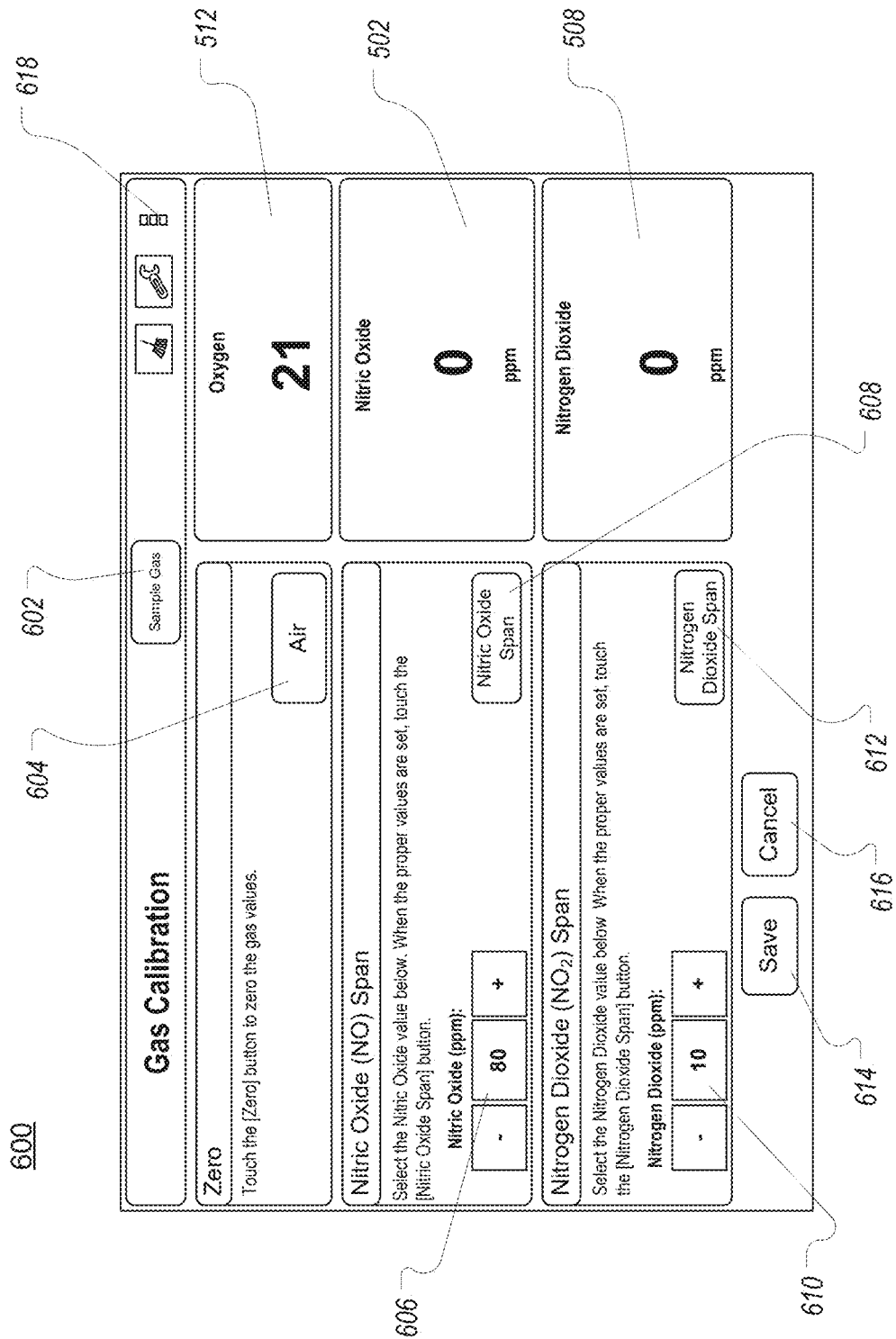
FIG. 6 illustrates some embodiments of a system for displaying data from the gas analyzer and for receiving user input to calibrate the gas analyzer.

Referring now to FIG. 6, while the user interface 260 for the gas analyzer 200 (as describe above) can have any suitable features, some embodiments of a graphical user interface system 600 are shown. In some embodiments, system 600 is configured for displaying data from the gas analyzer 200 and for receiving user input to allow the user to calibrate the gas analyzer 200. In some embodiments, the system 600 comprises a calibration menu. In some embodiments, selecting the calibrate option from the tool menu 550 causes the system 600 to display the calibration menu corresponding to the system 600. The system 600 can allow the user to calibrate the gas analyzer 200 against ambient air and/or against one or more reference gases. In some embodiments, the user calibrates the gas analyzer 200 in a two-step process. First the gas analyzer 200 is calibrated against a zero value corresponding to a sampling gas stream flowing through the gas sampling circuit 202 comprising one or more gases (e.g., ambient air). Then the gas analyzer 2000 is calibrated against a known value corresponding to a known concentration of a reference gas. The system 600 can display one or more of the real-time nitric oxide concentration 502, the nitrogen dioxide concentration 508, the oxygen concentration 512 and/or any other suitable gas. In some aspects, the nitric oxide concentration 502 can be displayed in ppm against a first (e.g., blue) background. In other aspects, the nitrogen dioxide concentration 508 can be displayed in ppm against a second (e.g., an orange) background. In yet other aspects, the oxygen concentration 512 can be displayed in percent and displayed against a third (e.g., a green) background. In some embodiments, one or more of the first, second, and/or third colored backgrounds are color-coded to match the color-coding of the respective gas cylinder.

In some embodiments, system 600 includes a sample gas option 602 that can allow the user to zero the nitric oxide and nitrogen dioxide values after ambient air has been drawn through the gas analyzer 200 to allow sensor readings to stabilize. In some aspects, the sample gas option 602 can allow the user to select from one or more of air, nitric oxide, and nitrogen dioxide. In other aspects, an air zero option 604 can allow the user to zero gas sensor values against ambient air. Zeroing against ambient air allows the oxygen sensor 246 to calibrate against the concentration of oxygen found in ambient air (which may be about 21%). In some embodiments, zeroing against ambient air allows the nitric oxide sensor 242 and the nitrogen dioxide sensor 244 to calibrate against a zero value of nitric oxide and nitrogen dioxide, respectively.

In some embodiments, the sample gas option 602 allows the user to calibrate the nitric oxide sensor 242 and/or the nitrogen dioxide sensor 244 against a reference gas. For example, a reference gas having a known concentration of nitric oxide can be flowed through the gas sampling circuit 202 and the nitric oxide sensor 242 can be calibrated to the known value of the nitric oxide reference gas. Once the nitric oxide reference gas is flowing through the gas sampling circuit 202 and the nitric oxide sensor 242 has stabilized, the sample gas option 602 can be selected followed by selecting the nitric oxide option. The known concentration of the nitric oxide reference gas can then be entered at the nitric oxide reference input 606 and the calibration for the nitric oxide sensor 242 can be set with the nitric oxide span input 608. The process can be repeated to calibrate the nitrogen dioxide sensor by connecting a nitrogen dioxide reference gas to the gas sampling circuit 202, using the sample gas option 602 to select nitrogen dioxide, entering the known concentration of the nitrogen dioxide reference gas at the nitrogen dioxide reference input 610, and by setting the calibration by selecting the nitrogen dioxide span input 612. Once the sensors have been calibrated, the save option 614 can be selected to save calibrations settings. The cancel option 616 can be selected to discard calibration settings. The user can repeat calibration steps until the gas analyzer 200 has been acceptably calibrated. A home menu option 618 can be selected to return the user to system 500.

Figure 7:
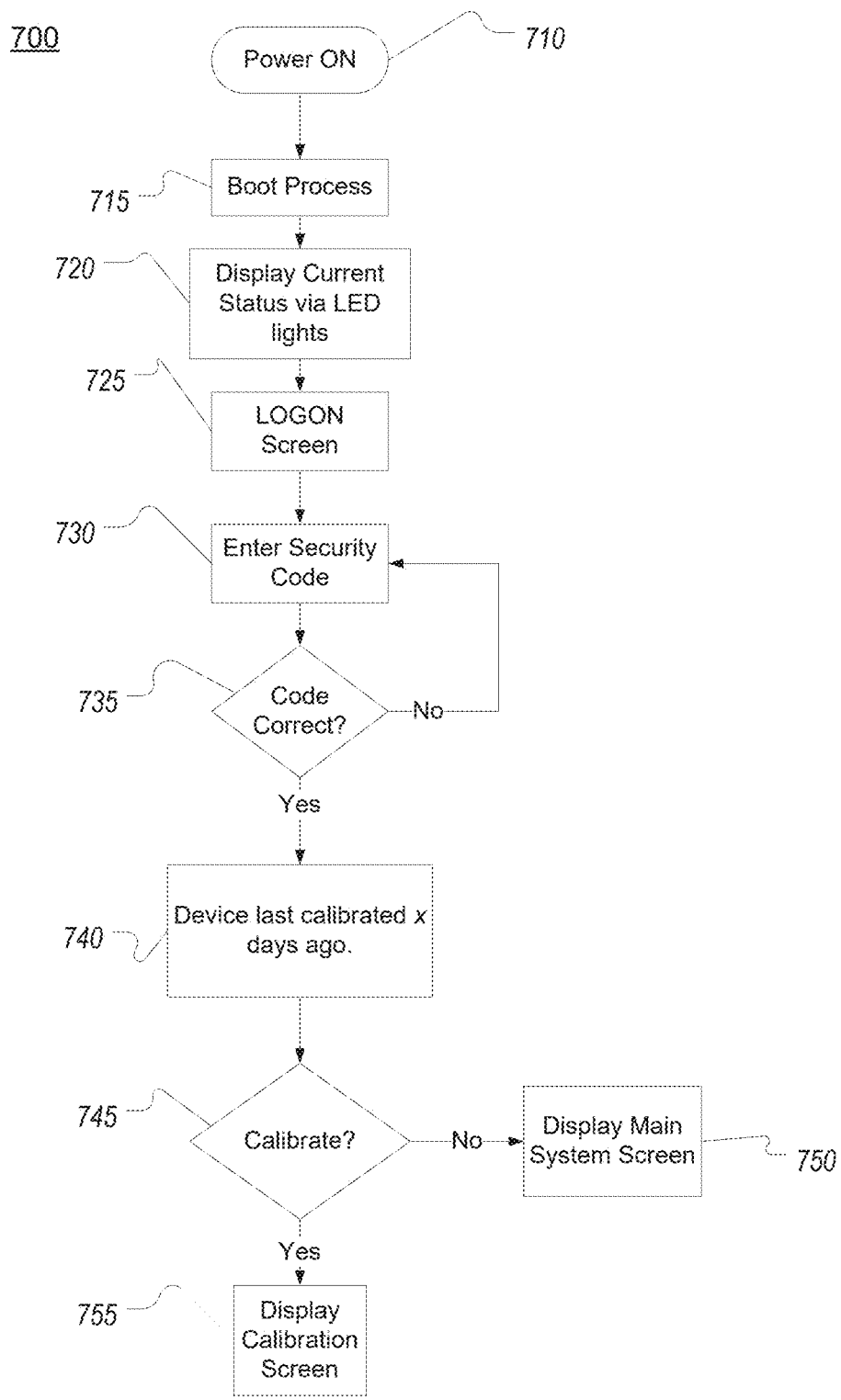
FIG. 7 illustrates some embodiments of a method for powering on the gas analyzer.

Referring now to FIG. 7, a software block diagram 700 illustrating some embodiments for powering on the gas analyzer 200 is illustrated. In accordance with some embodiments of diagram 700 illustrates a logic process utilized by the controller 280 to allow the user to begin operating the gas analyzer 200. In some aspects, the user can turn on power to gas analyzer 200 as represented in box 710. The controller 280 can then begin the boot process as shown in box 715. During the boot process, the controller 280 can display current status (e.g., via LED status lights, or otherwise) as shown in box 720. The boot process can then display a log-on screen as shown in box 725. The log-on screen can then request that the user enter a security code as shown in box 730. The boot process can then check the user entered security code against a security code in the controller 280 memory as shown in box 735. An entered security code that fails to match the security code in the controller 280 memory can return the user to box 730. An entered security code that matches the security code in the controller 280 then allows the user to move to box 740 in which the time since the last calibration is displayed. As shown in box 745, the user can then enter whether he or she would like to calibrate the gas analyzer 200. If the user selects no calibration, then the process can proceed to display a main system screen as shown in box 750. If the user selects calibration, then the process can proceed to display a calibration screen as shown in box 755. In other embodiments, diagram 700 can comprise or omit one or more of the boxes described above. In yet other embodiments, the logic process described in diagram 700 can comprise additional elements and/or be arranged in different sequences.

Figure 8:
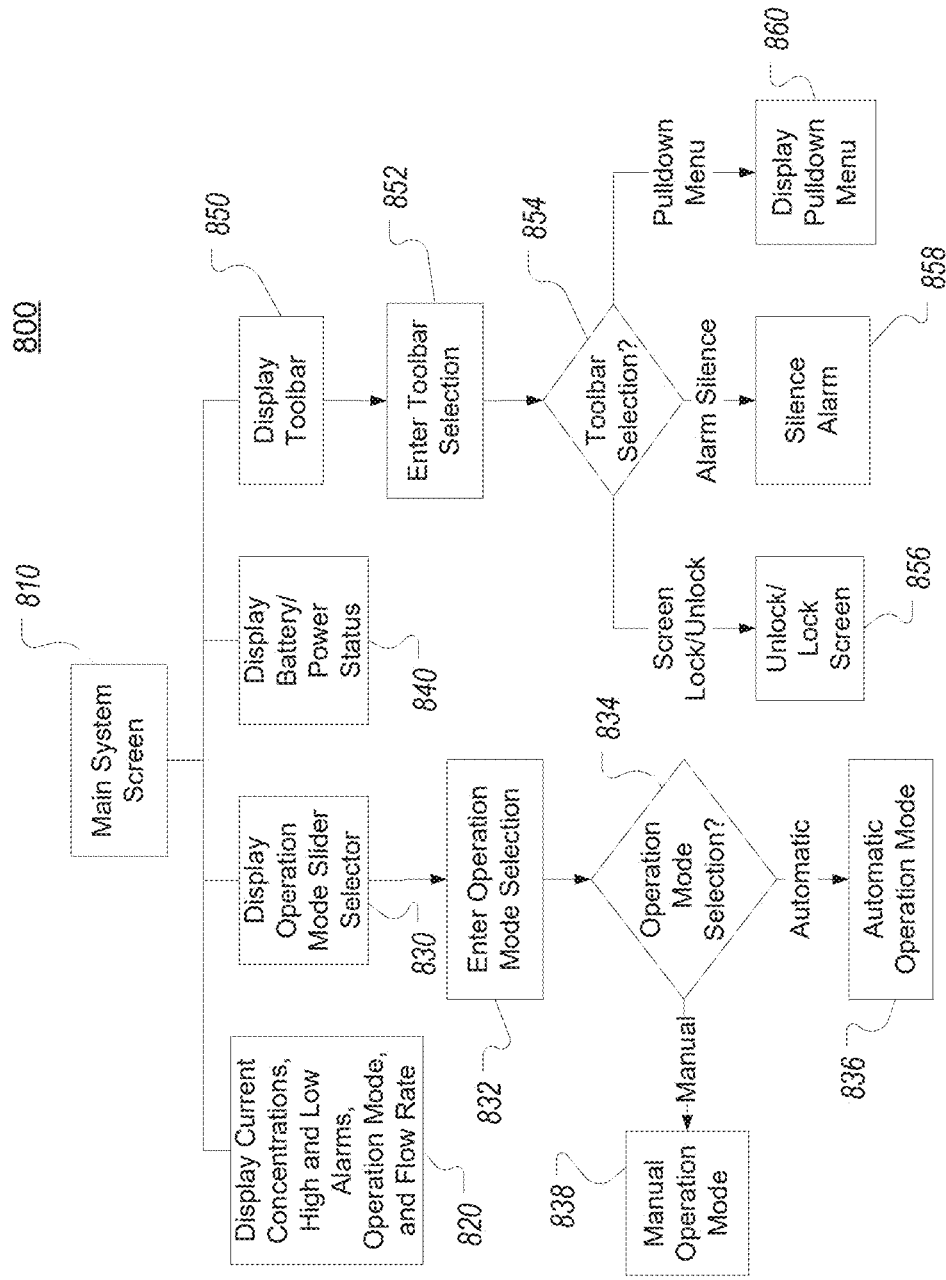
FIG. 8 illustrates some embodiments of a method for operating the gas analyzer.

Referring now to FIG. 8, a software block diagram 800 illustrating some embodiments for operating a gas analyzer 200 is illustrated. In accordance with some embodiments, the diagram 800 illustrates a logic process utilized by the controller 280 to allow the user to operate the gas analyzer 200. In other embodiments, the diagram 800 illustrates a logic process utilized by the controller 280 to allow a user to operate the gas analyzer 200 by providing input (e.g., via the user interface 260, or otherwise). In yet other embodiments, the diagram 800 illustrates a logic process utilized by the controller 280 to allow the user to operate the gas analyzer 200 by providing input (e.g., via the user interface 260, or otherwise) by using the system 500. In some aspects, the controller 280 can display a main menu screen as represented in box 810. In some embodiments, the main menu screen as represented in box 810 utilizes the system 500 to display data from gas analyzer 200 and for receiving user input. The main menu screen as represented in box 810 can display and/or receive user input related to any suitable aspect of the system, including without limitation, one or more of current gas concentrations, high and low alarm thresholds, operation modes, flow rate(s) of blended gas mix, battery status, power status, and a toolbar menu. In accordance with some embodiments, the current concentrations of individual gases as represented in box 820, the high and low alarm thresholds as represented in box 820, the operation mode as represented in box 820, and/or the flow rate of the blended gas mix as represented in box 820 are displayed.

In some aspects, the main menu screen as represented in box 810 can display and/or receive inputs from the operation mode slider selector as represented in box 830. As described above and illustrated in FIG. 5, the gas analyzer 200 can be operated in a manual run state or an automatic run state. As shown in box 832, the user can enter the desired operation mode selection. The controller 280 can receive the entered operation mode selection as shown in box 834. If the user enters a selection corresponding to the automatic run state, then the controller 280 can direct the gas analyzer 200 to operate in the automatic run state. If the user enters a selection corresponding to the manual run state, then the controller 280 can direct the gas analyzer 200 to operate in the manual run state as shown in box 838.

In some aspects, the main menu screen as represented in box 810 can display and/or receive input related to battery status and/or power status as shown in box 840. For example, the level of charge of the rechargeable battery unit and/or whether the rechargeable battery unit is being charged can be displayed. In another example, if the gas analyzer 200 is being powered by an external power source, it can be displayed as shown in box 840.

In some aspects, the main menu screen (as represented in box 810) can display and/or receive input related to the toolbar menu as shown in box 850. The user can enter a tool bar selection (as shown in box 852) and the controller 280 can receive the entered tool bar selection (as shown in box 854). In some instances, the tool bar selection) as shown in boxes 852 and 854) can comprise one or more of screen lock/unlock, alarm silence, and a pulldown menu. In some embodiments, if the user selects a screen lock/unlock option, the controller 280 locks the user interface 260 against further input from the user other than the screen lock/unlock input (as shown in box 856). Likewise, the user can select the screen lock/unlock option to unlock the user interface 260 to enable the user to enter inputs via user interface 260 (as shown in box 856). If the user selects alarm silence, the controller can silence an audible and/or a visual alarm for a length of time (as shown in box 858). If the user selects pulldown menu, pulldown menu of operating options can be displayed (as shown in box 860). In some instances, the pulldown menu of operating options shown in box 860 can comprise tool menu 550 as described above. In other embodiments, diagram 800 can comprise and/or omit one or more of the boxes described above. In yet other embodiments, the logic process described in diagram 800 can comprise additional elements and/or be arranged in different sequences.

Figure 9:
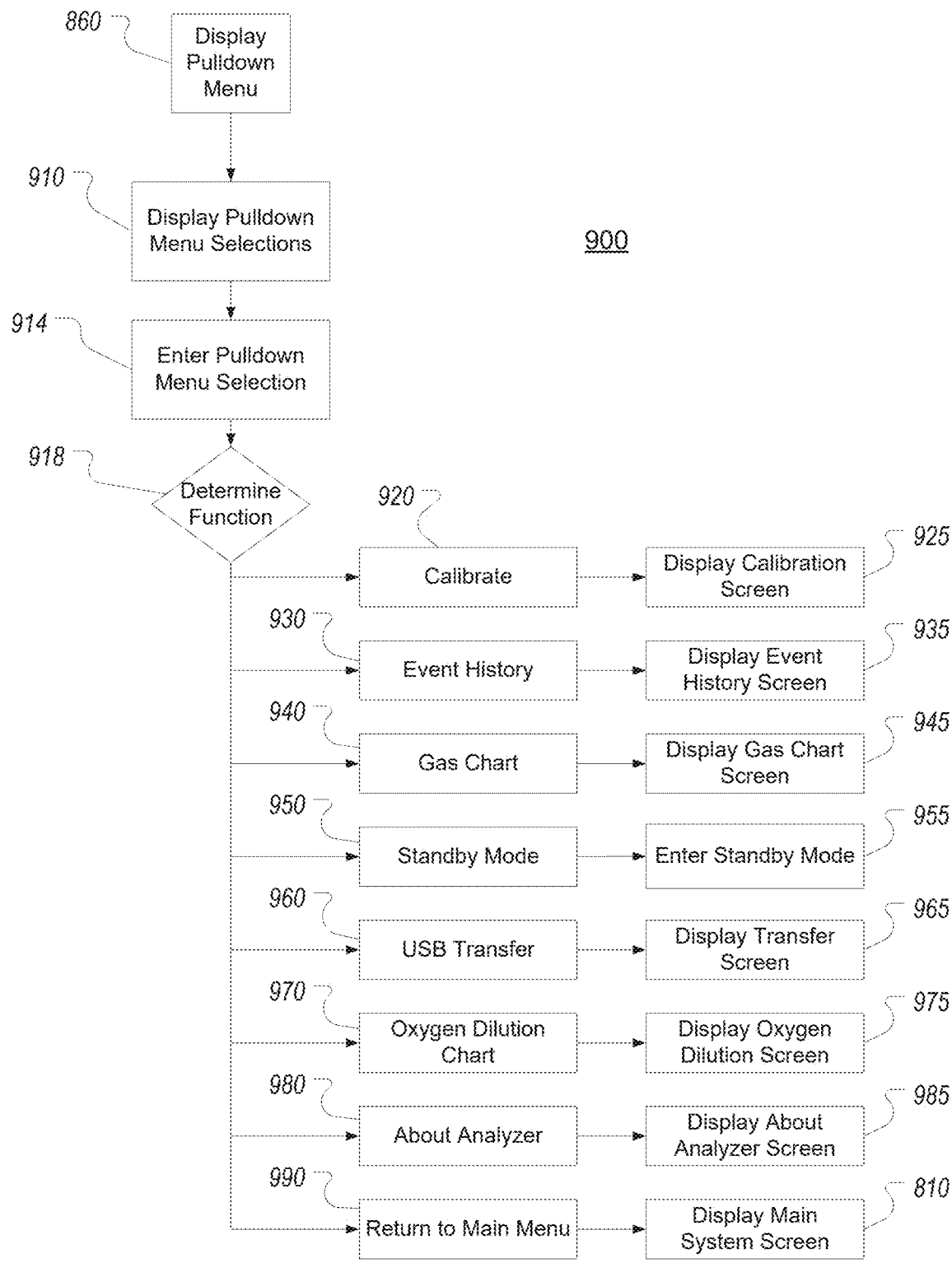
FIG. 9 illustrates some embodiments of a method for displaying and inputting menu selections for the gas analyzer.

Referring now to FIG. 9, a software block diagram 900 illustrates some embodiments for displaying and/or inputting pulldown menu selections. In accordance with some embodiments, diagram 900 illustrates a logic process utilized by the controller 280 to allow the user to input pulldown menu selections via the user interface 260. If a user selects the pulldown menu of operating options (as shown in box 860), the pulldown menu options can be displayed (as shown in box 910). In some embodiments, the pulldown menu options can comprise one or more of a calibrate option, an event history option, a gas chart option, a standby mode option, a USB transfer option, an oxygen dilution chart, an about analyzer option, a return to main menu option and/or any other suitable function. In other embodiments, the pulldown menu options comprise the options of tool menu 550 (as discussed earlier). The user can enter a pulldown menu selection (as shown in box 914) and the controller 280 can determine (e.g., via the user interface 260) the function (as shown in box 918).

If the user selects the calibrate option (as shown in box 920), a calibration screen can be displayed (as shown in box 925). If the user selects the event history option (as shown in box 930), an event history screen can be displayed (as shown in box 935). If the user selects the gas chart option (as shown in box 940), a gas chart screen can be displayed (as shown in box 945). If the user selects the standby option (as shown in box 950), a standby screen can be displayed (as shown in box 955). The user can interact with the standby screen (as shown in box 955) to place the gas analyzer 200 into standby mode. If the user selects the transfer option (as shown in box 960), a transfer screen can be displayed (as shown in box 965). The user can interact with the transfer screen (as shown in box 965) to save data via the data port 282. If the user selects the oxygen dilution chart option (as shown in box 970), an oxygen dilution chart can be displayed (as shown in box 975). If the user selects the about analyzer option (as shown in box 980), an about analyzer screen can be displayed (as shown in box 985). If the user selects the return to main menu option (as shown in box 990), the main menu screen (as shown in box 810 of FIG. 8) can be displayed. In other embodiments, diagram 900 can comprise and/or omit one or more of the boxes described above. In yet other embodiments, the logic process described in diagram 900 can comprise additional elements and/or be arranged in different sequences.

Figure 10:
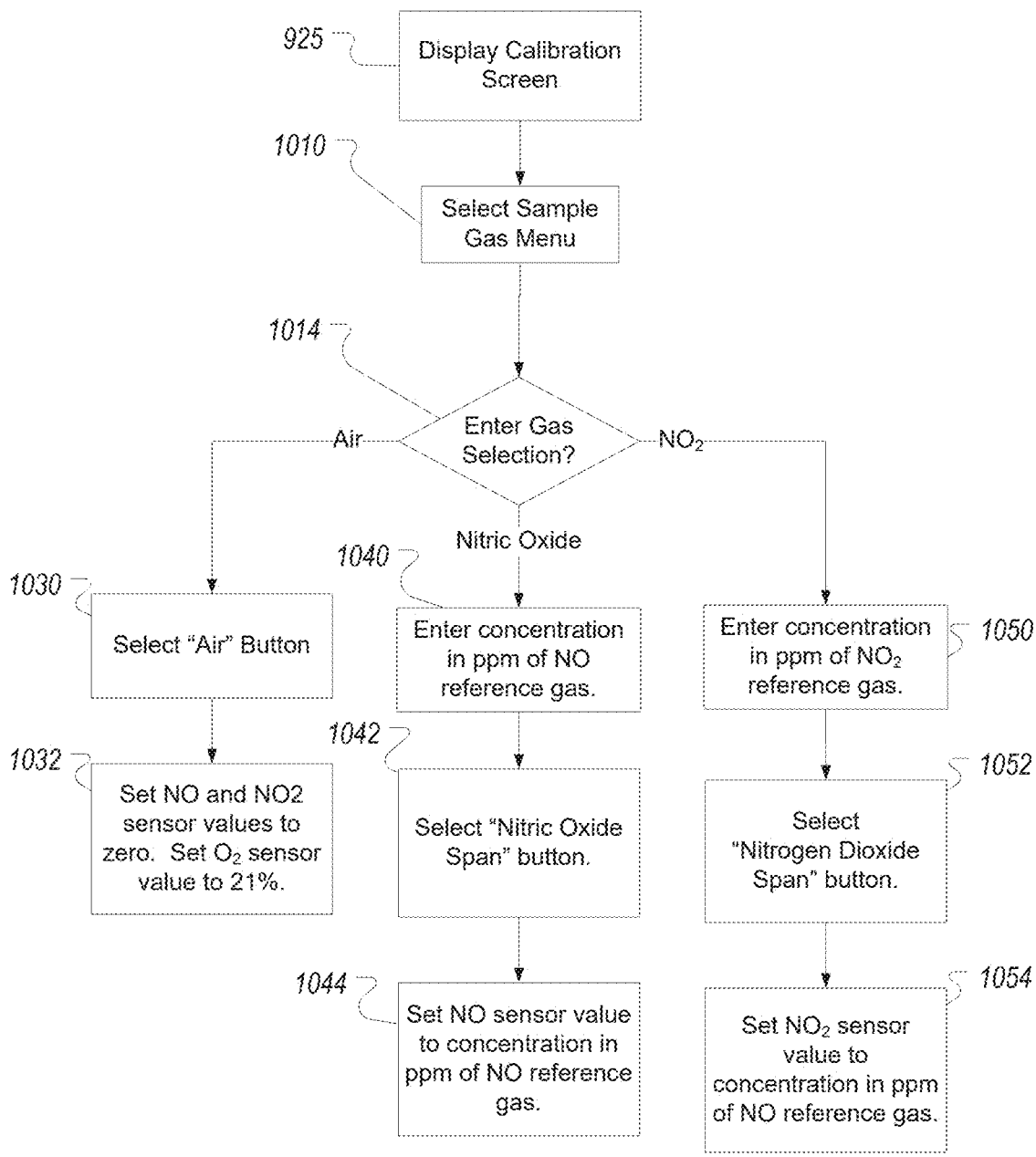
FIG. 10 illustrates some embodiments of a method for calibrating the gas analyzer.

Referring now to FIG. 10, a software block diagram 1000 depicting some embodiments of a method for calibrating the gas analyzer 200 are illustrated. In accordance with some embodiments, diagram 1000 can comprise a logic process utilized by the controller 280 to allow a user to calibrate the gas analyzer 200. In accordance with some other embodiments, diagram 1000 comprises a logic process comprising system 600 as described above and as illustrated in FIG. 6. In some aspects, the logic process can begin by displaying the calibration screen (as shown in box 925). To begin calibration, the user can select the select sample gas menu (as shown in box 1010). In some embodiments, sample gas selections can comprise one or more reference gases of known concentration configured to calibrate gas analyzer 200. In other embodiments, the sample gas selections can comprise one or more of air, nitric oxide, and nitrogen dioxide. The user can enter the sample gas selection (as shown in box 1014) and the controller 280 can receive the entered tool bar selection as shown. If the user selects air as the sample gas selection as shown in box 1030, the controller 280 can calibrate the nitric oxide sensor 242 to a zero value, can calibrate the nitrogen dioxide sensor 244 to a zero value, and can calibrate the oxygen sensor 246 to any desired value (e.g., to about 21%, to about 10% to about 50%, or to about 18% to about 23%). The logic process can then return to display the calibration screen (as shown in box 925). If the user selects nitric oxide as the sample gas selection (as shown in box 1040), the user can then enter the concentration of the nitric oxide reference gas. The user can then select a nitric oxide span option (as shown in box 1042) and the controller 280 can calibrate the nitric oxide sensor 242 to a value equal to the user-entered concentration of the nitric oxide reference gas. If the user selects nitrogen dioxide as the sample gas selection (as shown in box 1050), the user can enter the concentration of the nitrogen dioxide reference gas. The user can the select a nitrogen dioxide span option (as shown in box 1052) and the controller 280 can calibrate the nitrogen dioxide sensor 244 to a value equal to the user-entered concentration of the nitrogen dioxide reference gas.

Figure 11:
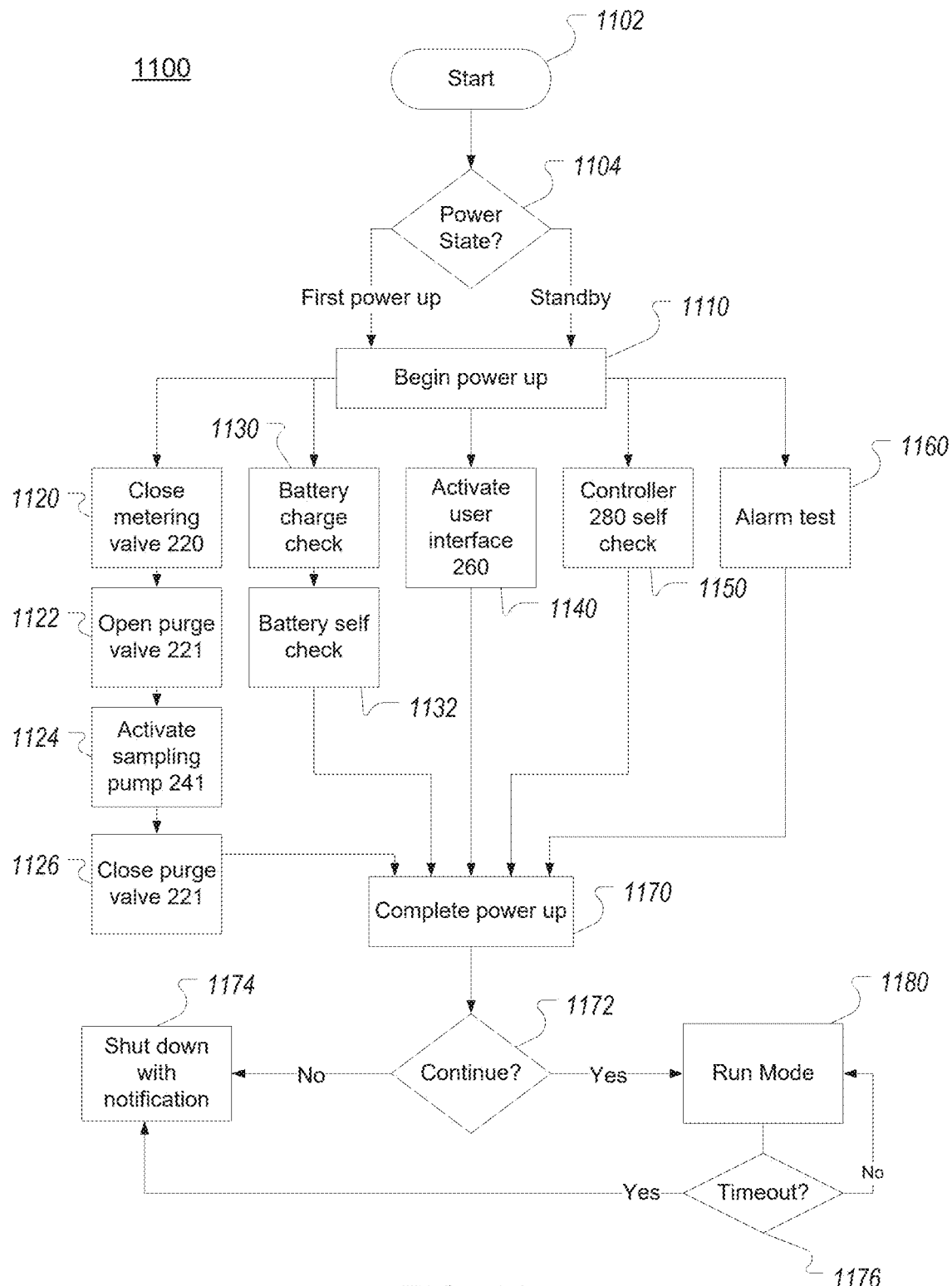
FIG. 11 illustrates some embodiments of a software flowchart for beginning operation of the gas analyzer.

Referring now to FIG. 11, a software flowchart 1100 illustrates some embodiments of a beginning operation of the gas analyzer 200. In accordance with some embodiments, the flowchart 1100 illustrates a logic process used by the controller 280 to allow a user to begin operation of the gas analyzer 200. In other embodiments, software flowchart 1100 illustrates a software block diagram for beginning operation of the gas analyzer 200. In some aspects, the flowchart 1100 can begin with a start command as shown in box 1102. A start command can comprise a user activating a power switch and/or selecting an option to begin operation of the gas analyzer 200. In other aspects, the start command can be an automated to be activated by a timer and/or by response to an external input, such as movement of the gas analyzer 200 or by detection of a gas concentration. The flowchart 1110 can comprise the controller 280 determining the power state of the gas analyzer 200 prior to the start command (as shown in box 1104). In some embodiments, the power state of the gas analyzer 200 is a first power up from a fully powered off state. In some embodiments, when the controller 280 detects a first power up from a fully powered off state, the controller 280 prompts a user to initiate a calibration of one or more sensors (as illustrated in FIG. 10) either before or after beginning power up (as shown in box 1110). When the controller 280 detects a power state of powering up from a standby state, the controller 280 can determine if a calibration step is recommended and prompt the user accordingly, or if no calibration step is required it can begin powering up (as show in box 1110).

In some embodiments, powering up as shown in box 1110 can comprise one or more of the controller 280 sending signals to respective components of the gas analyzer 200 to initiate purging the nitric oxide metering circuit 201, purging the gas sampling circuit 202, activating the user interface 260, initiating a controller 280 self-check, and/or initiating an alarm test. In some aspects purging nitric oxide metering circuit 201 and/or purging gas sampling circuit 202 can comprise one or more of closing the metering valve 220 (as shown in box 1120), opening the purge valve 221 (as shown in box 1122), activating the sampling pump 241 (as shown in box 1124), and closing the purge valve 221 (as shown in box 1126). In other aspects, powering up the gas analyzer 200 can also comprise the controller 280 initiating one or more of a check of the power supply 212, a check of a rechargeable battery unit, and a check of a level of charge of a rechargeable battery unit. In other aspects, powering up the gas analyzer 200 can also comprise the controller 280 initiating one or more of activating the user interface 260 (as shown in box 1140) to display data for the user and/or preparing the user interface 260 to receive inputs from the user. Powering up the gas analyzer 200 can also comprise the controller 280 initiating a self-check of the controller as shown in box 1150. Powering up the gas analyzer 200 can also comprise the controller 280 initiating a test of alarms through the user interface 260 (as shown in box 1160).

In accordance with some embodiments, after one or more steps comprising powering up the gas analyzer 200 are completed, the flow chart 1100 illustrates that a completed power up state can be reached (as shown in box 1170). In some aspects, after power up is complete, the controller 280 can prompt the user to select (as shown in box 1172) between continuing with operation of the gas analyzer 200 or with shutting down the gas analyzer 200 (as shown in box 1174). If the user selects shutting down the gas analyzer 200, then the controller 280 can confirm the shutdown and then execute a shutdown of the gas analyzer 200. The controller 280 can also allow the user to select that the gas analyzer 200 enters a standby mode. In some aspects, the standby mode allows one or more of the sensors 242, 244, and 246 to remain powered up and to allow one or more of the sensors 242, 244, and 246 to retain calibration settings. If the user selects continuing with operation, the controller 280 can enter a run mode as shown in box 1180. In some aspects, with the controller 280 in a run mode, the controller can activate a timeout option (as shown in box 1176) that initiates shutdown of the gas analyzer if a time limit of inactivity is exceeded. In yet other embodiments, the logic process described in flowchart 1100 can comprise additional elements, can comprise fewer elements, can be arranged in different sequential arrangements, and/or can comprise different branching logic.

Figure 12:
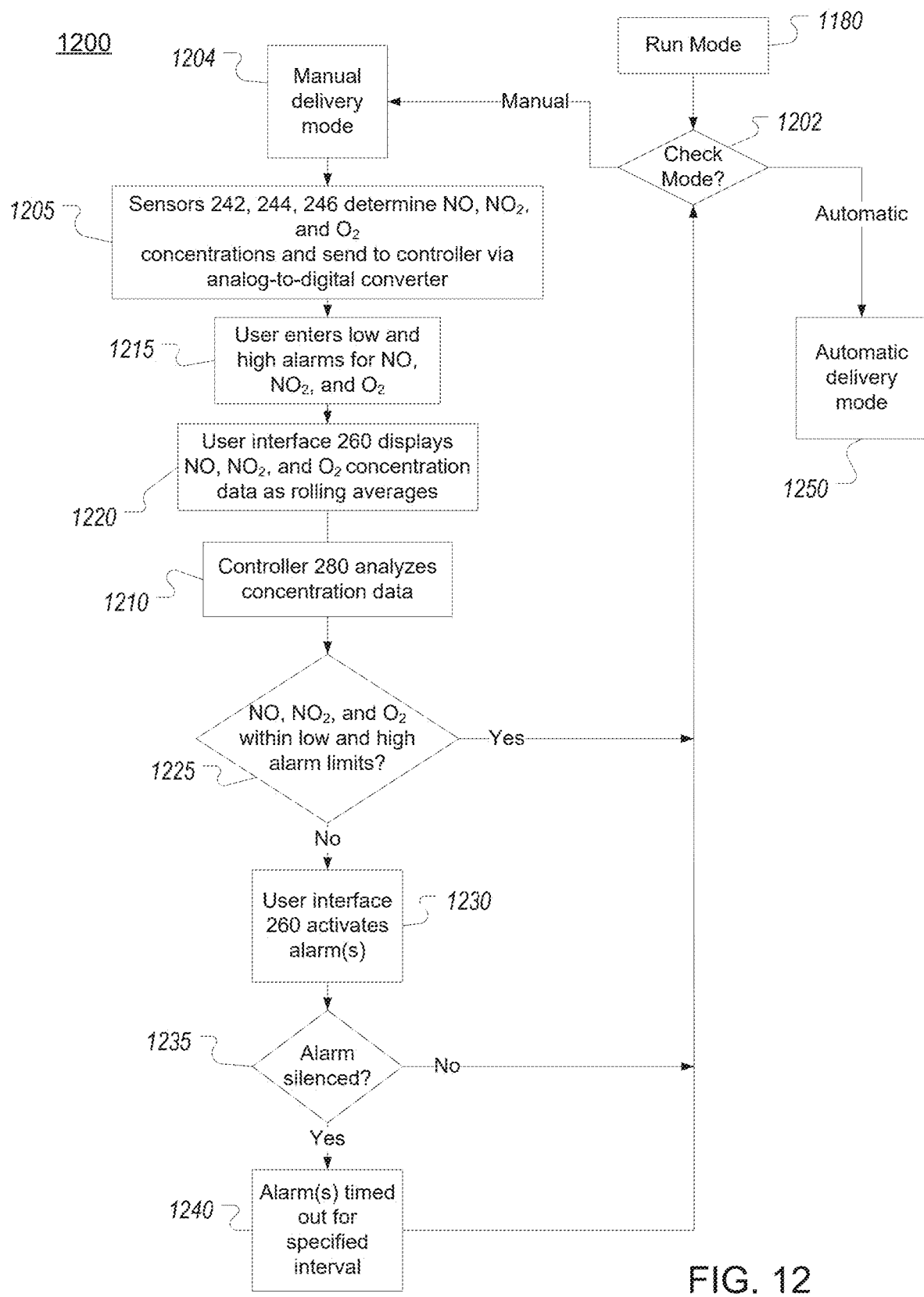
FIG. 12 illustrates some embodiments of a software flowchart for operating the gas analyzer in manual mode.

Referring now to FIG. 12, a software flowchart 1200 illustrating some embodiments for operating the gas analyzer 200 in a manual delivery mode is shown. In accordance with some embodiments, flowchart 1200 illustrates a logic process used by controller 280 to allow a user to operate the gas analyzer 200 in a manual delivery mode. In other embodiments, software flowchart 1200 comprises a software block diagram for operating the gas analyzer 200 in a manual delivery mode. In some aspects, the flowchart 1200 can include a user selecting a run mode (as shown in box 1180) and can include the controller 280 checking the mode selected by the user (as shown in box 1202). If the user selects an automatic mode, the flowchart 1200 can proceed to an automatic delivery mode (as shown in box 1250). If the user selects a manual mode, the flowchart 1200 illustrates that some embodiments of the method proceed to a manual delivery mode (as shown in box 1204). In some aspects, once a user selects either a manual delivery mode or an automatic delivery mode, the selection choice can be retained by the controller 280 for subsequent portions of the flowchart 1200, until the user makes a different selection, in which case the original selection will be replaced.

In some embodiments, when a user selects a manual mode (as shown in box 1210), the controller 280 activates corresponding components of the gas analyzer 200 to carry out a manual delivery mode. Manual delivery mode can comprise the controller 280 activating and/or receiving concentration data from the sensors. The concentration data can include one or more of nitric oxide concentration data from the nitric oxide sensor 242, nitrogen dioxide concentration data from the nitrogen dioxide sensor 244, and oxygen concentration data from the oxygen sensor 246 (as shown in box 1205). One or more of the nitric oxide concentration data, nitrogen dioxide concentration data, and oxygen concentration data can be sent to the controller 280. The controller 280 can then analyze the received concentration data (as shown in box 1210). In some aspects, the user can enter one or more low and high alarm thresholds for one or more of a nitric oxide concentration, a nitrogen dioxide concentration, and an oxygen concentration (as shown in box 1215). In other aspects, the controller 280 can retain and refer to these user-input threshold values until subsequent user-input threshold values are received. In some aspects, the controller 280 can activate the user interface 260 to display one or more of the nitric oxide concentration data, nitrogen dioxide concentration data, and oxygen concentration data. In other aspects, the controller 280 can activate the user interface 260 to display one or more of the nitric oxide concentration data, nitrogen dioxide concentration data, and oxygen concentration data after analysis and/or processing by the controller 280. In yet other aspects, the controller 280 can activate the user interface 260 to display one or more of the nitric oxide concentration data, nitrogen dioxide concentration data, and oxygen concentration data after analysis and/or processing by the controller 280 based on calculating a rolling average for each of the different concentration data.

In some embodiments, the controller 280 calculates a rolling average (e.g., a moving average, running average, moving mean, and/or rolling mean) of one or more of the nitric oxide concentration data, the nitrogen dioxide concentration data, and/or the oxygen concentration data. Calculating a rolling average can comprise creating a series of averages of different subsets of the respective concentration data. Calculating a rolling average can smooth irregularities in the raw data. In some embodiments, calculating a rolling average comprises calculating an average of a subset of data and then shifting forward to calculate a new average by excluding one or more of the initial data points and including one or more subsequent data points. The process can be repeated as new data points are recorded. The size of the subset can be modified. A smaller subset can result in moving averages that more closely reflect the raw data while larger subsets more effectively smoothing out short-term fluctuations and emphasizing long term trends. Calculating the rolling average can comprise any suitable method for calculating a rolling average (e.g., calculating a simple moving average, calculating a cumulative moving average, calculating a weighted moving average, calculating an exponential moving average, and/or any other suitable weighting and/or calculation of a rolling average). In some embodiments, the controller 280 is configured to calculate a rolling average of one or more of the nitric oxide concentration data, the nitrogen dioxide concentration data, the oxygen concentration data, and/or any other suitable gas concentration data to display via the user interface 260. In other embodiments, the controller 280 is configured to calculate a rolling average of one or more of the nitric oxide concentration data, the nitrogen dioxide concentration data, and/or the oxygen concentration data to compare the concentration data with the user-input low and high threshold values. In yet other embodiments, the controller 280 can calculate a rolling average of one or more of the nitric oxide concentration data, the nitrogen dioxide concentration data, and/or the oxygen concentration data to meter the flow of nitric oxide into the blended gas mix. In some embodiments, the subset can comprise data points corresponding to a time length of about 1 second or less. In other embodiments, the subset can comprise data points corresponding to a time length of about 2 seconds or less. In yet other embodiments, the subset can comprise data points corresponding to a time length of about 5 seconds or less. In some embodiments, the subset can comprise data points corresponding to a time length of about 7 seconds or less. In other embodiments, the subset can comprise data points corresponding to a time length of about 10 seconds or less. In yet other embodiments, the subset can comprise data points corresponding to a time length of about 15 seconds or less.

In some embodiments, as the controller 280 analyzes the concentration data (as shown in box 1210) the controller 280 can compare the concentration data with the user-input low and high threshold values (as shown in box 1225) entered by the user. If the controller 280 determines that the concentration data are within the low and high threshold values, the controller 280 can return the flowchart 1200 process to check the mode selection (as shown in box 1202). If the controller 280 determines that one or more of the concentration data are not within the low and high threshold values, the controller 280 can activate the user interface 260 to activate a corresponding alarm, (as shown in box 1230). In some aspects the controller 280 can provide the user with the option of silencing the alarm (as shown in box 1235). In other aspects, if the user silences the alarm, the alarm is silenced for a specified interval of time and the flowchart 1200 illustrates that the process can return to the check the mode selection (as shown in box 1202). If the user chooses not to silence the alarm, the flowchart 1200 process can then return to the check the mode selection (as shown in box 1202). For example, if the user inputs low and high threshold values for the nitric oxide concentration of 10 ppm and 50 ppm, respectively, and the controller 280 determines a nitric oxide concentration of 35 ppm, the controller 280 will display the values with the user interface 260 and will not activate any alarms via the user interface 260. If in the same example the nitric oxide concentration increases to 55 ppm, the controller 280 would determine that the nitric oxide concentration exceeds the high threshold value of 50 ppm and would activate the user interface 260 to communicate an alarm. Likewise, in the same example, if the nitric oxide concentration decreased to 5 ppm, the controller 280 would determine that the nitric oxide concentration was below the low threshold value of 10 ppm and would activate the user interface 260 to communicate an alarm. In yet other embodiments, the logic process described in flowchart 1200 can comprise additional elements, can comprise fewer elements, can be arranged in different sequential arrangements, and/or can comprise different branching logic.

Figure 13:
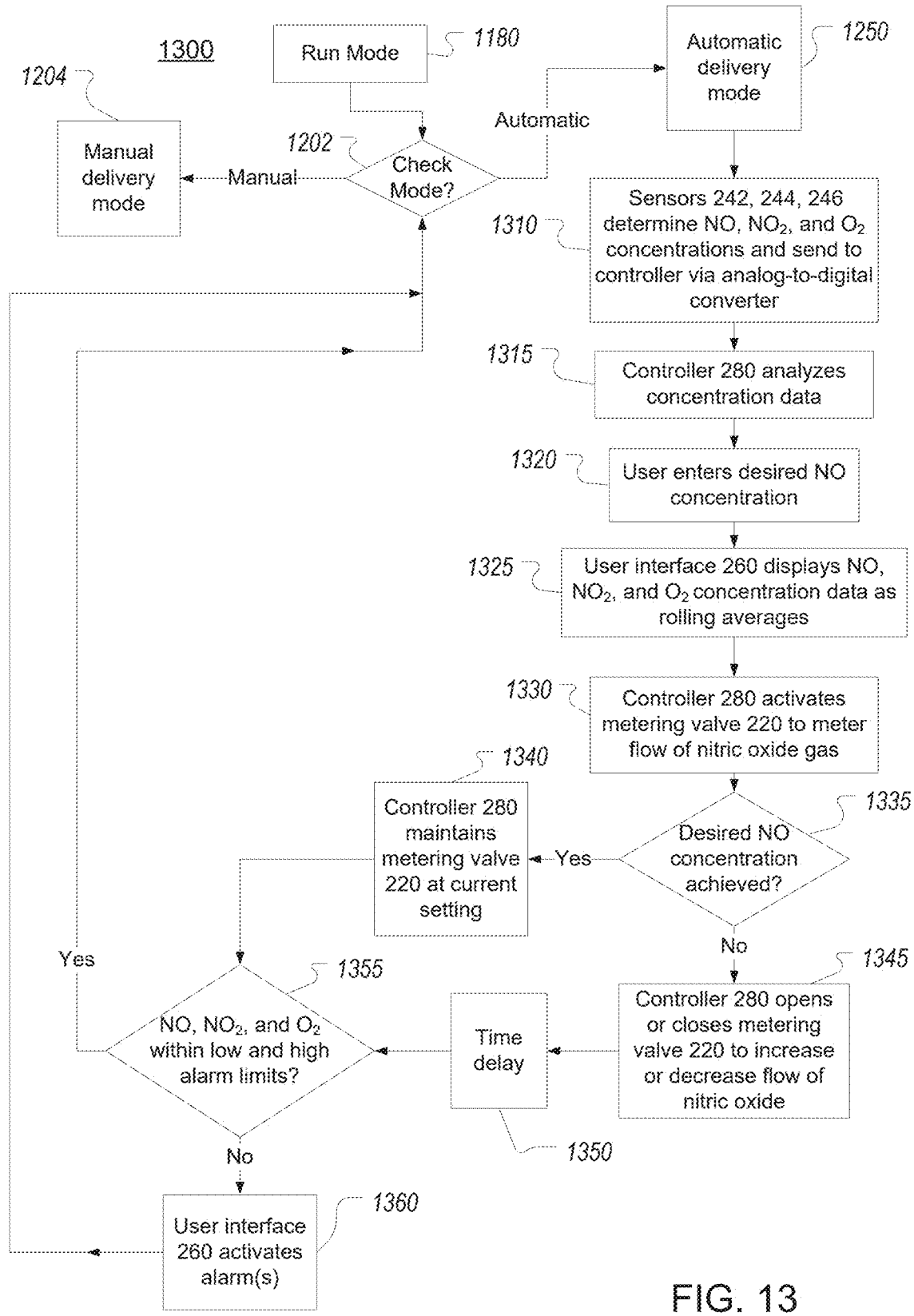
FIG. 13 illustrates some embodiments of a software flowchart for operating the gas analyzer in automatic mode.

Referring now to FIG. 13, a software flowchart 1300 illustrating some embodiments for operating the gas analyzer 200 in an automatic delivery mode is illustrated. In some embodiments, the flowchart 1300 illustrates a logic process used by the controller 280 to allow a user to operate the gas analyzer 200 in an automatic delivery mode. In other embodiments, the software flowchart 1300 comprises a software block diagram for operating the gas analyzer 200 in an automatic delivery mode. In some aspects, the flowchart 1300 can include a user selecting a run mode (as shown in box 1180) and can include the controller 280 checking the mode selected by the user (as shown in box 1202). If the user selects an automatic mode, the flowchart 1300 illustrates that the process can proceed to an automatic delivery mode (as shown in box 1250). If the user selects a manual mode, the flowchart 1300 illustrates that the process can proceed to a manual delivery mode (as shown in box 1204). In some aspects, once a user selects either a manual delivery mode or an automatic delivery mode, the selection choice is retained by the controller 280 for subsequent portions of the flowchart 1300, until the user makes a different selection, in which case the original selection will be replaced.

In some embodiments, when a user selects an automatic delivery mode (as shown in box 1250), the controller 280 can activate corresponding components of the gas analyzer 200 to carry out an automatic delivery mode. In some embodiments, automatic delivery mode comprises the controller 280 activating and/or receiving concentration data from the sensors. In some embodiments, the concentration data includes one or more of nitric oxide concentration data from the nitric oxide sensor 242, nitrogen dioxide concentration data from the nitrogen dioxide sensor 244, oxygen concentration data from the oxygen sensor 246 (as shown in box 1310), and/or any other suitable concentration data. One or more of the nitric oxide concentration data, nitrogen dioxide concentration data, and oxygen concentration data can be sent to the controller 280. The controller 280 can then analyze the received concentration data (as shown in box 1315). In some aspects, the user enters a desired nitric oxide concentration value. In other aspects, the user enters one or more of a desired nitric oxide concentration value or a desired oxygen concentration value. In yet other aspects, the controller 280 retains and/or refers to these desired concentration values.

In some aspects, the controller 280 activates the user interface 260 to display one or more of the nitric oxide concentration data, nitrogen dioxide concentration data, and oxygen concentration data. In other aspects, the controller 280 activates the user interface 260 to display one or more of the nitric oxide concentration data, nitrogen dioxide concentration data, and oxygen concentration data after analysis and/or processing by the controller 280. In yet other aspects, the controller 280 activates the user interface 260 to display one or more of the nitric oxide concentration data, nitrogen dioxide concentration data, and oxygen concentration data after analysis and/or processing by the controller 280 based on calculating a rolling average for each of the different concentration data (as described above).

In some embodiments, the controller 280 activates the metering valve 220 to meter a flow of nitric oxide gas through the nitric oxide metering circuit 201 (as shown in box 1330). In other embodiments, the controller 280 activates the metering valve 220 to meter a flow of nitric oxide through the nitric oxide metering circuit 201 based on one or more of the desired concentrations (as shown in box 1320) and/or the concentration data received from the sensors (as shown in box 1310). In yet other embodiments, the controller 280 activates metering valve 220 to meter a flow of nitric oxide through the nitric oxide metering circuit 201 by opening and closing the metering valve 220 to achieve a nitric oxide concentration matching the user-input desired nitric oxide concentration. In some aspects, the controller 280 determines if the desired nitric oxide concentration has been achieved. In other aspects, the controller 280 determines if the desired nitric oxide concentration has been achieved based on the user-input desired concentration values and the analysis of the received concentration data by the controller 280. If the nitric oxide concentration has been achieved, the controller 280 maintains the metering valve 220 at the current setting (as shown in box 1340). If the nitric oxide concentration has not been achieved, the controller 280 can open or close the metering valve 220 to increase or decrease flow of nitric oxide, thereby increasing or decreasing the nitric oxide concentration (as shown in box 1345). If the controller 280 opens and closes the metering valve 220 to increase and decrease flow of nitric oxide, the controller 280 can institute a time delay (as shown in box 1350) to allow for the flow of nitric oxide and the concentration of nitric oxide to stabilize.

In some embodiments, low and high alarm thresholds for one or more of a nitric oxide concentration, a nitrogen dioxide concentration, and an oxygen concentration are preset for the gas analyzer 200 and the user is not able to enter thresholds for the automatic delivery mode. In other embodiments, the low and high alarm thresholds can be set by the controller 280 as a predetermined window around the user-input desired concentrations. For example, if the predetermined window around the user-input desired concentration is +/−3 ppm and the user-input desired concentration is 10 ppm, the controller 280 can set the low alarm threshold to 7 ppm and the high alarm threshold to 13 ppm. In yet other embodiments, flowchart 1300 can comprise determining whether one or more of the concentration data are within the low and high alarm threshold values, (as shown in box 1355). If the concentration data are within the low and high alarm threshold values, the flowchart 1300 process can return to the check mode selection (as shown in box 1202). If one or more of the concentration data are not within the low and high alarm threshold values, the controller 280 can direct the user interface 260 to activate corresponding alarms (as shown in box 1360) and then the flowchart process 1300 can return to the check the mode selection (as shown in box 1202). In some aspects, the user can have the option of silencing the alarm for a predetermined amount of time. In yet other embodiments, the logic process described in flowchart 1400 can comprise additional elements, can comprise fewer elements, can be arranged in different sequential arrangements, and/or can comprise different branching logic.

The described systems and methods can be used with or in any suitable operating environment and/or software. In this regard, FIG. 14 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 14:
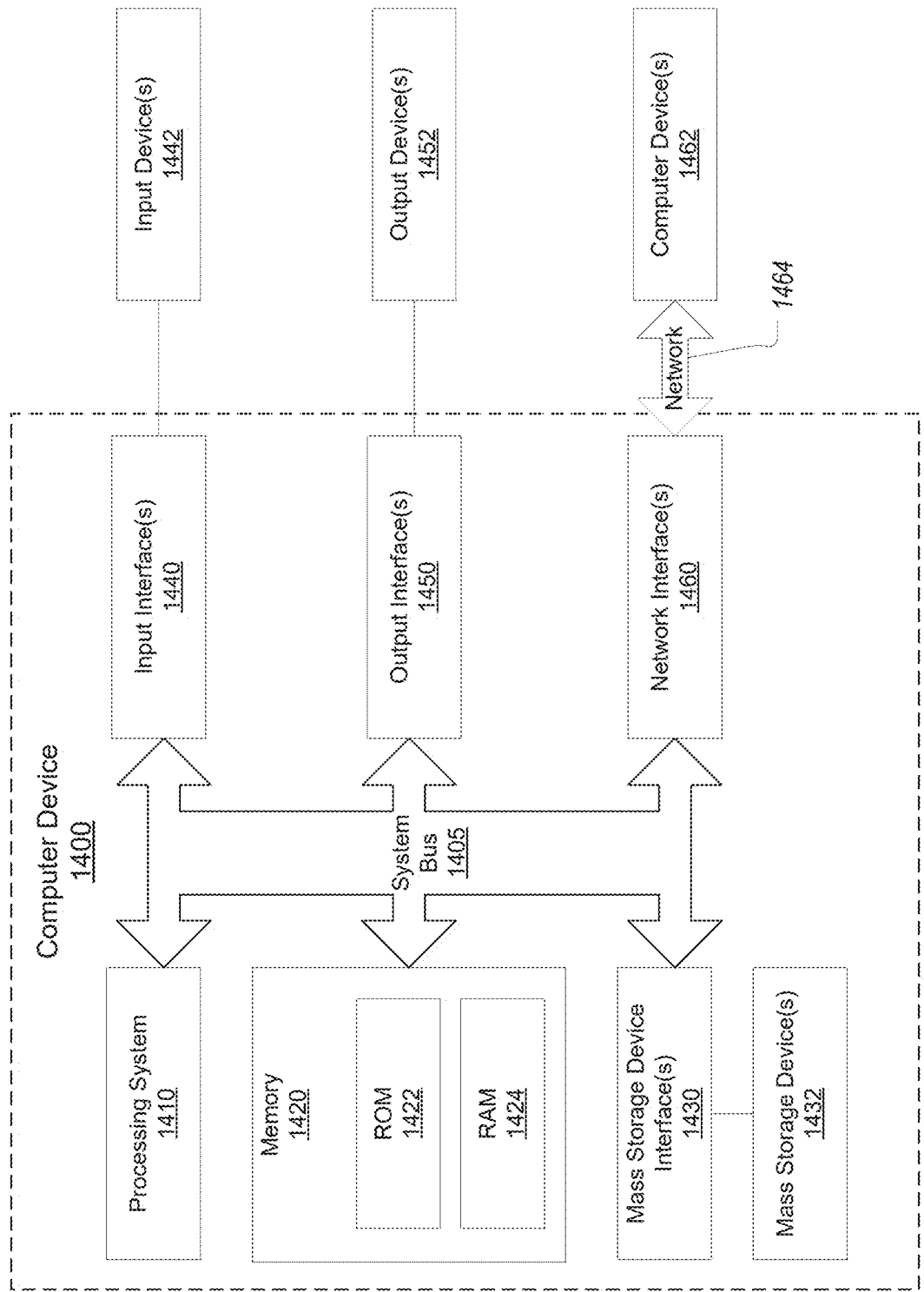
FIG. 14 illustrates a representative system that provides a suitable operating environment for use with some embodiments of the gas analyzer.

With reference to FIG. 14, a representative system includes computer device 1400 (e.g., a digital ratings device or other unit), which may be a general-purpose or special-purpose computer. For example, computer device 1400 may be a personal computer, a notebook computer, a PDA or other hand-held device, a workstation, a digital pen, a digital ratings device, a digital ratings device dock, a digital ratings device controller, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 1400 includes system bus 1405, which may be configured to connect various components thereof and enables data to be exchanged between two or more components. System bus 1405 may include one of a variety of bus structures including a memory bus or memory controller, a peripheral bus, or a local bus that uses any of a variety of bus architectures. Typical components connected by system bus 1405 include processing system 1410 and memory 1420. Other components may include one or more mass storage device interfaces 1430, input interfaces 1440, output interfaces 1450, and/or network interfaces 1460, each of which will be discussed below.

Processing system 1410 includes one or more processors, such as a central processor and optionally one or more other processors designed to perform a particular function or task. It is typically processing system 1410 that executes the instructions provided on computer readable media, such as on the memory 1420, a magnetic hard disk, a removable magnetic disk, a magnetic cassette, an optical disk, or from a communication connection, which may also be viewed as a computer readable medium.

Memory 1420 includes one or more computer readable media (including, without limitation, non-transitory computer readable media) that may be configured to include or includes thereon data or instructions for manipulating data, and may be accessed by processing system 1410 through system bus 1405. Memory 1420 may include, for example, ROM 1422, used to permanently store information, and/or RAM 1424, used to temporarily store information. ROM 1422 may include a basic input/output system ("BIOS") having one or more routines that are used to establish communication, such as during start-up of computer device 1400. RAM 1424 may include one or more program modules, such as one or more operating systems, application programs, and/or program data.

One or more mass storage device interfaces 1430 may be used to connect one or more mass storage devices 1432 to the system bus 1405. The mass storage devices 1432 may be incorporated into or may be peripheral to the computer device 1400 and allow the computer device 1400 to retain large amounts of data. Optionally, one or more of the mass storage devices 1432 may be removable from computer device 1400. Examples of mass storage devices include hard disk drives, magnetic disk drives, tape drives, solid state mass storage, and optical disk drives.

Examples of solid state mass storage include flash cards and memory sticks. A mass storage device 1432 may read from and/or write to a magnetic hard disk, a removable magnetic disk, a magnetic cassette, an optical disk, or another computer readable medium. Mass storage devices 1432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 1440 may be employed to enable a user to enter data (e.g., initial information) and/or instructions to computer device 1400 through one or more corresponding input devices 1442. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 1440 that may be used to connect the input devices 1442 to the system bus 1405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 1450 may be employed to connect one or more corresponding output devices 1452 to system bus 1405. Examples of output devices include a monitor or display screen, a speaker, a wireless transmitter, a printer, and the like. A particular output device 1452 may be integrated with or peripheral to computer device 1400. Examples of output interfaces include a video adapter, an audio adapter, a parallel port, and the like.

One or more network interfaces 1460 enable computer device 1400 to exchange information with one or more local or remote computer devices, illustrated as computer devices 1462, via a network 1464 that may include one or more hardwired and/or wireless links. Examples of the network interfaces include a network adapter for connection to a local area network ("LAN") or a modem, a wireless link, or another adapter for connection to a wide area network ("WAN"), such as the Internet. The network interface 1460 may be incorporated with or be peripheral to computer device 1400.

Figure 15:
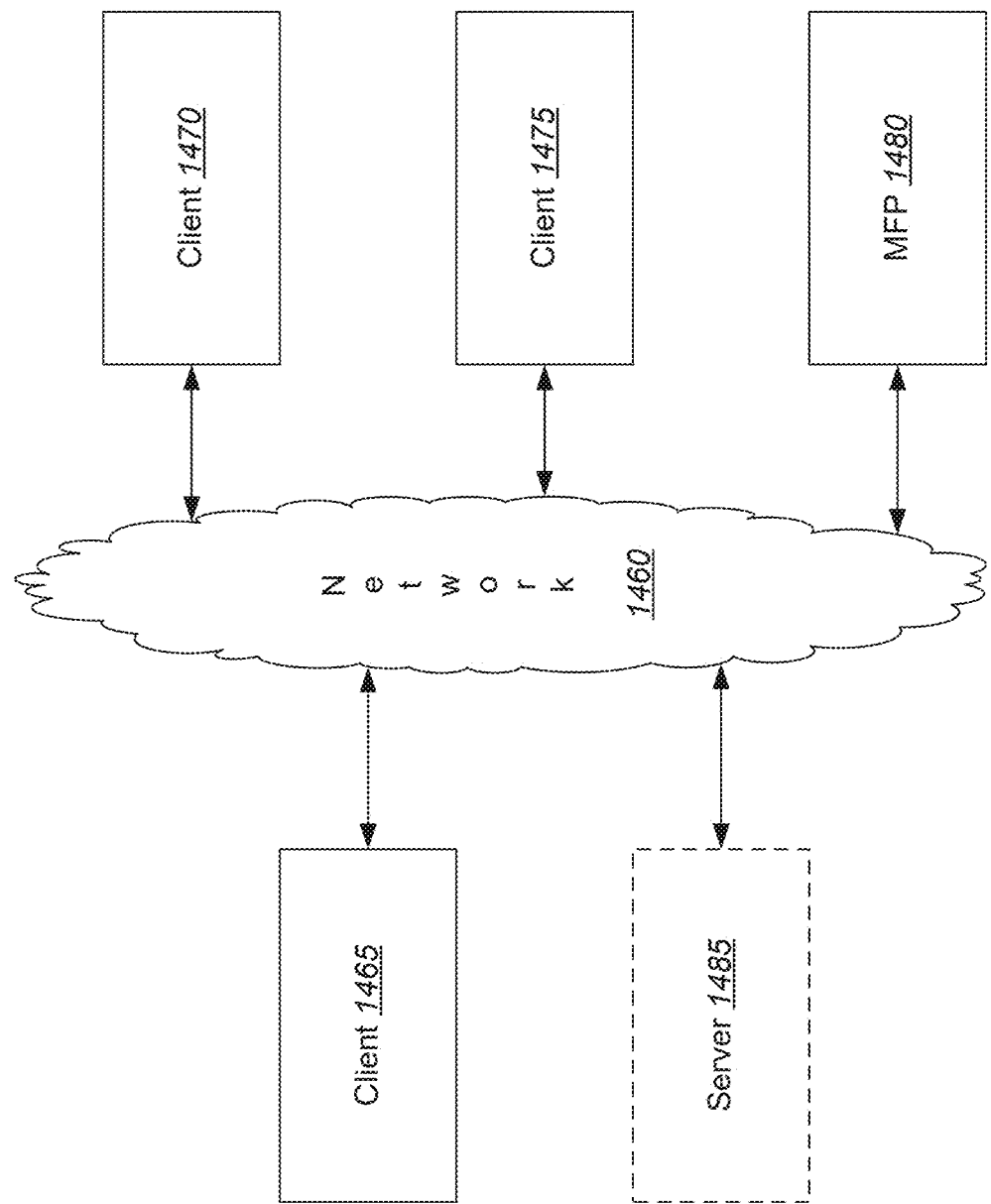
FIG. 15 illustrates a representative embodiment of a networked system that provides a suitable operating environment for use with some embodiments of the gas analyzer.

In a networked system, accessible program modules or portions thereof may be stored in a remote memory storage device. Furthermore, in a networked system computer device 1400 may participate in a distributed computing environment, where functions or tasks are performed by a plurality of networked computer devices. While those skilled in the art will appreciate that the described systems and methods may be practiced in networked computing environments with many types of computer system configurations, FIG. 15 represents an embodiment of a portion of the described systems in a networked environment that includes clients (1465, 1470, 1475, etc.) connected to a server 1485 via a network 1460. While FIG. 15 illustrates an embodiment that includes 3 clients (e.g., gas analyzers, integrated systems for analyzing and delivering nitric oxide, etc.) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote monitoring, observation, adjusting, collaborating, and other controlling of systems 100, 200, 300, 400, 401, 500, 600, 700, 800, 900, 1000, 1100, 1200, and/or 1300 from many places throughout the world.

In some aspects, the described gas analyzer 200 and/or the described integrated system 400 can be modified in any suitable manner. Indeed, in some embodiments, the gas analyzer 200 is modified to be portable and/or to be easily transported by the user. In some aspects, a portable and/or easily transportable gas analyzer 200 can be effective for delivering a therapeutic blend of nitric oxide gas to a patient in the field. The portable and/or easily transportable gas analyzer 200 can be configured to be used by a medical first responder. The portable and/or easily transportable gas analyzer 200 can also be configured to be used to administer a therapeutic blend of nitric oxide gas to a patient during transport (e.g., during transport by an ambulance, medical aircraft, and/or any other suitable medical transport). The portable and/or easily transportable gas analyzer 200 can also be configured to be used to administer a therapeutic blend of nitric oxide gas to a patient at a first aid station, a field hospital, an urgent care clinic, a triage unit, a home, a care facility, and/or any other suitable medical facility.

In some aspects, the portable and/or easily transportable gas analyzer 200 can be configured to be highly portable, to be easily transported by a user, to be self-contained, to be lightweight, and/or to have any other configuration that renders the gas analyzer 200 portable and/or easily transportable. For example, the gas analyzer 200 can be configured to be easily carried by a user (e.g., carried by one or both hands by the one or more handles, integral handles on any other suitable handle, on the gas analyzer 200, carried by one or more shoulder straps, and/or carried in a backpack, shoulder bag, and/or other suitable carrier). In some aspects, the gas analyzer is configured to use one or more portable nitric oxide sources and/or portable air sources. The portable nitric oxide sources can be configured to be easily carried by the user with the gas analyzer 200 (e.g., carried in a backpack, shoulder bag, and/or other suitable carrier). The portable nitric oxide source can also be configured to detachably couple and/or attach to the housing 210 (and/or any other suitable portion) of the gas analyzer 200. The portable air sources can also be configured in like manner to be easily carried by the user and/or to detachably couple and/or attach to the housing 210 (and/or any other suitable portion) of the gas analyzer 200.

Figure 16:
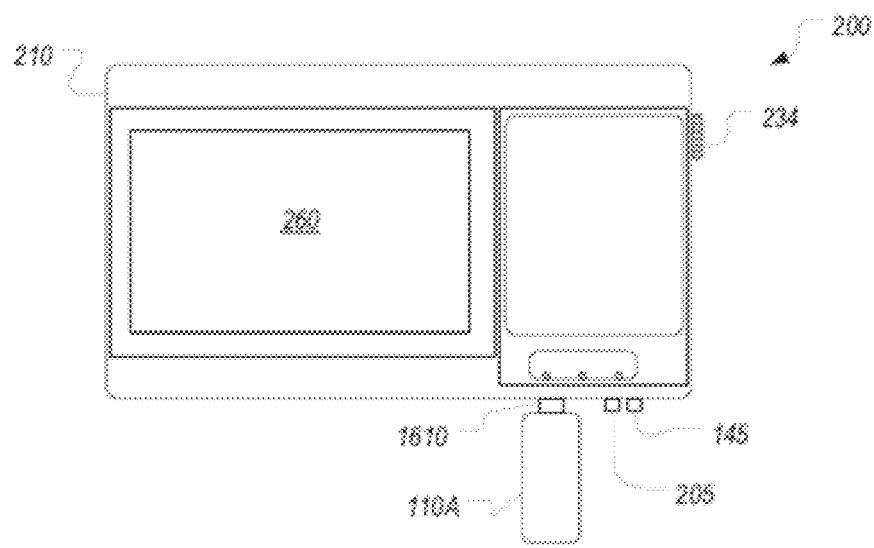
FIG. 16 illustrates a representative embodiment of the gas analyzer with a nitric oxide manifold.

Referring now to FIG. 16, some embodiments of a portable gas analyzer 200 are illustrated. In some embodiments, the portable gas analyzer is configured to be lightweight and/or easily transportable. Indeed, in some embodiments, the portable gas analyzer 200 comprises a nitric oxide manifold 1610. The nitric oxide manifold 1610 can be configured to selectively and detachable couple a lightweight nitric oxide source 110A (and/or any other suitable nitric oxide source) to the portable gas analyzer 200. In some embodiments, the nitric oxide manifold 1610 is configured to threadedly couple the lightweight nitric oxide source 110A to the nitric oxide line 115 and/or the nitric oxide intake line 218. In other embodiments, the nitric oxide manifold 1610 is configured to detachably and selectively couple the lightweight nitric oxide source 110A to the nitric oxide line 115 and/or the nitric oxide intake line 218 with any suitable coupler, connector, adaptor, and/or fitting. In yet other embodiments, the nitric oxide manifold 1610 is further configured to rigidly secure the lightweight nitric oxide source 110A to the portable gas analyzer 200. In some embodiments, the housing 210 is configured to accommodate the lightweight nitric oxide source 110A. For example, the housing 210 can be configured with an opening, clip, strap, and/or any other suitable feature to accept at least part of the lightweight nitric oxide source 110A. In some aspects, the housing 210 can be configured with one or more depressions, slots, channels, openings, and/or any other suitable feature to accept and/or house the lightweight nitric oxide source 110A.

In some embodiments, the nitric oxide manifold 1610 comprises a pressure regulator (e.g., a pressure regulator that is coupled to the nitric oxide manifold 1610 and/or any other suitable pressure regulator) configured to regulate a pressure of nitric oxide in the lightweight nitric oxide source 110A. The integrated pressure regulator can be configured to regulate a flow of nitric oxide gas at any suitable pressure from the lightweight nitric oxide source 110A to the gas analyzer 200 (e.g., at a pressure of between about 5 psig and about 100 psig, or any suitable range thereof, such as about 50 psig+/−20 psig). The integrated pressure regulator can be configured to regulate the flow of nitric oxide gas at a single pressure or at a range of pressures that can be set and/or adjusted manually and/or automatically.

In some embodiments, the lightweight nitric oxide source 110A can comprise any suitable lightweight container configured to contain nitric oxide. For example, the lightweight nitric oxide source 110A can comprise one or more M2 size medical gas cylinders. In some aspects, the lightweight nitric oxide source 110A can comprise a lightweight gas cylinder smaller than a M2 size medical gas cylinder. In other aspects, the lightweight nitric oxide source 110A can be configured to weigh less than about 0.1 pounds, less than about 0.2 pounds, less than about 0.3 pounds, less than about 0.4 pounds, less than about 0.4 pounds, less than about 0.5 pounds, less than about 0.6 pounds, less than about 0.7 pounds, less than about 0.8 pounds, less than about 0.9 pounds, less than about 1.0 pounds, less than about 10 pounds, and/or any other suitable weight.

In some embodiments, the lightweight nitric oxide source 110A can be configured with a self-sealing valve and/or connection. In some aspects, the self-sealing valve can be configured such that the lightweight nitric oxide source 110A remains sealed until the lightweight nitric oxide source 110A is coupled to the nitric oxide manifold 1610. In other aspects, the lightweight nitric oxide source 110A can reseal when the lightweight nitric oxide source 110A is removed from the nitric oxide manifold 1610. In other aspects, the lightweight nitric oxide source 110A can be configured for a single use. In yet other aspects, the lightweight nitric oxide source 110A can also be configured to be refilled for multiple uses.

Figure 17:
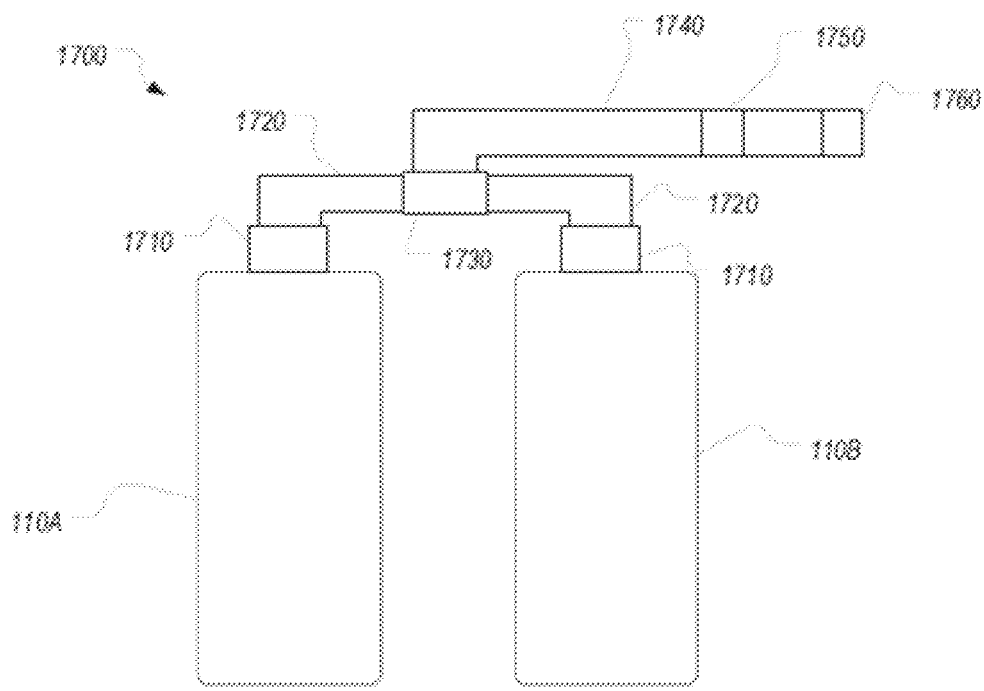
FIG. 17 illustrates a representative embodiment of a multiple source nitric oxide manifold.

Referring now to FIG. 17, some embodiments of a multiple source nitric oxide manifold 1700 are illustrated. In some embodiments, the multiple source nitric oxide manifold 1700 is configured to selectively and detachably couple a first lightweight nitric oxide source 110A and a second lightweight nitric oxide source 110B to the portable gas analyzer 200. The multiple source nitric oxide manifold 1700 can be configured with couplings 1710 to detachably and selectively couple the first lightweight nitric oxide source 110A, a second lightweight nitric oxide source 110B, a third, and/or any suitable number of lightweight nitric oxide sources (and/or any other suitable gas sources) to the nitric oxide line 115 and/or the nitric oxide intake line 218. The couplings 1710 can comprise any suitable coupler, connector, adaptor, and/or fitting. In other embodiments, the multiple source nitric oxide manifold 1700 is configured to selectively and detachably couple a plurality of nitric oxide and/or air sources.

The couplings 1710 can be in fluid communication with a switching valve 1730 via connecting lines 1720. The switching valve 1730 can be configured to switch flow to the gas analyzer 200 between the first lightweight nitric oxide source 110A, the second lightweight nitric oxide source 110B, and/or any other suitable source. The switching valve 1730 can be configured to allow nitric oxide to flow from the first lightweight nitric oxide source 110A until the nitric oxide from first lightweight nitric oxide source 110A is depleted (or nearly depleted) and then switch to flow from the second lightweight nitric oxide source 110B. The switching valve 1730 can also be configured to allow nitric oxide to flow from the second lightweight nitric oxide source 110B until the nitric oxide from second lightweight nitric oxide source 110B is depleted (or nearly depleted) and then switch to flow from the first (or any other suitable) lightweight or other nitric oxide source 110A. In some embodiments, the switching valve 1730 is configured to allow a user to switch between the first lightweight nitric oxide source 110A and the second lightweight nitric oxide source 110B. In other embodiments, the switching valve 1730 is configured to automatically switch between the first lightweight nitric oxide source 110A and the second lightweight nitric oxide source 110B. The switching valve 1730 can comprise any suitable valve effective for switching between one or more nitric oxide sources. For example, the switching valve 1730 can be configured as a mechanically-actuated valve that is governed by the pressures of the first lightweight nitric oxide source 110A and the second lightweight nitric oxide source 110B. A low pressure in either source can trigger the switching valve to select the source with the higher pressure. In some embodiments, the switching valve is configured to allow equal flow from each nitric oxide source to the gas analyzer 200. In other embodiments, the controller 280 (and/or a controller in the manifold 1700 is configured to control switching valve 1730 (e.g., via one or more solenoids, actuators, servos, and/or any other suitable devices). In yet other embodiments, the switching valve 1730 is configured to provide a constant flow of nitric oxide to the gas analyzer 200 by switching flow from an empty or near empty nitric oxide source to another nitric oxide source.

In some embodiments, the switching valve 1730 is in fluid connection with the gas analyzer via a connecting line 1740. The coupling line 1740 can also comprise a regulator 1750 configured to regulate a pressure of nitric oxide from the multiple source nitric oxide manifold 1700 to the portable gas analyzer 200. The regulator 1750 can be configured to regulate a flow of nitric oxide gas at any suitable pressure (e.g., at a pressure of between about 5 psig and about 100 psig, or any suitable range thereof, such as about 50 psig+/−20 psig). The regulator 1750 can also be configured to regulate the flow of nitric oxide gas at a single pressure or at a range of pressures that can be set and/or adjusted manually and/or automatically. The connecting line 1740 can also comprise a manifold coupler 1760 configured to couple the multiple source nitric oxide manifold 1700 to the portable gas analyzer 200. The manifold coupler 1760 can comprise any coupler, connector, and/or fitting suitable for fluidly coupling the multiple source nitric oxide manifold 1700 to the portable gas analyzer 200. In some embodiments, the manifold coupler 1760 is configured to quickly couple and/or uncouple from the gas analyzer 200. The manifold coupler 1760 can comprise any connector effective for quickly coupling and uncoupling (e.g., a quick connect Swagelok fitting and/or any other suitable fitting).

In some embodiments, the portable gas analyzer 200 is configured with one or more air source manifolds configured to selectively and detachably couple one or more air sources (e.g., one or more lightweight or other suitable air sources) to the portable gas analyzer 200. Indeed, in some embodiments, the one or more lightweight air sources and the air source manifolds is similar in configuration to the nitric oxide sources and nitric oxide manifolds described in FIGS. 16 and 17. In other embodiments, the portable gas analyzer 200 is configured with a manifold configured to detachably and selectively couple one or more nitric oxide sources and one or more air sources to deliver nitric oxide and air gas to the gas analyzer 200. In yet other embodiments, the manifold is configured to blend metered nitric oxide with air gas to generate a blended gas mixture.

Nitric Oxide Analyzer Delivery System with Bio-Feedback Capability

When delivering high dose inhaled nitric oxide therapy, it can be helpful to have a feedback mechanism to alert the caregiver of a condition called methemoglobinemia. This dangerous condition is caused by the excessive occupation of the oxygen sites on the red blood cells by nitric oxide. This condition is not unlike carbon monoxide poisoning but is more critical because of the greater affinity of nitric oxide to the heme sites, (ten thousand times stronger than carbon monoxide). The patient suffocates because of lack of oxygen to the body cells.

Methemoglobinemia may be attenuated by discontinuing inhalation of nitric oxide. The body will correct this condition once inhalation of air or oxygen is continued. Continuous blood gas monitoring can be used to notify the caregiver of methemoglobinemia in advance. Normal hemoglobin gas percentage is around 3%. It becomes too high when the patient reaches 5%. An unacceptably high percentage can require discontinuation of the nitric oxide gas delivery to attenuate over saturations.

At least some prior models of analyzers do not have the capability of analyzing, notifying, adjusting, or discontinuing nitric oxide flow when methemoglobin percentages are unacceptable.

Some embodiments of the new proprietary analyzer/monitor have the capability of continuous monitoring of blood gases using pulse oximetry. In this regard, the system can comprise any suitable pulse oximeter and/or other sensor that is capable of being used to determine methemoglobin levels. In some embodiments, feedback from such sensor is used to provide one or more notifications to a user (e.g., reporting methemoglobin levels, beeping, flashing, and/or providing any other suitable type of notification); to increase, decrease, stop, and/or otherwise adjust the flow of nitric oxide; and/or to perform any suitable function.

Stabilized and $NO_2$-Inhibited Nitric Oxide Generating Gels for Inhaled Nitric Oxide Therapy Nitric Oxide ("NO") is a small gaseous molecule which can be a major controller of biological activity in the human body. Our bodies produce NO naturally. It can be a potent vasodilator and have anti-bacterial and anti-viral properties. It can be anti-inflammatory, promote healing, and/or stimulate blood vessel formation, among many other properties. Its unique biological activity, unusual structure, and unprecedented function have arguably, more than any other natural product, opened new avenues into disease treatment.

Inhaled NO has been used for over twenty years in the United States and other countries as an accepted method to treat pulmonary hypertension/respiratory failure in premature and term infants. Also, importantly, this gas is FDA approved.

NO not only can have anti-bacterial properties but it can also have anti-inflammatory properties. NO enhances faster and greater protective effects. It is evident that the diffusible, gaseous NO also can stimulate wound healing and collagen formation. When people are ill or aged, their natural ability to produce NO decreases. The decreased production of NO can reduce the body's ability to fight disease, heal wounds, burns, and can make one more susceptible to the body's aging process.

In accordance with some embodiments, the described systems and methods include a mechanism that is configured to produce nitric oxide gas by combining sodium nitrite and an organic acid. In accordance with some such embodiments, these compounds remain static until mixed together. In some cases, when mixed, they produce NO gas. Moreover, in some such cases, the gel-produced NO can be inhaled without adverse side effects. NO can kill dangerous bacteria and viruses such as MRSA, H1N1, and COVID-19. In fact, many diseases and infections respond favorably to NO treatment. There are many kinds of bacteria that in recent years have become resistant to antibiotics. However, it is the inventor's understanding that no bacteria have developed resistance to NO, over many years of testing. In some cases, NO has a 100% kill rate against the bacteria and viruses tested. The gels and the NO are generally non-toxic and non-carcinogenic, and therefore can be used liberally, without adverse effects in a wide variety of applications. Indeed, it is the inventor's understanding that all of the ingredients in both gels described herein come from the FDA approved list of "Generally Recognized as Safe and Effective" ("GRASE") ingredients. The inventor has learned from years of testing treatments and unique delivery protocols, and, importantly, dosing regimens that are proprietary. As a result, the inventor has found that some embodiments of the described systems and methods make it possible to successfully stop and heal many very serious diseases.

In accordance with some embodiments, gels and other proprietary products have been developed (and are disclosed herein) that produce nitric oxide gas from acidified nitrites in a form that can be used in many different compounds and doses to treat many different ailments. Below is only a partial list of diseases that respond to applications developed (e.g., the inventor's proprietary products that are ready for immediate manufacture, and sale to the public.) In accordance with some embodiments (and as mentioned), the NO gas can treat the following conditions: COVID-19, H1N1, and other strains of coronaviruses that might cause pandemic conditions.

NO gas produced in accordance with some embodiments of the described systems and methods can also be used for pain relief, burns, acne, hand sanitizer, skin care lotions and creams, foot bath, mouth wash, infected and non-healing wounds, skin cancer, surgical site sterilization, and/or for any other suitable purpose.

In accordance with some embodiments, technologies have been developed and are disclosed herein that economically produce high, but safe, concentrations of nitric oxide gas. This technology is safe, scalable, and has no Department of Transportation restrictions as do some large cylinder containers.

Some competing formulations of acidified nitrite gels generate equal amounts of both nitric oxide gas and unwanted, and harmful, nitrogen dioxide gas for therapeutic inhalation. Indeed, some such thickened acidic gel formulations do not maintain viscosity for an acceptable time. This can be a detrimental defect because it can compromise the predictable and repeatable delivery of desired precise dosages of the nitric oxide gas needed for inhaled therapy.

Some competing gel formulations do not account for the equal amount of nitrogen dioxide generated when the gels are combined. In this regard, nitrogen dioxide can be extremely dangerous as it turns to nitric acid when exposed to moisture and oxygen in the lungs, thus destroying lung tissue.

The uniquely powerful qualities and beneficial use of nitric oxide, as delivered by the described systems and methods can be made available at affordable prices to people in all nations, and thus deliver outcomes that are now available only in a few countries due to high costs.

Many unsuccessful variations of thickeners and stabilizers were tried over a period of two years by professional formulators, manufacturers, and pharmaceutical companies.

None were successful in halting the deterioration of the viscosity of the acidic gel. It is the inventor's understanding that the solution to this problem was not obvious to any professional formulators who were familiar with or tried to solve the problem.

In accordance with some embodiments of the systems and methods described herein, the addition of a sodium bentonite emulsion to the formula accomplished two important, wanted results. First, the viscosity of the acidic gel was, in some embodiments, stabilized.

Second, the addition of sodium from the sodium bentonite to the formula provided extra sodium ions that used the oxygen from the nitrogen dioxide to produce, in some embodiments, even more molecules of useful and healing nitric oxide gas. Nitrogen dioxide is unwanted because it can acquire oxygen and water to form deadly nitric acid in the lungs.

Some earlier formulas used sodium nitrite and citric acid and ascorbic acid to yield one molecule of nitric oxide and one molecule of nitrogen dioxide.

In accordance with some embodiments, the addition of sodium bentonite to the compounds causes the nitrogen dioxide, when two gel components are mixed, to rapidly give up its oxygen to form more of useful and healing nitric oxide gas.

The transfer of the oxygen resulting in the removal of the dangerous nitrogen dioxide, is (in some embodiments) caused by the addition of the sodium bentonite, and can be beneficial to the safety and efficacy of inhaled nitric oxide therapy.

In accordance with some embodiments, the described compositions are created through the following formulation: $NaNO_2+C_6H_8O_7+Al_2H_2Na_2O_{13}Si_4+C_{29}H_{54}O_{16}+NaCl+NaHCO_3+H_2O=NO+water+cellulose+NaHCO_3$ (baking soda)$+C_{29}H_{54}O_{16}$ (hydroxypropylmethocell).

In some embodiments, the proprietary formula consists of two gel compositions, which can be referred to as Gel A and Gel B.

In some cases, the formula for Gel A, the acidic gel, includes H2O+Hydroxypropylmethocell+Baking soda+Citric Acid+$Al_2H_2Na_2O_{13}Si_4$. Indeed, in some embodiments, Gel A is optionally created through the following formulation: 1 Liter $H_2O$+24.85 gm $C_{29}H_{54}O_{16}$+1.2 gm Baking Soda+60.5 gm $C_6H_8O_7$ (Citric acid)+1.5 gm $Al_2H_2Na_2O_{13}Si_4$ (Sodium Bentonite), and includes sodium bentonite, which can function as a thickener, as a stabilizer, and unexpectedly and surprisingly as an $NO_2$-inhibitor for this gel. In this regard, it is the inventor's understanding that this characteristic was unknown until an analyzer with a sufficiently high range was available. Of course, any other formulations and concentrations can be used. Indeed, the acids can comprise any suitable organic acid. It should also be noted that sodium bentonite used in conjunction with the nitric oxide generation gel to enhance nitric oxide generation is an unanticipated and unknown surprise. Additionally, the sodium in the bentonite appears to pull oxygen from the $NO_2$, creating another wanted nitric oxide molecule.

In some embodiments, the formula for Gel B, the nitrite gel, includes $H_2O$+$C_{29}H_{54}O_{16}$ (Hydroxypropylmethocell)+$NaNO_2$+$NaHCO_3$(Baking soda). Indeed, in some embodiments, the formula for Gel B includes 1 liter $H_2O$+80.5 gm $NaNO_2$+24.85 gm $C_{29}H_{54}O_{16}$ (Methocel)+1.2 gm $NaHCO_3$ (Baking Soda). Of course, any other formulations and concentrations can be used.

In some cases, the formula for the combination of the two gels and the NO gas produced can be described as follows: $NaNO_2+C_6H_8O_7+Al_2H_2Na_2O_{13}Si_4+C_{29}H_{54}O_{16}+NaCl+NaHCO_3++H_2O$. In some cases, 1 Liter $H_2O$+24.85 gm $C_{29}H_{54}O_{16}$+1.2 gm Baking Soda+60.5 gm $C_6H_8O_7$ (Citric acid)+1.5 gm $Al_2H_2Na_2O_{13}Si_4$ (Sodium Bentonite)+1 liter $H_2O$+80.5 gm $NaNO_2$+24.85 gm $C_{29}H_{54}O_{16}$ (Methocel)+1.2 gm Baking Soda=NO+water+cellulose+baking soda+hydroxypropylmethocell. Of course, any other formulations and concentrations can be used.

In accordance with some embodiments of the described systems and methods, when Gel A and Gel B are combined in approximately equal quantities of approximately 5 gm each (or any other suitable amount), an inhalable and highly concentrated gas is created that delivers an unprecedented 3,500 to 7,000 parts per million of NO gas, while inhibiting the production of unwanted $NO_2$ gas. In some cases, when the two gels, A and B, are combined and mixed together, nitric oxide gas in the form of small bubbles begins to form. In accordance with some prior formulations, both nitric oxide and nitrogen dioxide were formed in equal amounts. In accordance, however, with some embodiments of the described systems and methods nitrogen dioxide is changed to nitric oxide so that there are two sources of the wanted nitric oxide gas and the nitrogen dioxide is decreased.

The effect is that more of the desired nitric oxide is available for inhalation.

Maximum and Minimum Ranges of Gel Active Ingredients:

The concentration of active ingredients of both Gels A and B can be present in the gels in any suitable range. Indeed, in some embodiments, one or more of the active ingredients (e.g., any suitable organic acid, sodium nitrite donor, and/or nitrite donor) is present in the gels at a concentration that is as low as 1 gm of citric acid and 1 gm of sodium nitrite per ml. The mixture can be as low as 1 ml of each gel when mixed.

In accordance with some embodiments, the maximum range of active ingredients of both gels A and B can be as high as double the molar concentrations of acidic and basic ingredients to generate 100% (or any other suitable amount of) nitric oxide.

Some embodiments of a new proprietary dosage protocol are described herein. In this regard, some tests have shown that greater than 325 parts per million concentrations of NO gas are effective in arresting the reproduction of viruses and bacteria that cause disease, and other respiratory problems. Higher concentrations of NO gas may require additional precautions to prevent the nitric oxide from completely occupying all the red blood cells' oxygen receptor sites. Intermittent inhalation of nitric oxide may be practiced so that the oxygen sites on the red blood cells are free to recruit oxygen. In some cases, once the cells are oxygenated another dose of nitric oxide is given. This cycle can be repeated as often as necessary in order to achieve a dose capable of disabling a virus or bacteria. This is the opposite of what is often currently practiced in medicine, where continuous dosages are often limited to only 100 parts per million. With the higher concentration of the nitric oxide gas, some embodiments of the described proprietary protocol also change the currently accepted delivery pattern from "continuous"- or twenty-four (24) hours per day, to a model of three (3) to six (6) treatments per day (or any other suitable number of treatments) of the highly concentrated doses (3,500-7,000 ppm) ten (10) minutes to thirty (30) minutes per treatment (or for any other suitable amount of time). The highly concentrated, intermittent delivery model produces highly favorable results unexpected by the medical community and is just the opposite of some current, approved, delivery/dosage protocols used in the medical community.

In some embodiments, the use of a plastic cup (and/or any other suitable container) as a delivery device is more effective than it may appear. In some embodiments, carbon dioxide from the patient's breath, blankets the gel and prevents some ambient oxygen from contacting the gel. This can help to prevent the formation of unwanted nitrogen dioxide. Second, in accordance with some embodiments, the cup (or other container) enables the patient's mobility preventing the need to be attached to a large and heavy metal cylinder. Third, in some cases, if the patient feels faint, the cup (or other container) is automatically dropped from the relaxed hand, and the delivery of nitric oxide is discontinued. Plastic cups (or other suitable containers) are widely available, clean and inexpensive.

In some non-limiting embodiments, a 10 fl oz container (295 ml) can be used for the mixing and use of the described gels.

Figure 18:
FIG. 18 illustrates approximately 1 to 5 gm (or any other suitable amount) of Gel A being poured into a small container or delivery device in accordance with a representative embodiment.
Figure 19:
FIG. 19 illustrates approximately 1 to 5 gm (or any other suitable amount) of Gel B being poured into a small container or delivery device in accordance with a representative embodiment.
Figure 20:
FIG. 20 illustrates the stirring of the 5 gm (or any other suitable amount) of Gels A and B together in the small container in accordance with a representative embodiment, using any suitable non-metallic stirring tool, such as plastic or wood (in this case a wooden coffee stirrer) to mix the gels together.
Figure 21:
FIG. 21 illustrates the combined Gels A and B in the bottom of the container, with the resulting white bubbles of NO gas formed in the combined gels, which are released into the air in accordance with a representative embodiment.
Figure 22:
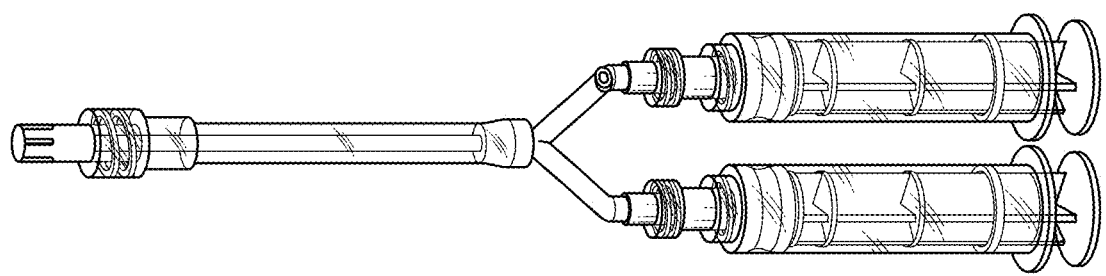
FIG. 22 illustrates an alternative method for the measurement of the gels, being a dual-syringe device, for delivery a precise dosage of the 5 gm (or any other suitable quantity) of Gels A and B in accordance with a representative embodiment.
Figure 23:
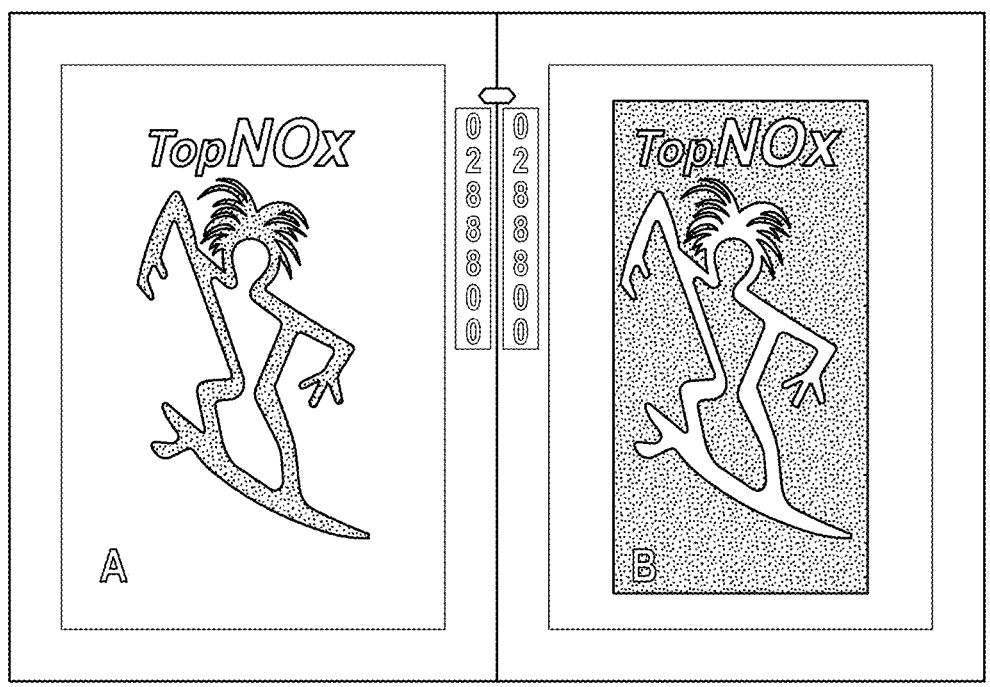
FIG. 23 illustrates another alternative method for the measurement of the gels, being a pre-packaged, dual unit set of 5 gm (or any other suitable amount) of Gels A and B for delivery of a precise dosage of 5 gm (or any other suitable amount) of Gels A and B in accordance with a representative embodiment.
Figure 24:
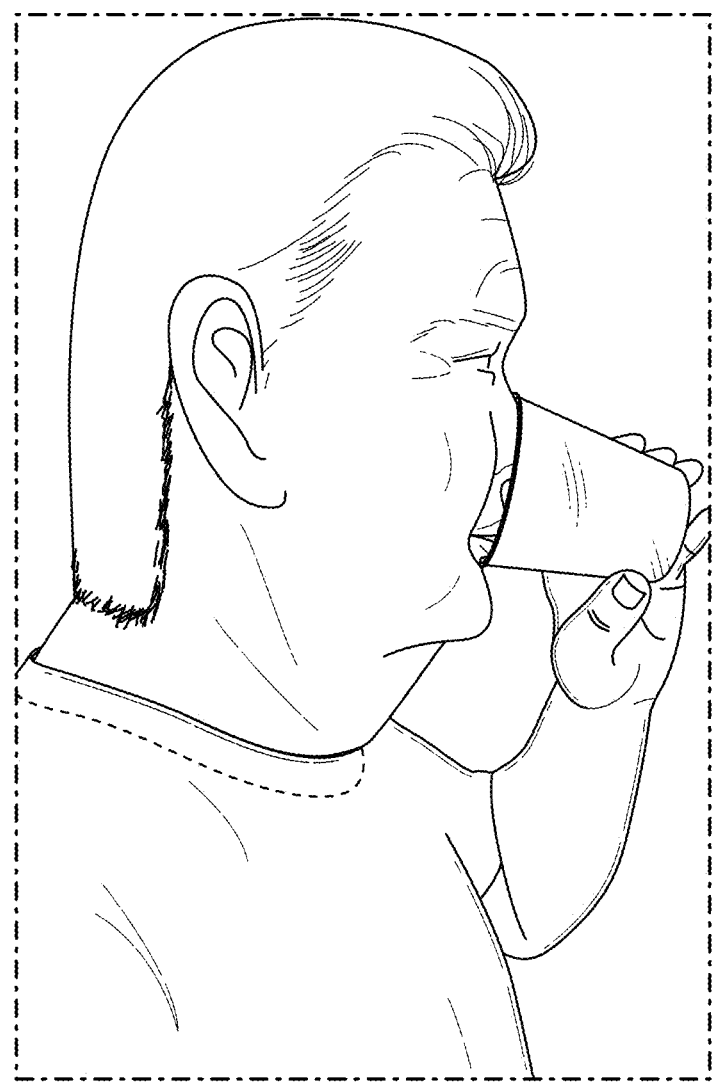
FIG. 24 illustrates a side view depicting self-administration of inhaled NO gas using a suitable container, demonstrating the placement of the container above a nose and below a lower lip of a mouth, but not sealing the cup around a face of the user, which allows free movement of air into the container in accordance with a representative embodiment.
Figure 25:
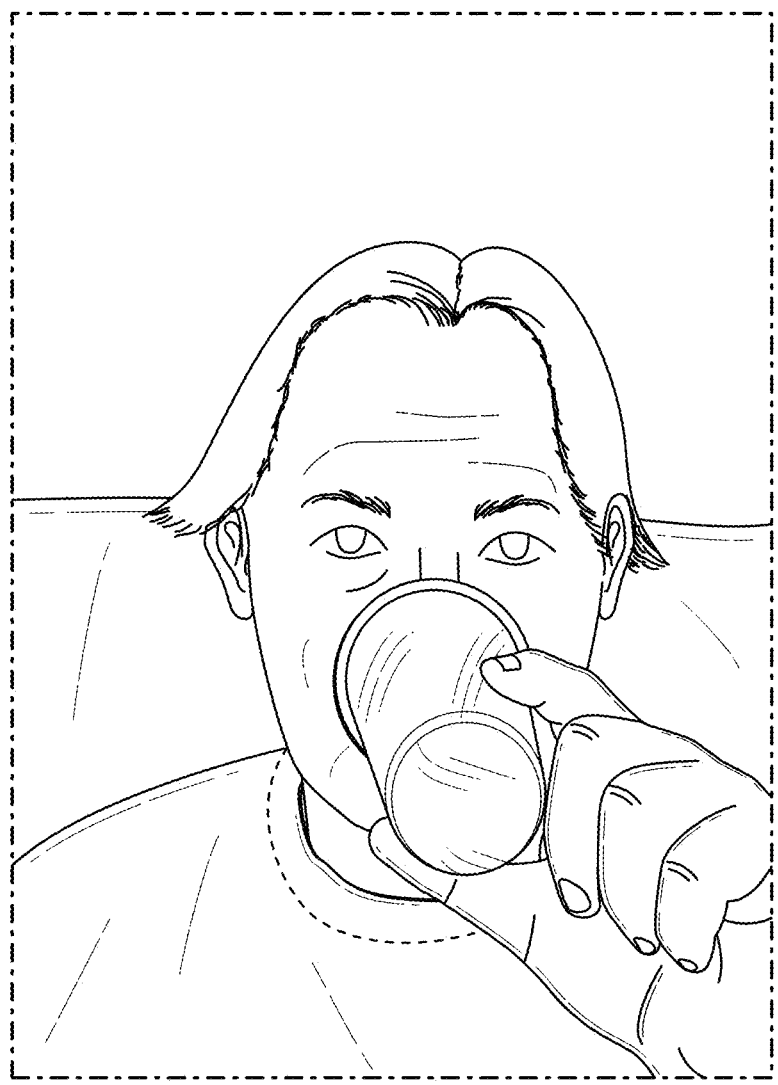
FIG. 25 illustrates a frontal view of the administration of the inhaled NO gas using a plastic cup, demonstrating the placement of the cup above the nose and below the lower lip of the mouth, but not sealing the cup around the face, which allows free movement of air into the cup.
Figure 26:
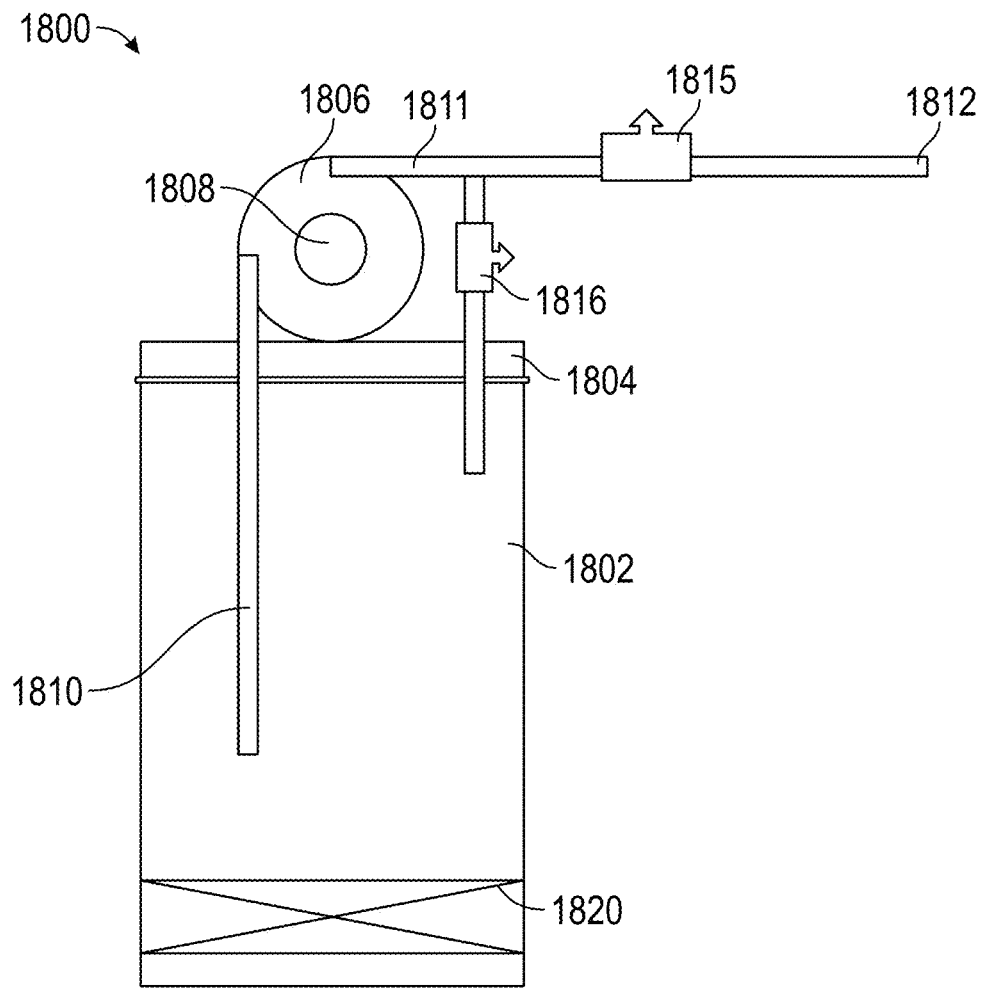
FIGS. 26-27 each illustrate a powered delivery cup (or other suitable container) in accordance with some representative embodiments.
Figure 27:
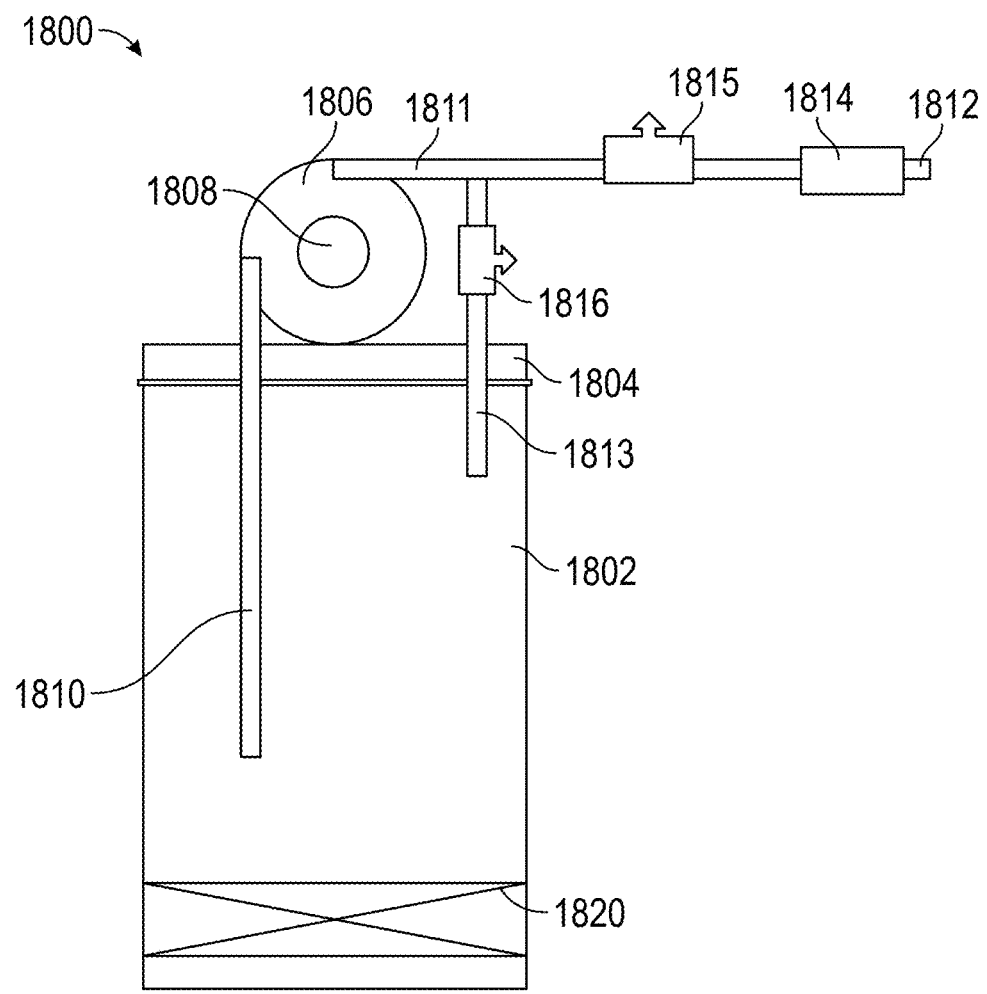

With reference to the figures, FIG. 18 illustrates approximately 1 to 5 gm (or any other suitable amount) of Gel A being poured into a small container or delivery device in accordance with a representative embodiment;

FIG. 19 illustrates approximately 1 to 5 gm (or any other suitable amount) of Gel B being poured into a small container or delivery device in accordance with a representative embodiment;

FIG. 20 illustrates the stirring of the 5 gm (or any other suitable amount) of Gels A and B together in the small container in accordance with a representative embodiment, using any suitable non-metallic stirring tool, such as plastic or wood (in this case a wooden coffee stirrer) to mix the gels together;

FIG. 21 illustrates the combined Gels A and B in the bottom of the container, with the resulting white bubbles of NO gas formed in the combined gels, which are released into the air in accordance with a representative embodiment;

FIG. 22 illustrates an alternative method for the measurement of the gels, being a dual-syringe device, for delivery a precise dosage of the 5 gm (or any other suitable quantity) of Gels A and B in accordance with a representative embodiment;

FIG. 23 illustrates another alternative method for the measurement of the gels, being a pre-packaged, dual unit set of 5 gm (or any other suitable amount) of Gels A and B for delivery of a precise dosage of 5 gm (or any other suitable amount) of Gels A and B in accordance with a representative embodiment;

FIG. 24 illustrates a side view depicting self-administration of inhaled NO gas using a suitable container, demonstrating the placement of the container above a nose and below a lower lip of a mouth, but not sealing the cup around a face of the user, which allows free movement of air into the container in accordance with a representative embodiment;

FIG. 25 illustrates a frontal view of the administration of the inhaled NO gas using a plastic cup, demonstrating the placement of the cup above the nose and below the lower lip of the mouth, but not sealing the cup around the face, which allows free movement of air into the cup; and FIGS. 26-27 each illustrate a representative embodiment of a powered delivery device 1800 (e.g., a cup or other container/system). In this regard, such powered delivery devices can include any suitable component and function in any suitable manner. Indeed, in some cases, the powered delivery device (e.g., cup) is configured such that the NO gas is delivered via an enclosed container 1802 (such as a cup or other suitable device) of any suitable size. In some cases, the container 1802 includes a lid 1804. In some embodiments, the container 1802 is coupled with a pump 1806, which in some cases is powered by a battery 1808. In some cases, the pump includes one or more pick-up tubes 1810. In some embodiments, the pump 1806 is used to push out the NO gas through an outlet tube 1811 to a number of alternative devices, such as a nasal cannula 1812, or for insertion into or to be used in connection with a respirator or ventilator, or any other suitable device. This modification may be necessary in order to quantify the dosage for the FDA regulatory requirements. Some embodiments include one or more recirculation tubes 1813, $NO_2$ filters 1814, control valves 1815, metering return valves 1816 (which may have one or more recirculation tubes), or other components.

Some elements of the powered delivery devices 1800 may include one or more:

Materials that are compatible with nitric oxide gas.

Containers 1802: Screw on lids 1804 (and/or any other suitable closing mechanism) that are air-tight and compatible with gels and nitric oxide.

Pumps 1806: 1 to 9 volts DC positive displacement pumps (and/or any other suitable pump) capable of delivering 1-5 liters (or any other suitable amount) per minute.

Variable volt powered Batteries 1808: 6-12 volts (or any other suitable voltage), or other direct current.

Pick up tubes 1810 for the pump 1806: ⅛ to ¼ inch polyethylene nitric compatible tube (and/or any other suitably sized and or type of tube).

Outlet tubes 1811 from pump: ⅛ to ¼ inch polyethylene tube (and/or any other suitably sized and or type of tube).

Recirculation tubes 1813: ⅛ to ¼ inch polyethylene tube (and/or any other suitably sized and or type of tube).

Outlet control valves 1815: Needle valve, variable control, and/or any other suitable valve.

Recirculation valves 1816: Needle valve, variable control valve, and/or any other suitable valve.

Gels 1820: Two-part nitric oxide generating gels (e.g., as discussed above).

Nasal cannula 1812: or other device using positive nitric oxide flow.

$NO_2$ filter 1814: placed in line to filter nitrogen dioxide from the cup (or other receptacle) to the patient.

Instructions for Use

How to Combine and Use Nitric Oxide Gels for Inhalation:

In accordance with some embodiments, measure substantially equal amounts of Gel A and Gel B into a 10 FL oz plastic cup (and/or any other suitable receptacle of any suitable size). In accordance with some embodiments, this cup is the size of a small hard plastic coffee cup.

The amount of Gel A and Gel B can vary depending on how great a volume of nitric oxide gas is to be delivered. An average adult dose would, in some embodiments, be approximately 4.5-5.5 grams of each gel (though any other suitable dose can be used). In accordance with some embodiments, this is about the size of a common US quarter dollar coin, or of half of a teaspoon, of each gel.

In some cases, the gels are combined by manually stirring (or otherwise mixing) them together in the bottom of the plastic cup (and/or any other suitable container) using a non-metallic stirrer and/or any other suitable stirring mechanism (some possible examples of things that can be used are: coffee-stirrers, drinking straws, wooden skewers, toothpicks, wooden chop-sticks, and/or any other suitable device). Mix thoroughly (approximately 30-60 seconds, or any other suitable amount of time) until white bubbles appear.

In some embodiments, before inhalation of the gas from the cup, a person blows into the cup four times (10 seconds apart) (or any other suitable number of times and with any suitable amount of time in between blows) to blanket the gel with exhaled $CO_2$. This prevents some atmospheric oxygen from reacting with the nitric oxide emanating from the combined gels and turning it to unwanted nitrogen dioxide.

Some embodiments, include covering the mouth and nose with the cup (and/or any other suitable device) and continuing to inhale from and exhale into the cup (or other container). In some cases, the cup does not form a seal against the face. Indeed, in some cases, the free flow of air into and out of the sides of the cup is allowed. Additionally, in some cases, a patient breathes continuously for 25-30 minutes (or for any other suitable amount of time) for the desired effect.

In some cases, the patient can close his or her eyes if the patient feels any tingling or burning sensation from the gas on the patient's eyes.

In accordance with some embodiments, the procedure is repeated at least three times per day, or every three to four hours for 10 to 30 doses (or as otherwise appropriate).

In some embodiments, each time inhalation is required, a clean cup is used. In this regard, residual gels from previous use may deactivate the next mixture.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While several methods are disclosed herein, such methods are only to be limited as required by the claims. Accordingly, the various portions of the described methods can be reordered, omitted, augmented, substituted, and/or otherwise modified in any suitable manner. In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. A composition for producing therapeutic nitric oxide gas, the composition comprising:
    a nitrite donor;
    an acidic gel; and
    sodium bentonite,
    wherein the sodium bentonite is configured to react with nitrogen dioxide produced by the composition to decrease an amount of nitrogen dioxide gas released by the composition and to increase an amount of the therapeutic nitric oxide gas released by the composition.

2. The composition of claim 1, wherein the acidic gel comprises sodium bicarbonate and citric acid.

3. The composition of claim 1, further comprising:
    a nitrite gel comprising:
        the nitrite donor; and
        sodium bicarbonate.

4. The composition of claim 3, wherein the nitrite donor comprises sodium nitrite.

5. A method for producing nitric oxide gas, the method comprising:
    providing a composition comprising:
        a nitrite donor;
        an acidic gel; and
        sodium bentonite,
    wherein the sodium bentonite is configured to react with nitrogen dioxide produced by the composition to decrease an amount of nitrogen dioxide gas released by the composition and to increase an amount of the nitric oxide gas released by the composition.

6. The method of claim 5, wherein the providing the composition comprises mixing together:
    the acidic gel,
    a nitrite gel comprising the nitrite donor; and
    the sodium bentonite.

7. The method of claim 6, wherein the acidic gel comprises water and hydroxypropylmethylcellulose.

8. The method of claim 6, further comprising:
placing the composition in a container that comprises:
- a sealable compartment;
- a pump that is configured to force the nitric oxide gas produced by the composition out of the sealable compartment and through a conduit having an egress; and
- a recirculation line that is configured to channel a portion of the nitric oxide gas, which does not exit the egress of the conduit, back into the sealable compartment; and
releasing the nitric oxide gas from the container.

9. A system for producing nitric oxide gas, the system comprising:
- an acidic gel;
- a nitrite gel;
- sodium bentonite; and
- a container holding the acidic gel, the nitrite gel, and the sodium bentonite,
- wherein the sodium bentonite is configured to react with nitrogen dioxide produced by a mixture of the acidic gel and the nitrite gel to decrease an amount of nitrogen dioxide gas released and to increase an amount of the nitric oxide gas released.

10. The system of claim 9, wherein the container comprises a first compartment holding the acidic gel and a second compartment holding the nitrite gel.

11. The system of claim 10, wherein the first compartment comprises a first tearable sealed pouch, and wherein the second compartment comprises a second tearable sealed pouch.

12. The system of claim 11, wherein the first tearable sealed pouch and the second tearable sealed pouch are coupled together.

13. The system of claim 10, wherein the first compartment comprises a first syringe, wherein the second compartment comprises a second syringe, and wherein the first syringe and the second syringe are coupled together to simultaneously release a mixture of the acidic gel and the nitrite gel through a single conduit.

14. A composition for producing therapeutic nitric oxide gas, the composition comprising:
- a first gel comprising a nitrite donor; and
- a second gel comprising an organic acid,
- wherein the first gel and the second gel react to produce nitric oxide when mixed together, and
- wherein at least one of the first gel and the second gel comprises sodium bentonite, wherein the sodium bentonite: (a) stabilizes a viscosity of at least one of the first gel and the second gel; and (b) causes a mixture of the first gel and the second gel to produce more nitric oxide and less nitrogen dioxide compared to a mixture of gels lacking sodium bentonite but otherwise identical to the mixture of the first gel and the second gel.

15. The composition of claim 14, wherein the second gel comprises sodium bicarbonate and citric acid.

16. The composition of claim 15, wherein the second gel further comprises water and hydroxymethylcellulose.

17. A composition for producing nitric oxide gas, the composition comprising:
- a first gel comprising a nitrite donor;
- a second gel comprising an organic acid; and
- sodium bentonite,
- wherein the first gel and the second gel react to produce nitric oxide when mixed together, and wherein the sodium bentonite increases an amount of the nitric oxide produced to between 3,500 parts per million and 7,000 parts per million, while also reducing an amount of nitrogen dioxide produced.

18. The composition of claim 17, wherein the organic acid comprises citric acid.

19. The composition of claim 17, wherein the nitrite donor comprises sodium nitrite.

20. The composition of claim 17, wherein at least one of the first gel and the second gel further comprises sodium bicarbonate.

* * * * *